US007730191B2

(12) United States Patent
Otsuka et al.

(10) Patent No.: US 7,730,191 B2
(45) Date of Patent: Jun. 1, 2010

(54) INFORMATION PROCESSING APPARATUS REQUESTING REGISTRATION WITH PERIPHERAL, AND PERIPHERAL DETERMINING WHETHER TO ACCEPT REGISTRATION REQUEST OF INFORMATION PROCESSING APPARATUS

(75) Inventors: Kuniaki Otsuka, Yokohama (JP); Taketoshi Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 217 days.

(21) Appl. No.: 11/674,978

(22) Filed: Feb. 14, 2007

(65) Prior Publication Data

US 2007/0208863 A1 Sep. 6, 2007

(30) Foreign Application Priority Data

Feb. 17, 2006 (JP) ............................. 2006-041660

(51) Int. Cl.
*G06F 15/16* (2006.01)
*G06F 7/04* (2006.01)

(52) U.S. Cl. .................... 709/227; 709/223; 710/36; 710/37; 358/1.15; 726/3; 726/5; 726/6; 726/27; 726/29

(58) Field of Classification Search ................ 709/227, 709/223; 358/1.15; 710/36, 37; 726/3, 5, 726/6, 27, 29

See application file for complete search history.

(56) References Cited

U.S. PATENT DOCUMENTS

| | | | | | |
|---|---|---|---|---|---|
| 5,311,580 | A | * | 5/1994 | Otsuka et al. | .......... 379/100.03 |
| 5,548,729 | A | * | 8/1996 | Akiyoshi et al. | ............ 709/222 |
| 5,911,044 | A | | 6/1999 | Lo et al. | ...................... 709/203 |
| 6,167,462 | A | * | 12/2000 | Davis et al. | .................... 710/5 |
| 6,256,662 | B1 | | 7/2001 | Lo et al. | ...................... 709/203 |
| 6,425,001 | B2 | | 7/2002 | Lo et al. | ...................... 709/217 |
| 6,734,985 | B1 | * | 5/2004 | Ochiai | ........................ 358/1.15 |
| 7,024,497 | B1 | * | 4/2006 | Maffezoni | .................. 710/36 |
| 7,330,910 | B2 | * | 2/2008 | Young et al. | ................... 710/5 |
| 2001/0014237 | A1 | * | 8/2001 | Shima | .......................... 400/61 |
| 2002/0105671 | A1 | * | 8/2002 | Sugahara | .................. 358/1.15 |
| 2002/0156947 | A1 | * | 10/2002 | Nishio | .......................... 710/36 |
| 2003/0061367 | A1 | * | 3/2003 | Shah | .......................... 709/230 |
| 2003/0065952 | A1 | | 4/2003 | Otsuka | ........................ 726/4 |
| 2003/0182415 | A1 | * | 9/2003 | Vicard | ........................ 709/223 |
| 2004/0093523 | A1 | * | 5/2004 | Matsuzaki et al. | .......... 713/201 |
| 2005/0002057 | A1 | * | 1/2005 | Oe | ............................. 358/1.15 |
| 2005/0055547 | A1 | * | 3/2005 | Kawamura | .................. 713/155 |

(Continued)

FOREIGN PATENT DOCUMENTS

EP 1783651 A1 * 5/2007

(Continued)

*Primary Examiner*—Henry W. H. Tsai
*Assistant Examiner*—Steven G Snyder
(74) *Attorney, Agent, or Firm*—Canon USA Inc IP Division

(57) ABSTRACT

A system includes an information processing apparatus and a peripheral which are connected to each other. Initially, the information processing apparatus transmits, to the peripheral, a request to use a service provided by the peripheral. The peripheral determines whether to grant use permission to the received request, and notifies the information processing apparatus which has transmitted the request of the determination result. The peripheral stores information associated with the information processing apparatus to which use permission is granted in response to the request. The information processing apparatus then receives, from the peripheral, a response to the request.

1 Claim, 46 Drawing Sheets

U.S. PATENT DOCUMENTS

| | | | |
|---|---|---|---|
| 2005/0132029 A1* | 6/2005 | Fukao et al. | 709/222 |
| 2005/0160138 A1* | 7/2005 | Ishidoshiro | 709/203 |
| 2005/0169195 A1* | 8/2005 | Luo et al. | 370/254 |
| 2005/0273498 A1 | 12/2005 | Sasaki et al. | 709/206 |
| 2005/0273529 A1* | 12/2005 | Young et al. | 710/58 |
| 2006/0066898 A1* | 3/2006 | Matsuda et al. | 358/1.15 |
| 2007/0076252 A1* | 4/2007 | Shima | 358/1.15 |
| 2007/0118884 A1* | 5/2007 | Ozaki et al. | 726/5 |
| 2007/0133800 A1* | 6/2007 | Kim et al. | 380/256 |
| 2007/0206088 A1* | 9/2007 | Mizunashi et al. | 348/14.01 |
| 2008/0009266 A1* | 1/2008 | Yamasaki et al. | 455/411 |
| 2008/0196109 A1* | 8/2008 | Matsuzaki et al. | 726/29 |

FOREIGN PATENT DOCUMENTS

| | | |
|---|---|---|
| JP | 10-150520 A | 6/1998 |
| JP | 10-232925 A | 9/1998 |
| JP | 2002-077504 A | 3/2002 |
| JP | 2003-110551 A | 4/2003 |
| JP | 2003-132029 A | 5/2003 |
| JP | 2003-330801 A | 11/2003 |
| JP | 2004-215009 A | 7/2004 |
| JP | 2005-260987 A | 9/2005 |
| JP | 2006-203422 A | 8/2006 |
| WO | 2006/006678 A1 | 1/2006 |

* cited by examiner

FIG. 9

| Packet ID (605) | PACKET TYPE INDICATED BY PACKET ID |
|---|---|
| 01 | PC REGISTRATION REQUEST PACKET |
| 02 | INQUIRY REQUEST PACKET |
| 03 | PC DELETION REQUEST PACKET |
| 04 | SESSION CONNECTION REQUEST PACKET |
| 05 | SESSION DISCONNECTION REQUEST PACKET |
| 06 | IMAGE DATA REQUEST PACKET |

FIG. 10

| PACKET ID (705 OR 805) | PACKET TYPE INDICATED BY PACKET ID |
|---|---|
| 11 | PC REGISTRATION RESPONSE PACKET |
| 12 | INQUIRY RESPONSE PACKET |
| 13 | PC DELETION RESPONSE PACKET |
| 14 | SESSION CONNECTION RESPONSE PACKET |
| 15 | SESSION DISCONNECTION RESPONSE PACKET |
| 16 | IMAGE DATA PACKET |

FIG. 11

| RESPONSE ID (706 OR 806) | CONTENTS INDICATED BY RESPONSE ID |
|---|---|
| 01 | PC REQUEST OK |
| 02 | PC REQUEST NG |
| 03 | INQUIRY RESPONSE (NO SCAN OPERATION) |
| 04 | INQUIRY RESPONSE (SCAN OPERATION OCCURRENCE) |
| 05 | INQUIRY RESPONSE (ANOTHER PC BEING USED) |

FIG. 16

|  | LOGIN@COMPUTER NAME | IP ADDRESS |  |
|---|---|---|---|
| 1603 | father@home | USB | 1604 |
| 1605 | admin@Taro'sPC | 192.168.1.101 | 1606 |
| 1607 | user1@officePC | 192.168.1.102 | 1608 |
| 1609 | Hanako@Flower | 192.168.1.103 | 1610 |

1600, 1601, 1602

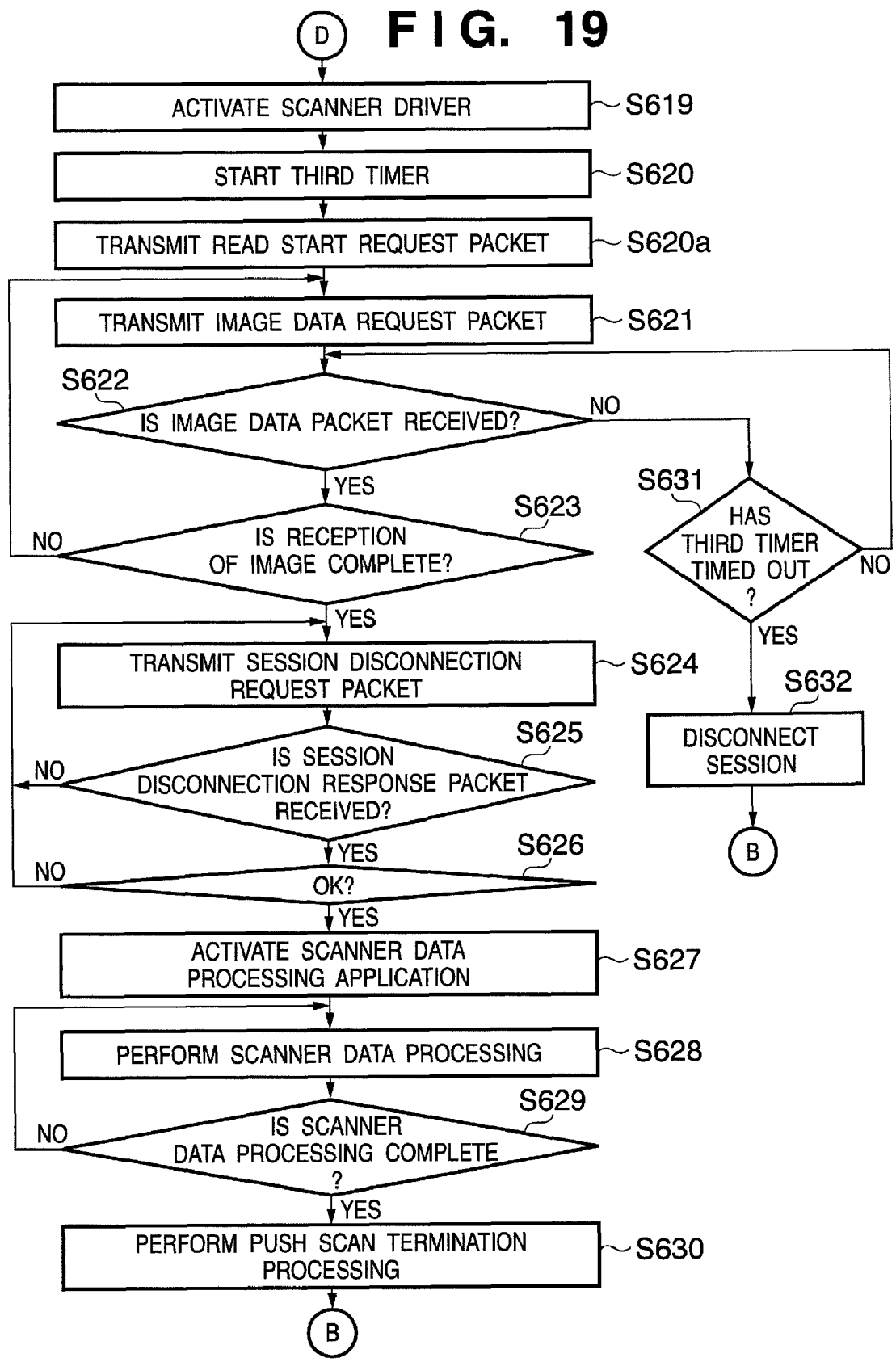

FIG. 23

|  | LOGIN@COMPUTER NAME | MAC ADDRESS |  |
|---|---|---|---|
| 2303 | admin@Taro'sPC | 00:00:00:12:34:56 | 2304 |
| 2305 | user1@officePC | FF:00:FF:00:00:01 | 2306 |
| 2307 | user2@officePC | FF:00:FF:00:00:01 | 2308 |
| 2309 | Hanako@Flower | 00:00:85:AB:CD:EF | 2310 |
|  |  |  |  |
|  |  |  |  |
|  |  |  |  |
|  |  |  |  |
|  |  |  |  |

| LOGIN@COMPUTER NAME | MAC ADDRESS |
|---|---|
| admin@Taro'sPC | 00:00:00:12:34:56 |
| user2@officePC | FF:00:FF:00:00:01 |
| | |
| | |
| | |
| | |
| | |
| | |
| | |

FIG. 30

| LOGIN@COMPUTER NAME | MAC ADDRESS |
|---|---|
| user2@officePC | FF:00:FF:00:00:01 |
| Hanako@Flower | 00:00:85:AB:CD:EF |
|  |  |
|  |  |
|  |  |
|  |  |
|  |  |
|  |  |
|  |  |
|  |  |

VALUE OF TYPE
  00 : CONNECTION CHECK REQUEST PACKET
  01 : PC REGISTRATION REQUEST PACKET
  02 : INQUIRY REQUEST PACKET

VALUE OF TYPE
  10 : CONNECTION CHECK REQUEST PACKET
  11 : PC REGISTRATION RESPONSE PACKET
  12 : INQUIRY RESPONSE PACKET

VALUE OF STATUS
  00 : POWER ON
  01 : REGISTRATION SUCCESS
  02 : REGISTRATION FAILURE
  03 : REQUEST OK
  04 : SCAN BUTTON OPERATION OCCURRENCE
  05 : ANOTHER SERVICE BEING EXECUTED
  06 : BEING SHUT DOWN
  07 : ANOTHER SESSION BEING ESTABLISHED
  08 : SERVICE BEING ACTIVATED

FIG. 38A

| ID | Computer Name |
|---|---|
| 1 | admin@Desk — 3901 |
| 2 | |
| 3 | |
| 4 | |

| ID | Computer Name |
|---|---|
| 1 | admin@Desk — 3901 |
| 2 | Taro@Note — 3902 |
| 3 | |
| 4 | |

3900

INFORMATION PROCESSING APPARATUS REQUESTING REGISTRATION WITH PERIPHERAL, AND PERIPHERAL DETERMINING WHETHER TO ACCEPT REGISTRATION REQUEST OF INFORMATION PROCESSING APPARATUS

BACKGROUND OF THE INVENTION

1. Field of the Invention

The present invention relates to an information processing system, information processing apparatus, and peripheral and, more particularly, to an information processing system comprising an information processing apparatus such as a PC and a peripheral such as a multifunction printer having a scanner function which connect to a network.

2. Description of the Related Art

Recently, computer techniques and communication techniques have remarkably advanced, and networks have become widespread not only in offices but also in households. As terminals forming these networks, peripheral devices such as printers which have network functionalities are commercially available and becoming increasingly popular.

It is easy to enable terminal apparatuses connected to a network to communicate with each other. For example, a wired LAN may be used to enable a given terminal apparatus to connect to a network by using a cable to connect to the network and setting up an IP address. A wireless LAN allows a given terminal apparatus to connect to a network from, for example, outside a room, if the apparatus satisfies predetermined conditions, e.g., its identifier matches an identification code called an SSID (Service Set Identifier) which indicates a network group. For this reason, it may be possible for an unintended terminal apparatus (e.g., unauthorized terminal apparatus) to connect to a network. As a result, the unintended terminal apparatus may be used to read out or rewrite files in other apparatuses connected to the network without authorization. In certain cases, it may be possible for a user of an unauthorized apparatus to use a printer connected to the network without authorization. Furthermore, it may be possible for a user of an unauthorized apparatus to read a document placed on the document table of a scanner connected to the network. Moreover, it may be possible for a user of an unauthorized apparatus to change settings for a device connected to the network.

To address the above concerns, an access restriction function typified by a function called MAC address filtering is sometimes provided for a network transfer unit, a network recording apparatus, or the like. A MAC address is an address which is assigned to the media access control layer of a network and is unique to each network device. This address is displayed by using 16 digits in hexadecimal notation. MAC address filtering or the access restriction function is a function of registering in advance a MAC address which permits communication and receiving communication from only a network device having the registered MAC address on the basis of the fact that the MAC address is a unique address.

In order to use such an access restriction function or MAC address filtering function, it is necessary to register the MAC address of a device whose communication is permitted or rejected. As described above, however, a MAC address has 16 digits in hexadecimal notation, which an average user might be unfamiliar with. It is therefore very difficult for the user to understand the address, and it is very cumbersome to input the MAC addresses of a plurality of devices.

In order to solve this problem, various proposals have been made conventionally. For example, according to Japanese Patent Laid-Open No. 2006-203422, a printer discriminates whether a received packet complies with a predetermined protocol. Upon determining that the packet complies with the protocol, the printer stores a transmission source address in advance, and displays the stored address upon activation of an access restriction setting utility. There has also been proposed a technique of allowing a user to register an address which permits access by selecting it from the displayed addresses.

In addition, with regard to an authentication apparatus for an MFP (Multi Function Peripheral), Japanese Patent Laid-Open No. 2003-110551 discloses the following technique. This technique displays, on a display, identification information which can identify a terminal apparatus on the basis of the apparatus address transmitted from the terminal apparatus, and allows the user to select, by using input keys, a terminal apparatus for which a predetermined service is permitted to be provided on the basis of the displayed identification information. The technique then transmits an apparatus address corresponding to the identification information of the selected terminal apparatus to the service providing apparatus by using a wireless unit or the like. On the other hand, the service providing apparatus of the MFP stores the apparatus address transmitted from the authentication apparatus in a RAM. In addition, the service providing apparatus collates the apparatus address transmitted from the terminal apparatus with the apparatus address stored in the RAM. If the two apparatus addresses match, a service request from the terminal apparatus is permitted to allow the terminal apparatus to be registered in the service providing apparatus of the MFP.

These proposals implement an access restriction function or MAC address filtering function which can register, in a target apparatus, a terminal apparatus for which communication and service request are permitted without making the user manually input a MAC address.

There has also been proposed a technique of reducing the load of user authentication on a device which provides services for a network by eliminating any service requests from users having no use right, and reducing network load by preventing the generation of useless service request packets.

For example, Japanese Patent Laid-Open No. 2003-330801 discloses the following technique. This technique registers device information such as a use right in a directory server and makes a user PC acquire device information from the directory server. The user PC then checks whether it has a use right of a service from the device, i.e., the self-address is registered in a service use right item. If the address is registered, the user PC transmits a service request job to the device. If no service use right is available, the user PC searches for, from the previously obtained device information, a device which can provide a service similar to the requested service and for which the PC has a use right. If an alternative device exists, the user PC transmits a service request job to the alternative device upon obtaining permission from a job issuer. If no alternative device exists, the user PC notifies the job issuer that the PC has no service use right, and terminates the processing.

Japanese Patent Laid-Open No. 2003-132029 discloses techniques in a network system shared by visitors who are unfamiliar with the installed system and staff who are familiar with the system. These techniques are designed to prevent troubles caused by operation errors by visitors who are unfamiliar with the system and prevent confusion due to complicated function display. According to Japanese Patent Laid-Open No. 2003-132029, this system comprises a means for specifying the user of a second device which can communicate with a first device, refers to the use history of the first device by the specified user, and restricts a function of permitting the use of the first device in accordance with the use history.

Peripherals connecting to a conventional network include one having a so-called scanner function of transmitting data generated by reading a document (which will be referred to as scan data, image data, or document data hereinafter) to an information terminal apparatus.

This scanner function includes a pull scan function and a push scan function. The pull scan function is a function of transmitting scan data from a peripheral to an information terminal apparatus when the peripheral activates the scanner function upon operation on the information terminal apparatus side. The push scan function is a function of determining, by operation on the peripheral side, an information terminal apparatus to which scan data is to be transmitted, and transmitting the scan data to the information terminal apparatus. With regard to this push scan function, several techniques have been disclosed.

In an image reading system including an image reading apparatus which reads a document image and outputs image data and an information processing terminal which inputs the output image data, for example, the following image data transmission/reception control is performed. Japanese Patent Laid-Open No. 10-150520 discloses a technique of checking, by referring to information held by an image reading apparatus, whether the operation unit of the image reading apparatus has issued an image read instruction, and instructs the image reading apparatus to start reading an image, when an image read instruction has been issued. The information processing terminal receives image data obtained by causing the image reading apparatus to read an image in accordance with this instruction.

In addition, Japanese Patent Laid-Open No. 2002-077504 discloses a method in which, in order to transmit image data to a desired terminal apparatus through a network by scanner operation, mail is generated and transmitted upon attachment of the image data thereto.

Furthermore, Japanese Patent Laid-Open No. 2004-215009 discloses a technique of reading an image and transmitting image data by selecting a transmission destination information terminal apparatus and an application with respect to the push scan function of an image reading apparatus connecting to a network. This technique allows transmission of image data in accordance with the application executed by the transmission destination information terminal apparatus.

In general, a network system which comprises a plurality of clients and a server and in which communication between a specific client and the server is not occupied has two methods of recognizing event notification from the server to a specific client.

One is a method of making the server notify all or a specific one of the clients of the occurrence of an event. According to this method, in a system comprising PCs as clients and an MFP as a server, in order to make the MFP body notify a PC of an event, the MFP notifies the PC of the occurrence of the event.

More specifically, the MFP itself notifies all the PCs on the network of the occurrence of the event by using broadcasting based on UDP (User Datagram Protocol) communication. Thereafter, the corresponding PC alone recognizes the notification of the event, and requests the MFP to provide a service using TCP communication. This method is simple as an event notification method, and produces only a small time difference from event occurrence. However, from the client viewpoint, unintended communication is performed. In order to cope with sudden event notification from the server, each client must always open a specific communication port, resulting in instability in terms of security. Some firewall function comprising security software, in particular, shuts off event notification communication from the above server. As a consequence, the clients cannot detect any event occurrence.

The other is a method of making the clients poll the server. According to this method, in a system comprising PCs as clients and an MFP as a server, in order to detect event occurrence in the MFP, each PC polls the MFP.

More specifically, a PC issues a polling request to the MFP by UDP communication, and at the same time, the MFP holds the list information of the PC with which the MFP is communicating. Upon occurrence of the polling request event from the PC, the MFP notifies the occurrence of the event through only the polling response to the PC as an event target. This makes the PC recognize the notification of the event and request the MFP to provide a service using TCP communication. Although this method is more complicated in operation than the above method, the server reflects the occurrence of an event in a polling response, and hence can reliably notify only a predetermined client of event occurrence. In addition, since no client receives any unintended communication, the reliability of security is high.

This method, however, produces a time difference from the occurrence of an event. Therefore, simply shortening the polling cycle will increase the loads on the network and its constituent devices. In contrast, simply prolonging the polling cycle will increase the time difference from the occurrence of an event to the detection of the event. That is, it is necessary to properly set a polling cycle, and hence a polling cycle changing method has been proposed as disclosed in Japanese Patent Laid-Open No. 2005-260987.

According to Japanese Patent Application No. 2006-203422 and Japanese Patent Laid-Open No. 2003-110551, however, the access restriction or MAC address filtering function is one-sidedly set in a peripheral, and any information about the setting is not notified to a terminal apparatus which tries to access the peripheral or receive a service therefrom. When, for example, a terminal apparatus which is set so as not to receive any service from the peripheral tries to communicate with the peripheral without knowing this fact, the terminal apparatus receives no response. Therefore, the terminal apparatus repeats retry until timeout, thus producing useless traffic and processing. The user of the terminal apparatus is not either notified that the apparatus is set so as not to receive any service from the peripheral. For this reason, the user performs operation for the use of a service from the peripheral. As a result, the user wastes much effort and time.

According to Japanese Patent Laid-Open No. 2003-330801, a directory server registers device information such as a use right, but does not notify any user PCs of the information. Each user PC must therefore inquire of the directory server, and hence traffic occurs between the user PC and the directory server, and the user PC needs to perform processing for an inquiry.

According to Japanese Patent Laid-Open No. 2003-132029, the timing at which restriction contents are determined coincides with the timing at which the user tries to use a first device from a second device, and the user is notified of the contents upon determination thereof. When the second device requests the first device to execute a print job or executes processing for actually using the first device, e.g., detecting the state of the first device, the user is specified, and restriction contents are determined. The user is then notified of the contents. In addition, this technique notifies the user of the contents by screen display, voice output, or the like by the second device at best. Therefore, after performing some kind of operation for the use of the function of the first device by using the second device, the user is notified of the restriction of the function if the function is restricted. Therefore, the operation and time during this period are wasted.

The push scan operation disclosed in Japanese Patent Laid-Open No. 10-150520 is based on the assumption that an image reading apparatus and an information processing terminal directly and locally, i.e., one-to-one, connect to each other by IEEE1284 or the like. In order to allow a plurality of information processing terminals to share an image reading apparatus through a network, this technique can use an arrangement in which one of the information processing terminals connects to the network, and the remaining information processing terminals receive image data through the information processing terminal connecting to the network. This reference, however, makes no reference to a case wherein the image reading apparatus connects to the network. Therefore, an intermediary information terminal apparatus is always required to allow the remaining information terminal apparatuses to receive image data. In order to allow an information processing terminal to check, for example, whether the operation unit of an image reading apparatus has issued an image read instruction, it is necessary to store the information input from the operation unit in the memory of the image reading apparatus and make the information processing terminal read out the information stored in the memory. It is therefore inefficient for a plurality of information processing terminals to read out information from the memory of the image reading apparatus, and this reference does not clearly indicate any means for specifying to which information processing terminal image data is to be transmitted.

For the push scan operation disclosed in Japanese Patent Laid-Open No. 2002-077504, a scanner apparatus needs to have a mail generation function and mail transmission function, and requires a means for processing image data into an attached file to be attached to mail. This imposes a processing load on the scanner apparatus and increases the apparatus cost. In addition, it is cumbersome to input an mail address to the scanner apparatus for every transmission and register information in advance.

The push scan function disclosed in Japanese Patent Laid-Open No. 2004-215009 registers in advance an information terminal apparatus to which read image data is to be transmitted, and allows the user to select one of the pieces of registered information terminal information at the start of push scan operation, thereby eliminating the cumbersomeness of address input operation and the like.

According to the technique disclosed in Japanese Patent Laid-Open No. 2004-215009, however, when push scan operation is performed for the image reading apparatus, the image reading apparatus requests the information terminal apparatus to transmit a read command. In other words, the image reading apparatus issues a read command transmission request to the information terminal apparatus by a so-called interrupt system. In this case, if, for example, an information terminal apparatus cannot receive image data for some reason, for example, because the apparatus is in a power OFF state, timeout occurs and the image data cannot be transmitted. In such a case, the push scan operation is useless operation, and time is wasted. Assume that such information is notified by the interrupt system. In this case, since the notification packet is abruptly transmitted, the firewall of the information terminal apparatus may discard the packet, and the notification may not reach the information terminal apparatus. In addition, this technique is based on the assumption that information terminal apparatuses and a scanner apparatus are arranged in one-to-one correspondence or many-to-one correspondence, and gives no consideration to a case wherein a plurality of scanner apparatuses connect to a network.

The method disclosed in Japanese Patent Laid-Open No. 2005-260987 needs to additionally have a mechanism of explicitly transmitting a request to set a polling cycle, and hence requires an additional arrangement on the system.

While a server which periodically receives polling signals for state acquisition from a plurality of clients is processing a high-load service request, polling from the clients becomes a load. This may affect processing for a service. In addition, when polling from a plurality of clients concentrate on the server, it imposes a load on the server. As a result, if the server cannot receive a service request from a client which is generated as a result of polling during the processing of a service, polling causes useless network traffic. On the other hand, when performing polling in accordance with a requested cycle on the server side, the client side cannot perform operation in consideration of the processing load on the client, resulting in a reduction in the degree of freedom of the client.

SUMMARY OF THE INVENTION

Embodiments of the present invention have been provided to solve or at least mitigate the above problems, and to provide an information processing system which implements, for example, a service like push scan reliably and efficiently by simple operation between a peripheral and an information processing apparatus which connect to a network.

An embodiment of the present invention is directed to an information processing apparatus which allows the contents set in a peripheral to be notified to the information processing apparatus and can perform control based on the notified contents without requiring any special apparatus and software.

An embodiment of the present invention is directed to an information processing apparatus which can contribute to the prevention of waste of the effort and time spent by a user by performing efficient processing depending on whether it can receive a service from a peripheral.

An embodiment of the present invention is directed to a peripheral which makes message exchange between information processing apparatuses more efficient in accordance with a service that can be provided.

An embodiment of the present invention is directed to an information processing system which can perform proper polling communication in consideration of the processing loads on an information processing apparatus and a peripheral.

According to one aspect of the present invention, preferably, there is provided an information processing system in which an information processing apparatus and a peripheral are connected to each other through a network and communicate with each other by exchanging packets. The information processing apparatus includes: a request unit configured to transmit, to the peripheral, a registration request to use a service provided by the peripheral; and a response reception unit configured to receive a response to the use registration request from the peripheral. The peripheral includes: a determination unit configured to determine whether to grant use permission to the registration request; a notification unit configured to notify the information processing apparatus which has transmitted the registration request of a determination result obtained by the determination unit; and a storage unit configured to store information of the information processing apparatus to which use permission is granted in response to the registration request.

According to another aspect of the present invention, there is provided a method for a system in which an information processing apparatus and a peripheral are connected to each other through a network and communicate with each other by exchanging packets. The method comprises: causing the information processing apparatus to transmit, to the peripheral, a registration request with respect to the peripheral to use a service provided by the peripheral at a first cycle; determining whether to grant use permission to the registration request received by the peripheral; notifying the information processing apparatus which has transmitted the registration request of a determination result indicating whether use permission is granted; storing, in a storage medium, information of the information processing apparatus to which use permission is granted in response to the registration request; and causing the information processing apparatus to receive, from the peripheral, a response to the registration request.

According to another aspect of the present invention, there is provided an information processing apparatus which is capable of connecting to a peripheral through a network and communicating with the peripheral by exchanging packets. The information processing apparatus includes: a request unit configured to transmit, to the peripheral, a registration request to use a service provided by the peripheral; and a response reception unit configured to receive, from the peripheral, a response to the registration request.

According to another aspect of the present invention, preferably, there is provided a peripheral which is capable of connecting to an information processing apparatus through a network, communicating with the information processing apparatus by exchanging packets, and providing a service to the information processing apparatus. The peripheral includes: a determination unit configured to determine whether to grant use permission to a registration request transmitted from the information processing apparatus; a notification unit configured to notify the information processing apparatus which has transmitted the registration request of a determination result obtained by the determination unit; and a storage unit configured to store information of the information processing apparatus to which use permission is granted in response to the registration request.

In addition, each operation of the information processing apparatus and peripheral according to the present invention may be implemented by a computer program.

According to an aspect, an embodiment of the present invention has an effect of reliably and efficiently providing services, e.g., push scan, between an information terminal apparatus and a peripheral connecting to each other through a network by simple operation. An information terminal apparatus which cannot receive any service from the peripheral connecting to the network can know the situation before issuing a request to use a service from the peripheral.

In addition, changing the cycle at which the information terminal apparatus transmits an inquiry to the peripheral in accordance with the operation state of the peripheral makes it possible to reduce useless traffic and efficiently use the resources of the apparatus. This saves the user useless operation and prevents him/her from wasting time for the operation. This also prevents the apparatus from wasting its resources.

This effect can be obtained even when, for example, a plurality of peripherals each having a scanner function connect to the network.

In addition, since the information terminal apparatus and the peripheral transmit/receive packets at a predetermined cycle, even if the information terminal apparatus includes a firewall, a response notification from the peripheral can be easily passed through the firewall as compared with the case of interrupt communication.

Further features of the present invention will become apparent from the following description of exemplary embodiments (with reference to the attached drawings).

BRIEF DESCRIPTION OF THE DRAWINGS

FIG. 9 is a view showing the values which the packet identifiers of request packets take and the contents of the values;

FIG. 10 is a view showing the values set in the packet identifiers of response packets and the meanings of the values;

FIG. 11 is a view showing the values which a response code area 706 or 806 take and the contents of the values;

FIG. 16 is a view showing how a predetermined area of a work memory stores the information of an information terminal apparatus on the basis of a PC registration request packet which the MFP receives from the information terminal apparatus;

FIG. 19 is a flowchart showing a detailed processing procedure executed by the information terminal apparatus in the flowcharts shown in FIGS. 12 and 13;

FIG. 23 is a view schematically showing an example of the address information and computer name and login name of each information terminal apparatus stored in the first area of a flash memory 112;

FIG. 26 is a view showing an example of storage of information in a second area 2600 of the flash memory 112;

FIG. 30 is a view showing the second area 2600 of the flash memory 112 which has been changed;

FIGS. 38A and 38B are views showing an example of a window display name storage list 3900 stored in a storage unit;

DESCRIPTION OF THE EMBODIMENTS

Exemplary embodiments of the present invention will be described below with reference to the accompanying drawings.

An MFP (Multi Function Peripheral) and information terminal apparatuses such as PCs which are commonly used in the embodiments to be described below and a network arrangement which connects them will be described first below.

Figure 1:
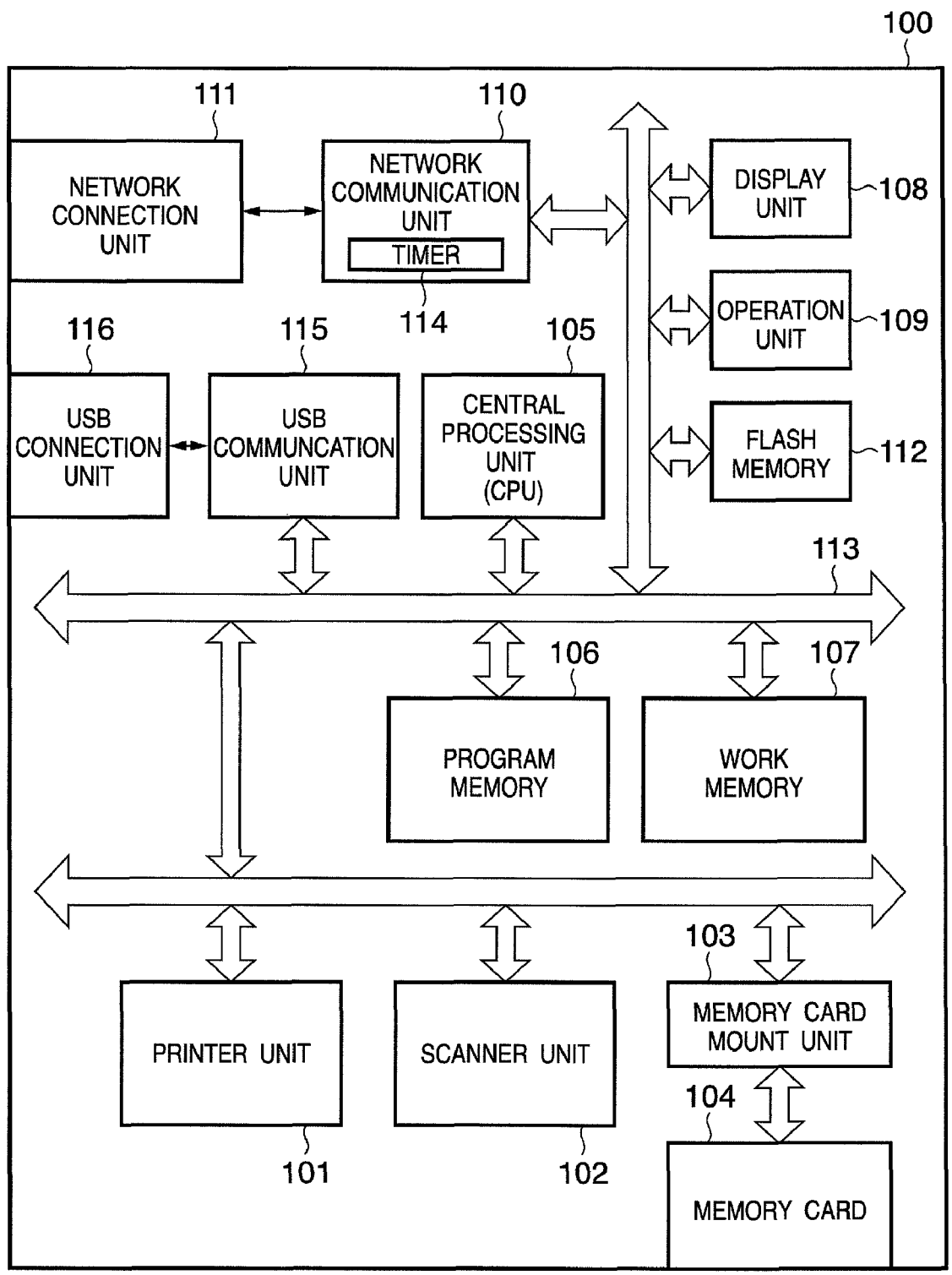
FIG. 1 is a block diagram showing the schematic arrangement of an MFP (Multi Function Peripheral) as a representative embodiment of the present invention.

FIG. 1 is a block diagram showing the schematic arrangement of an MFP as an exemplary embodiment of the present invention. The MFP 100 comprises a printer function, scanner function, and storage function, and can provide the respective function services through a network.

In the MFP 100, a printer unit 101 implements the printer function, a scanner unit 102 implements the scanner function, and a memory card mount unit 103 and a memory card 104 implement the storage function. The printer unit 101 prints externally received print data, image data stored in the memory card 104, or the like on a printing paper sheet by the ink-jet method or the electrophotographic method. The scanner unit 102 optically reads a document set on the document table (not shown) and converts the read image into electronic data. The scanner unit 102 further converts the electronic data into data in a designated file form, and transmits it to an external apparatus through the network. A copy service is a service of transferring image data obtained by making the scanner unit 102 read a document placed on the document table to the printer unit 101, and making the printer unit 101 print the image data on a printing paper sheet. An external apparatus connecting to the memory card 104 through the network can read out a file stored in the memory card 104, edit the file, and store it in the memory card.

In addition, the MFP 100 comprises a central processing unit (CPU) for controlling each component of the MFP and a program memory 106 such as a ROM storing program codes and the like which the CPU 105 reads out. The MFP 100 further comprises a work memory 107 such as a RAM for temporarily storing image data or the like or buffering at the time of execution of each service, a display unit 108 such as an LCD, and an operation unit 109 comprising switches to be described later.

The MFP 100 also comprises a network communication unit 110 for performing various kinds of communication by connecting the MFP 100 to the network, and a network connection unit 111 for connecting the network communication unit 110 to a network medium. The network communication unit 110 complies with at least one of a wired LAN and a wireless LAN. When the network communication unit 110 complies with a wired LAN, the network connection unit 111 includes a connector for connecting a cable of the wired LAN to the MFP 100. When the network communication unit 110 complies with a wireless LAN, the network connection unit 111 includes an antenna.

Furthermore, the MFP 100 comprises a memory 112 such as a nonvolatile flash memory which stores the transmission source information of a packet received by the network communication unit 110. The above components of the MFP connect to each other through a signal line 113.

The network communication unit 110 incorporates a timer 114 which measures a time. The MFP 100 further comprises a USB (Universal Serial Bus) communication unit 115 for communication with an information terminal apparatus through a USB interface. The USB communication unit 115 connects to the information terminal apparatus through a USB connection unit 116 such as a USB connector.

Figure 2:
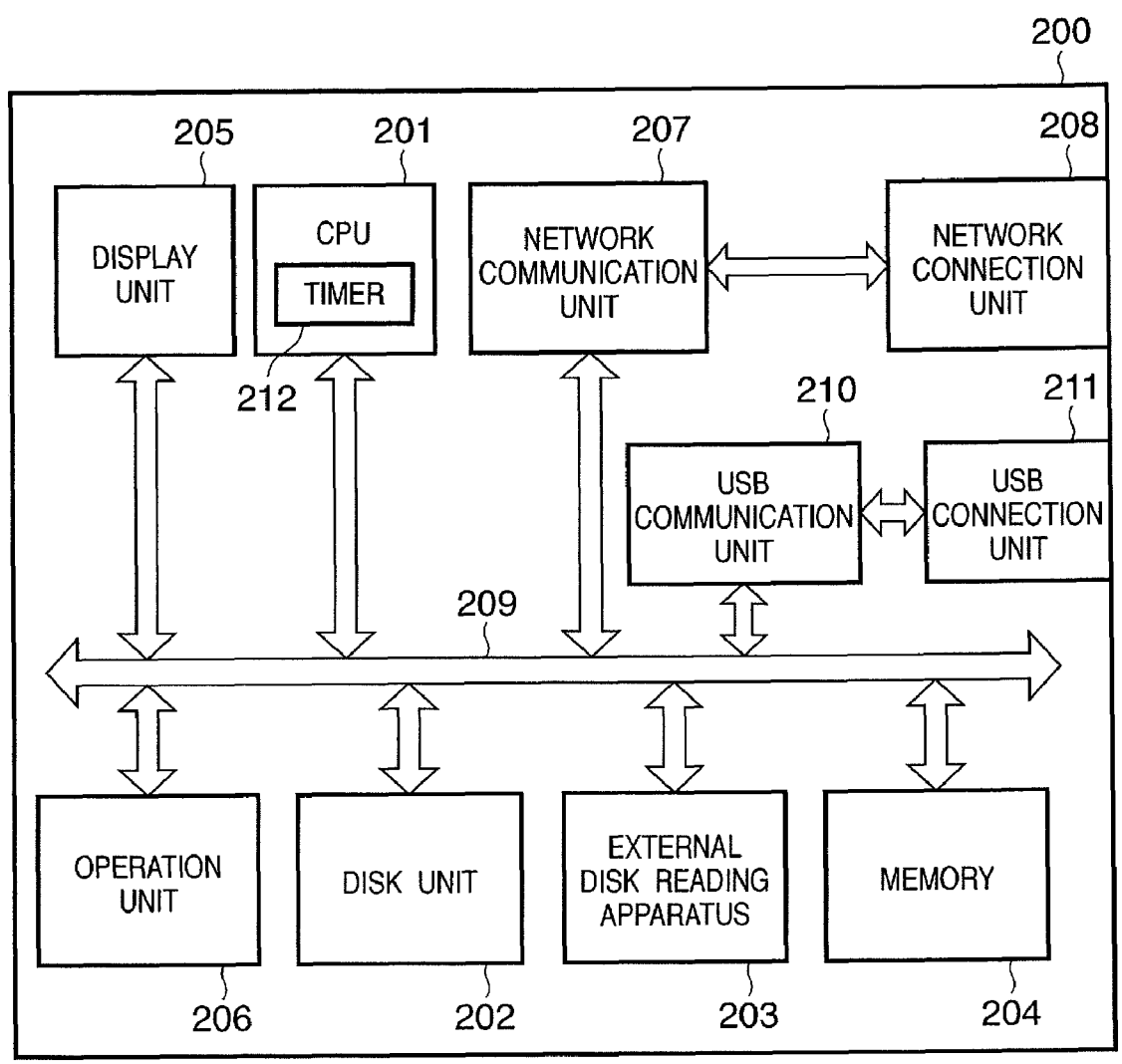
FIG. 2 is a block diagram showing the schematic arrangement of an information terminal apparatus such as a personal computer (to be referred to as a PC hereinafter) as a representative embodiment of the present invention.

FIG. 2 is a block diagram showing the schematic arrangement of an information terminal apparatus (also referred to herein as information processing apparatus) such as a personal computer (PC) as a representative embodiment of the present invention.

Referring to FIG. 2, reference numeral 201 denotes a CPU for controlling each component of an information terminal apparatus 200; 202, a disk unit which stores program applications, an OS (Operation System), various kinds of files, and the like which the CPU 201 reads out; 203, an external disk reading apparatus for reading out the contents of an external storage medium such as a CD-ROM; 204, a memory for temporarily storing data, buffering, or the like; 205, a display unit comprising an LCD and the like; 206, an operation unit comprising a keyboard, a mouse, and the like; 207, a network communication unit which connects the information terminal apparatus 200 to a network to perform various kinds of communication; and 208, a network connection unit for connecting the network communication unit 207 to a network medium.

As in the case of the MFP 100, the network communication unit 207 and the network connection unit 208 each comply with at least one of a wired LAN and a wireless LAN. More specifically, like the network communication unit 110 and network connection unit 111 incorporated in the MFP 100, each unit described above takes a necessary function and form in accordance with the corresponding LAN. Reference numeral 209 denotes a signal line for connecting the respective components; 210, a USB communication unit for communicating with various kinds of peripherals through a USB interface; 211, a USB connection unit such as a USB connector; and 212, a timer which is incorporated in the CPU 201 to measure the elapsed time.

Figure 3:
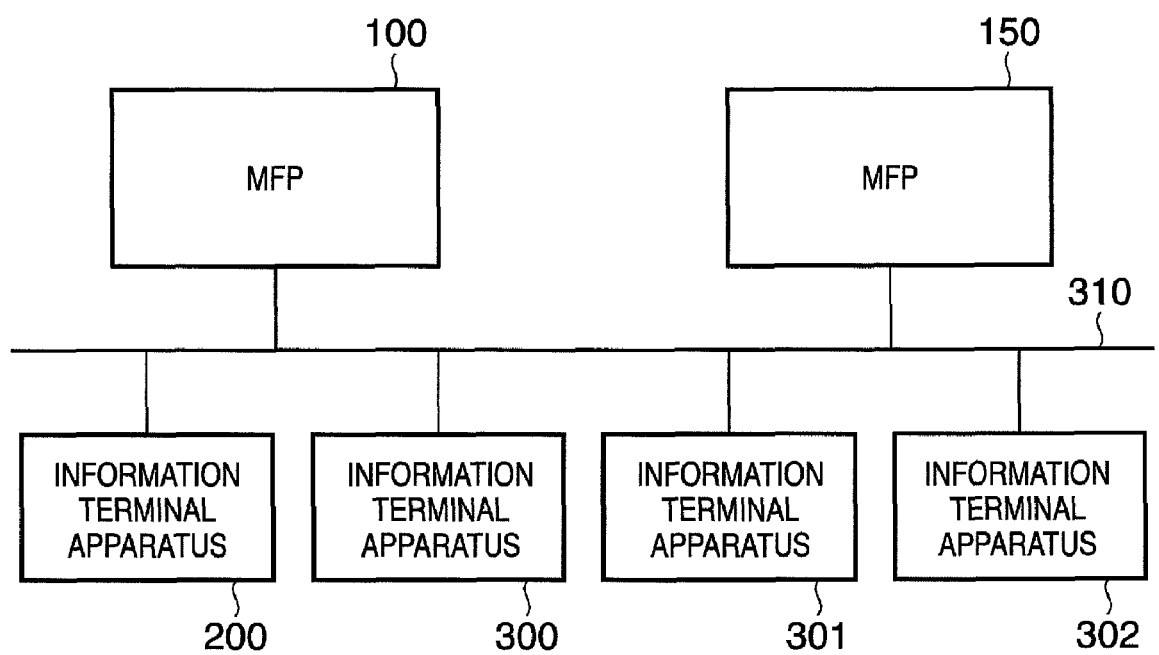
FIG. 3 is a block diagram showing the schematic arrangement of a network system including the MFP shown in FIG. 1 and the information terminal apparatus shown in FIG. 2.

FIG. 3 is a block diagram showing the schematic arrangement of a network system including the MFP 100 shown in FIG. 1 and the information terminal apparatus 200 shown in FIG. 2.

Referring to FIG. 3, reference numeral 150 denotes an MFP having the same functions as those of the MFP 100; 300, 301, and 302, information terminal apparatuses each having the same function as that of the information terminal apparatus 200; and 310, a network which connects the MFPs 100 and 150 to the information terminal apparatuses 200, 300, 301, and 302.

Although FIG. 3 shows the network 310 as if it were a wired LAN, it may be a wireless LAN. In addition, the number of information terminal apparatuses connecting to the network 310 is not limited to that shown in FIG. 3, and may be three or less or five or more. Likewise, the number of MFPs connecting to the network 310 is not limited to two. Only the MFP 100 may connect to the network, or three or more MFPs may connect to it.

Figure 4:
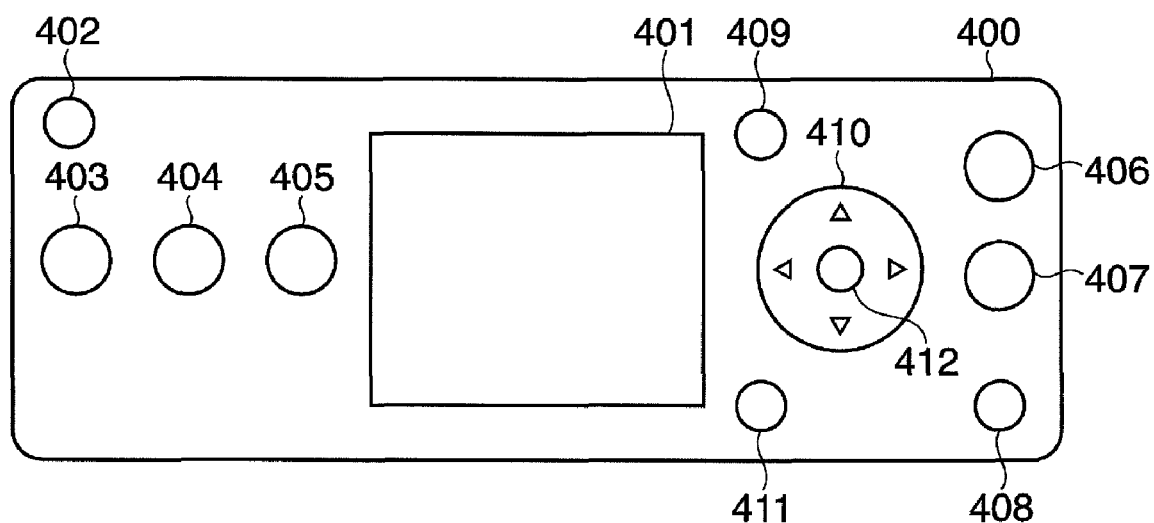
FIG. 4 is a view showing the layout arrangement of the operation panel of the MFP shown in FIG. 1, which includes a display unit and an operation unit.

FIG. 4 is a view showing the layout arrangement of an operation panel 400 including the display unit 108 and operation unit 109 of the MFP 100 shown in FIG. 1.

Referring to FIG. 4, reference numeral 401 denotes an LCD screen corresponding to the display unit 108; and 402 to 412, key operation portions which the user operates and constitute the operation unit 109.

The power key 402 is used to select/designate power ON/OFF for each component of the MFP 100. The copy key 403 is used to start a copy service from the MFP 100. The scan key 404 is used to request a push scan service from the MFP 100.

Push scan is a function service of transmitting image data obtained by reading a document placed on the document table (not shown) to one of the information terminal apparatuses connecting to the network in response to operation of the MFP 100 as a trigger. Operating the arrow key 410 and decision key 412 (to be described later) while viewing the LCD screen 401 makes it possible to select a specific information terminal apparatus to which image data is to be transmitted or a specific file form in which data is to be transmitted.

Pull scan is a function service of making a given information terminal apparatus transmit image data obtained by setting a document on the document table and starting installed application software to read the document by operating the operation unit of the information terminal apparatus.

The memory card key 405 is used to start a service of printing an image file or the like stored in the memory card 104 (to be referred to as memory card printing hereinafter), when it is loaded in the MFP 100, and displaying the file. The color start key 406 is used to start the execution of copying, push scan, memory card printing, or the like in color. The monochrome start key 407 is used to start the execution of copying, push scan, memory card printing, or the like in monochrome. The stop key 408 is used to stop copying, scanning, memory card printing, or the like whose execution has been started. The menu key 409 is pressed to display various kinds of setting items for the MFP 100. The arrow key 410 is used to move the cursor on the LCD screen 401 or a highlighting display portion (to be described later) to search for a menu which the user wants to set or a file in the memory card 104 which the user wants to print or display. The return key 411 is used to return the menu window to the preceding window. The decision key 412 is used to select or decide the item indicated by the cursor.

Several embodiments implemented in the network system having the above arrangement will be described below.

First Exemplary Embodiment

Figure 5:
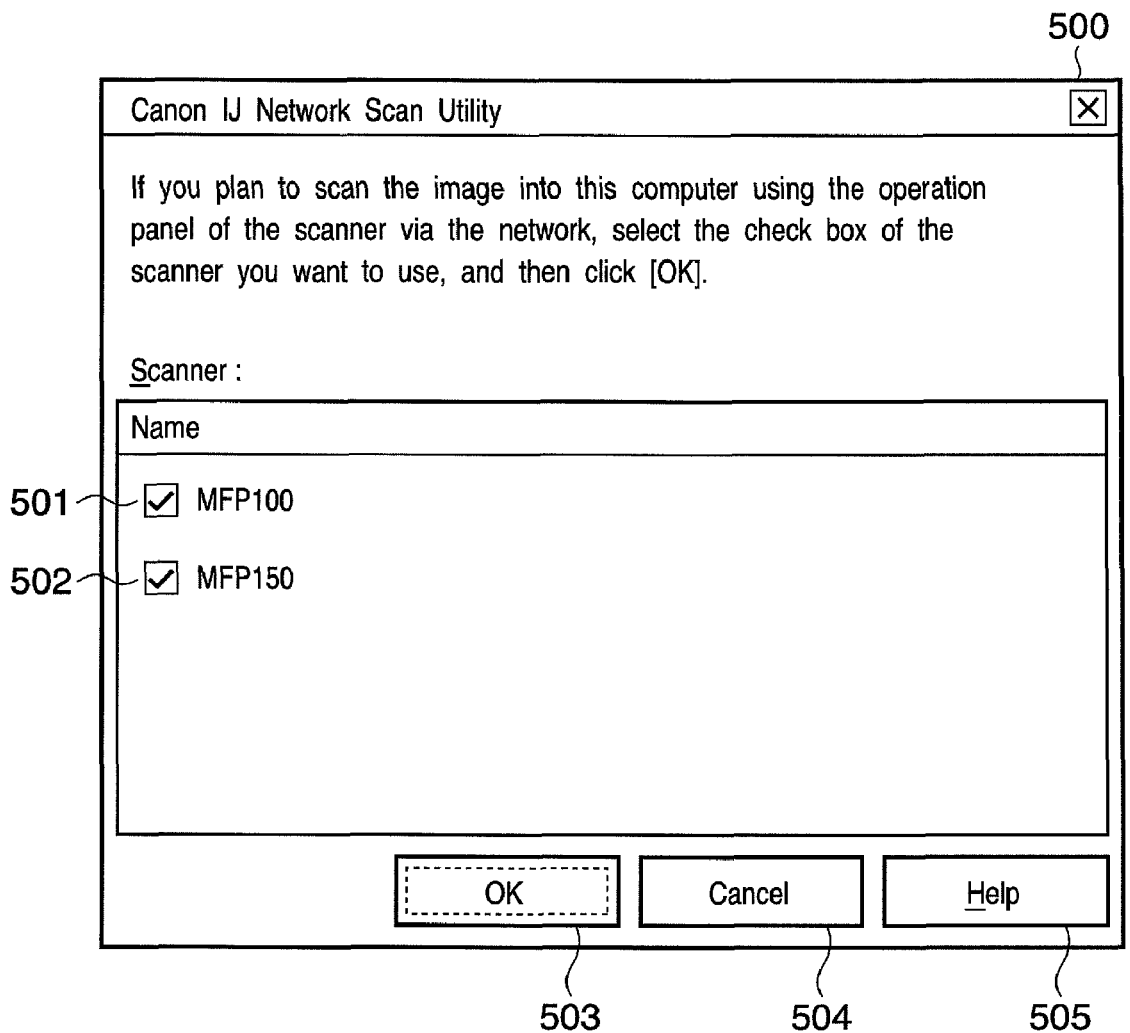
FIG. 5 is a view showing a setting window to be used to set, in the information terminal apparatus, whether to transmit a PC registration request packet and an inquiry request packet to the MFP.

FIG. 5 is a view showing a setting window which the user of an information terminal apparatus uses to set whether to transmit a PC registration request packet and an inquiry request packet to an MFP.

Referring to FIG. 5, reference numeral 500 denotes a request packet transmission setting window for setting and displaying whether to transmit a PC registration request packet and an inquiry request packet to each MFP. The following operation is executed to transmit a PC registration request packet and an inquiry request packet to each MFP.

For example, the user inserts a CD-ROM or the like storing software used by MFPs 100 and 150 into an external disk reading apparatus 203 of an information terminal apparatus 200 to perform predetermined operation, thus installing necessary software in a disk unit 202. The software includes a printer driver, scanner driver, application, and the like for the MFPs 100 and 150. The setting window 500 is a window displayed when the user performs predetermined operation on the information terminal apparatus in which an application is installed. When software for one of the MFPs 100 and 150 is installed, the setting window 500 displays only the MFP 100 or 150 in which the software is installed.

If the MFPs 100 and 150 are the same model and the information terminal apparatus 200 can communicate with the MFPs 100 and 150 using the same software, the software need not be installed separately. In such a case, when the presence of the MFPs 100 and 150 can be confirmed through a network 310, the request packet transmission setting window 500 may display them. Assume that at the time of activation of an application, the default is to transmit a PC registration request packet and an inquiry request packet.

Reference numeral 501 denotes a check box for setting whether to transmit a PC registration request packet and an inquiry request packet to the MFP 100 and displaying the set state; and 502, a check box for setting whether to transmit a PC registration request packet and an inquiry request packet to the MFP 150 and displaying the set state. The information terminal apparatus transmits a PC registration request packet and inquiry request packet to the MFP 100 or 150 corresponding to the checked check box 501 or 502. Checking both the check boxes 501 and 502 will transmit a PC registration request packet and an inquiry request packet to both the MFPs 100 and 150.

Note that the information terminal apparatus transmits an inquiry request packet to the MFP which has returned a PC registration response packet with a response code "01" (to be described later) in response to a PC registration request packet which the information terminal apparatus transmitted before the inquiry request packet. Assume that the check boxes are checked is the default mode. The setting window shown in FIG. 5 displays the MFPs 100 and 150. If, however, there is another MFP in which a scanner driver is installed and with which the information terminal apparatus can communicate, this MFP is displayed on the request packet transmission setting window 500 together with the check box like the MFPs 100 and 150. Reference numeral 503 denotes an OK button which validates a setting change; 504, a cancel button which invalidates a setting change; and 505, a help button for displaying a help window for an operation method.

It suffices to automatically activate the application immediately after it is installed or by turning on the power of the information terminal apparatus 200 after the application is installed. Alternatively, as in the case of general applications, the user may selectively activate this application.

Figure 6:
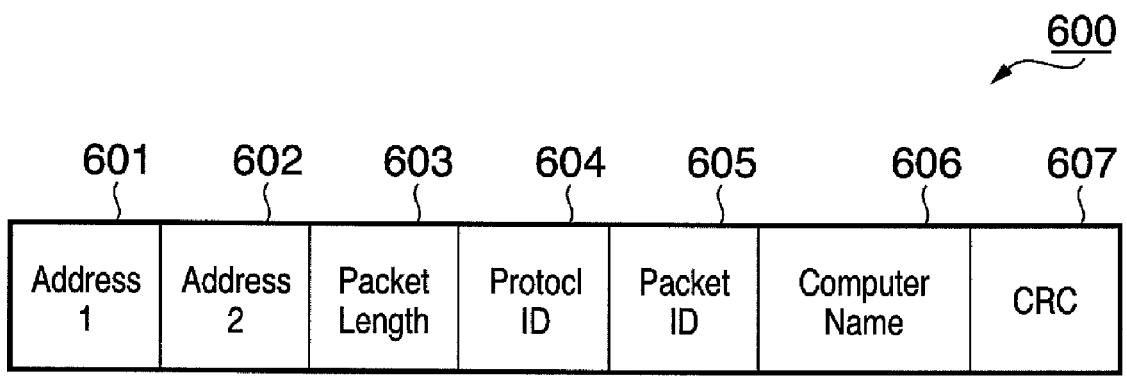
FIG. 6 is a view showing an example of the schematic frame format of each of various kinds of request packets which the information terminal apparatus transmits to receive a push scan service from the MFP.

FIG. 6 is a view showing an example of the schematic frame format of various kinds of request packets each of which an information terminal apparatus transmits to receive a push scan service from an MFP.

Referring to FIG. 6, reference numeral 600 denotes each of various kinds of request packets which an information terminal apparatus transmits to an MFP; 601, an area which records the destination address portion of the request packet frame 600, i.e., the address (e.g., the MAC address) of any one of the MFPs; 602, an area which records the transmission source address of the request packet frame 600, i.e., the MAC address attached to the network communication unit of any one of the information terminal apparatuses; and 603, an area which records a packet length indicating the number of octets of areas 604 to 606 to be described later. The area 604 records a protocol identifier indicating that this packet is a packet complying with a protocol determining predetermined agreements for communication between the information terminal apparatus and the MFP which connect to the network 310. The area 605 records a packet identifier which is used when a predetermined identifier is to be attached to a packet to be transmitted/received between the information terminal apparatus and the MFP.

FIG. 9 is a view showing the values which the packet identifier 605 of the request packet takes and the corresponding contents.

Assume that in this embodiment, the length of the packet identifier 605 is two octets. As shown in FIG. 9, the packet identifier 605 with "01 (hexadecimal notation)" indicates that the packet 600 is a PC registration request packet. Likewise, the packet identifier 605 with "02" indicates that the packet 600 is an inquiry request packet. The packet identifier 605 with "03" indicates that the packet 600 is a PC deletion request packet. The packet identifier 605 with "04" indicates that the packet 600 is a session connection request packet. The packet identifier 605 with "05" indicates that the packet 600 is a session disconnection request packet. The packet identifier 605 with "06" indicates that the packet 600 is a scan data request packet.

Note that the information terminal apparatus transmits a PC registration request packet, inquiry request packet, PC deletion request packet, and session connection request packet in accordance with connectionless UDP. On the other hand, the information terminal apparatus transmits an image data request packet and a session disconnection request packet in accordance with connection TCP.

The area 606 is a computer name area, which is used to transmit the computer name of the information terminal apparatus and the login name of the user who is currently logging in to the network in a format like "login name@computer name". A reference numeral 607 denotes a CRC (Cyclic Redundancy Check) indicating whether the packet 600 is a valid packet or indicating that, for example, the packet on a route on the network 310 has partly changed and hence is invalid.

If, for example, the packet identifier 605 is "02 (hexadecimal notation)", a network communication unit 110 of the MFP 100 which has received the inquiry request packet 600 checks whether the CRC value matches the CRC calculated from each bit value of the packet 600. If they match each other, the network communication unit 110 determines that the received inquiry request packet 600 is a valid packet. The network communication unit 110 reads out the value of the packet identifier 605 and discriminates that the packet is an inquiry request packet. The network communication unit 110 further reads out the computer name area 606 and performs predetermined processing, e.g., recording information indicating that the unit has properly received an inquiry request packet from the information terminal apparatus having the same computer name and login name as those written in the area. The network communication unit 110 inquires of the CPU 105 whether push scan operation addressed to the information terminal apparatus 200 has been executed. The network communication unit 110 transmits an inquiry response packet to the information terminal apparatus 200 in accordance with the inquiry result.

Figure 7:
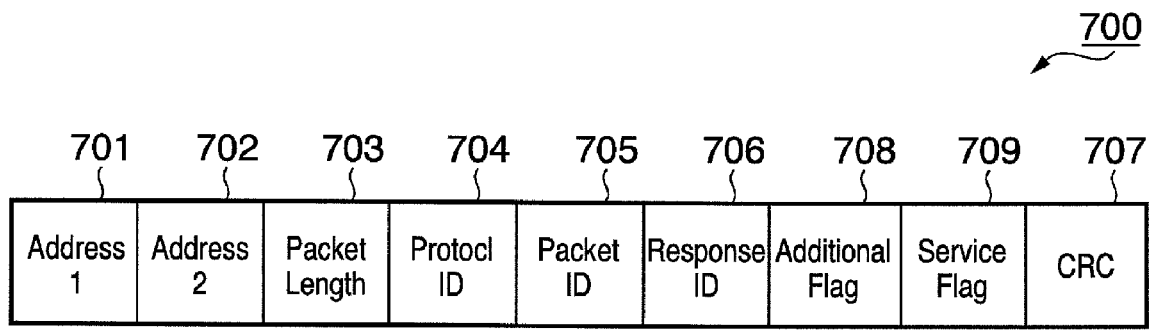
FIG. 7 is a view showing an example of the schematic format of a response packet which the MFP transmits in response to each request packet shown in FIG. 6.

FIG. 7 is a view showing the schematic format of a response packet to be transmitted to the MFP in response to each request packet shown in FIG. 6.

Referring to FIG. 7, reference numeral 700 denotes a response packet which the MFP transmits to the information terminal apparatus; and 701, a destination address portion of the response packet 700. If, for example, this packet is a response packet corresponding to the request packet 600 which the MFP 100 received from the information terminal apparatus 200, the portion 701 records the value copied from the transmission source address 602 of the request packet 600, i.e., the MAC address of the information terminal apparatus 200. Reference numeral 702 denotes an area which records the transmission source address portion of the response packet 700, i.e., the MAC address attached to the network communication unit of the MFP; 703, an area which records a packet length indicating the number of octets of areas 704 to 709 to be described later. The area 704 records a protocol identifier indicating that this packet is a packet complying with a protocol determining predetermined agreements for communication between the information terminal apparatus and the MFP which connect to the network 310. The area 705 records a packet identifier which is used when a predetermined identifier is to be attached to a packet to be transmitted/received between the MFP and the information terminal apparatus.

The area 706 is a response code area indicating the response content by using a code. The details of this value will be described later. Like the area 607, the area 707 is a CRC portion indicating whether the packet 700 is a valid packet or indicating that, for example, the packet on a route on the network 310 has partly changed and hence is invalid. The area 708 is an additional information flag area to be used in the second and subsequent embodiments. The area 709 is a service request permission flag area to be used in the second and subsequent embodiments.

FIG. 10 is a view showing the values set in the packet identifier area 705 of the response packet and the meanings of the set values. Assume that the length of the packet identifier area 705 is two octets.

As shown in FIG. 10, the packet identifier area 705 with "11 (hexadecimal notation)" corresponds to a PC registration response packet replying to a PC registration request packet, and the packet identifier area 705 with "12" corresponds to an inquiry response packet replying to the inquiry request packet 600. The packet identifier area 705 having the value "13" indicates that the response packet 700 is a PC deletion response packet corresponding to a received PC deletion request packet. The packet identifier area 705 having the value "14" indicates that the response packet 700 is a session connection response packet corresponding to a received session connection request packet. The packet identifier area 705 having the value "15" indicates that the response packet 700 is a session disconnection response packet corresponding to a received session disconnection request packet.

When the response packet 700 is an image data packet, the packet identifier area 705 is set to "16".

Figure 8:
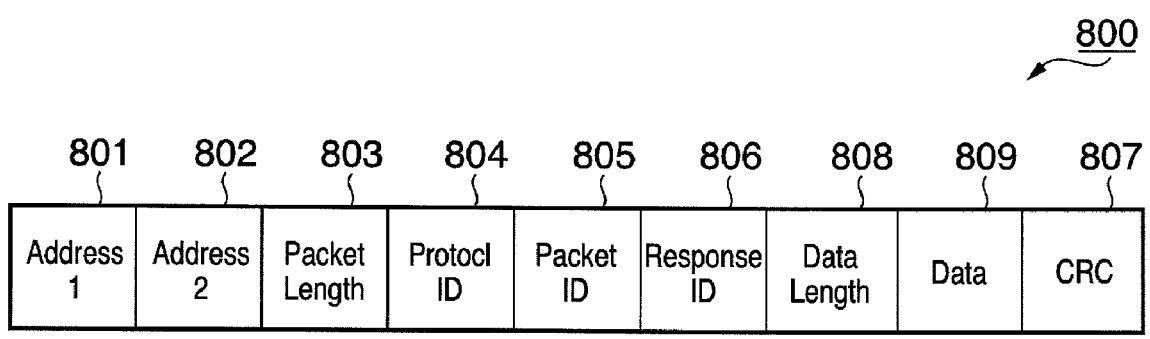
FIG. 8 is a view showing the format of an image data packet.

FIG. 8 is a view showing the format of an image data packet 800.

The image data packet 800 is a packet to be used to transmit the image data generated by making a scanner unit 102 read an image from a document from the MFP to the information terminal apparatus in response to an image data request packet. Referring to FIG. 8, areas 801 to 804, 806, and 807 are the same as the areas 701 to 704, 706, and 707 shown in FIG. 7, and hence a description thereof will be omitted.

Reference numeral 805 denotes a packet identifier area. The value of the packet identifier of the image data packet 800 is "16 (hexadecimal notation)". The MFP transmits the image data packet 800 when receiving the image data request packet 600 whose packet identifier 605 has the value "06". Although the MFP transmits one image data packet 800 every time it receives the image data request packet 600, the MFP may transmit a plurality of image data packets 800 every time it receives the image data request packet 600. The value of the response code area 806 of the image data packet 800 is set to "01" when there is image data to be transmitted, and the data can be transmitted. This value is set to "02" when there is no image data to be transmitted or data cannot be transmitted. Reference numeral 808 denotes an image data length area storing the length (the number of octets) of image data stored in the packet; and 809, an image data area for storing the image data generated by making the scanner unit 102 read a document upon dividing the data into several image data packets 800.

The MFP transmits a PC registration response packet, inquiry response packet, PC deletion response packet, and session connection response packet in accordance with connectionless UDP. On the other hand, the MFP transmits the image data packet 800 and a session disconnection response packet in accordance with connection TCP.

FIG. 11 is a view showing the values which the response code area 706 or 806 takes and the corresponding contents.

Assume that the length of the response code area 706 or 806 is two octets. Assume that the MFP is to transmit the inquiry response packet 700. In this case, if the MFP has no operation associated with push scan, "03" is written in the response code area. The value "04" is written in the response code area to indicate that the MFP has performed push scan operation with respect to the information terminal apparatus as the transmission destination of the inquiry response packet 700. When the MFP has performed push scan operation with respect to another information terminal apparatus or another information terminal apparatus is using the scanner unit 102, "05" is written in the response code area.

Assume that the MFP has received a PC registration request packet, PC deletion request packet, or image data request packet from any one of the information terminal apparatuses. In this case, if the MFP can accept the corresponding request, "01 (hexadecimal notation)" is written in the response code area. In addition, if the received request packet is a PC registration request packet, the MFP transmits the inquiry response packet 700 storing "11 (hexadecimal notation)" in the packet identifier area 705. If the received request packet is a PC deletion request packet, the MFP transmits the inquiry response packet 700 storing "13 (hexadecimal notation)" in the packet identifier area 705. Note, however, that if the received request packet is an image data request packet, the MFP transmits the image data packet 800 storing "16 (hexadecimal notation)" in the packet identifier area 805.

Figure 12A:
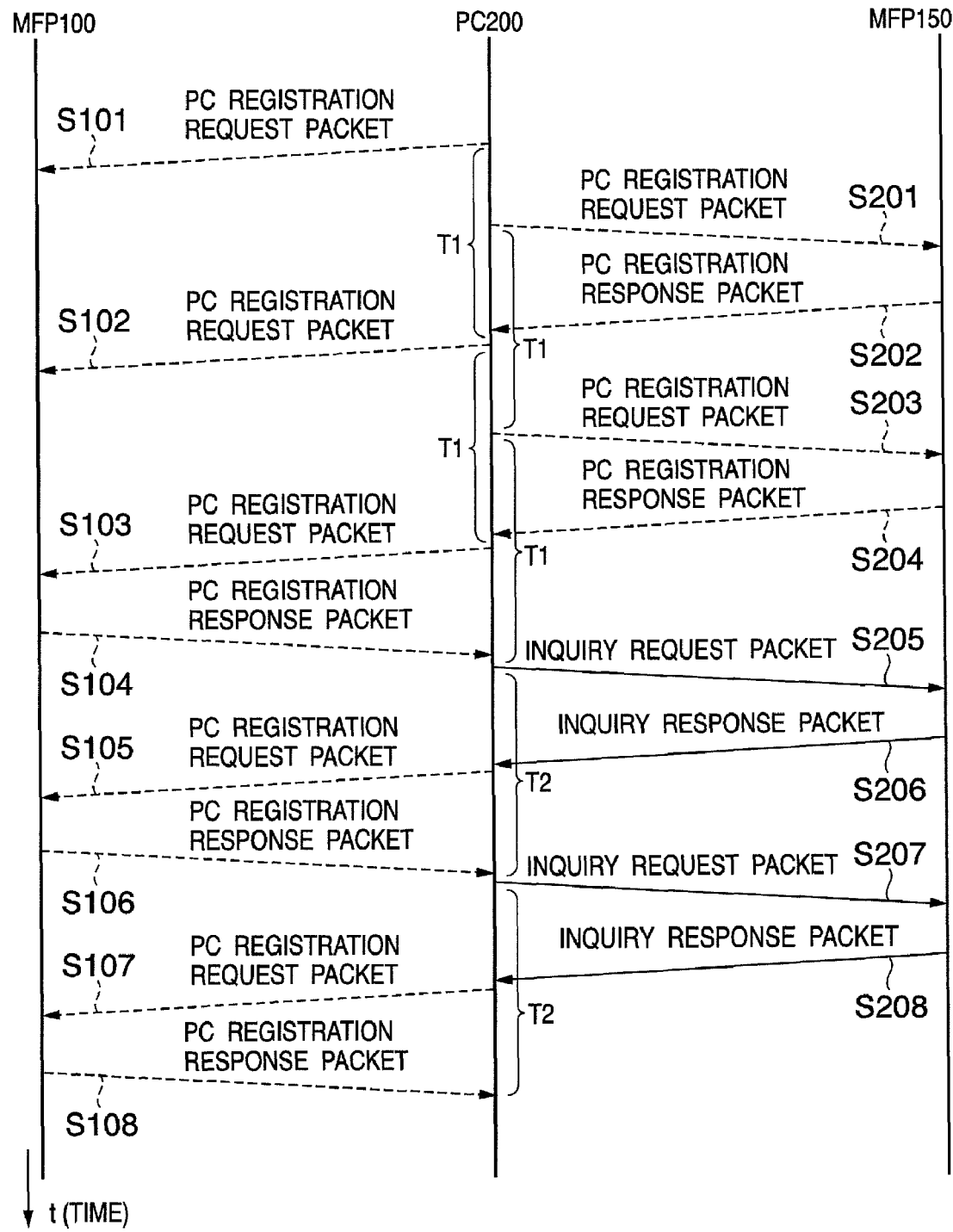
FIGS. 12A and 12B are flowcharts showing the flows of a PC registration request packet and inquiry request packet which an information terminal apparatus (PC) 200 transmits to MFPs 100 and 150 through a network to execute a push scan service.
Figure 12B:
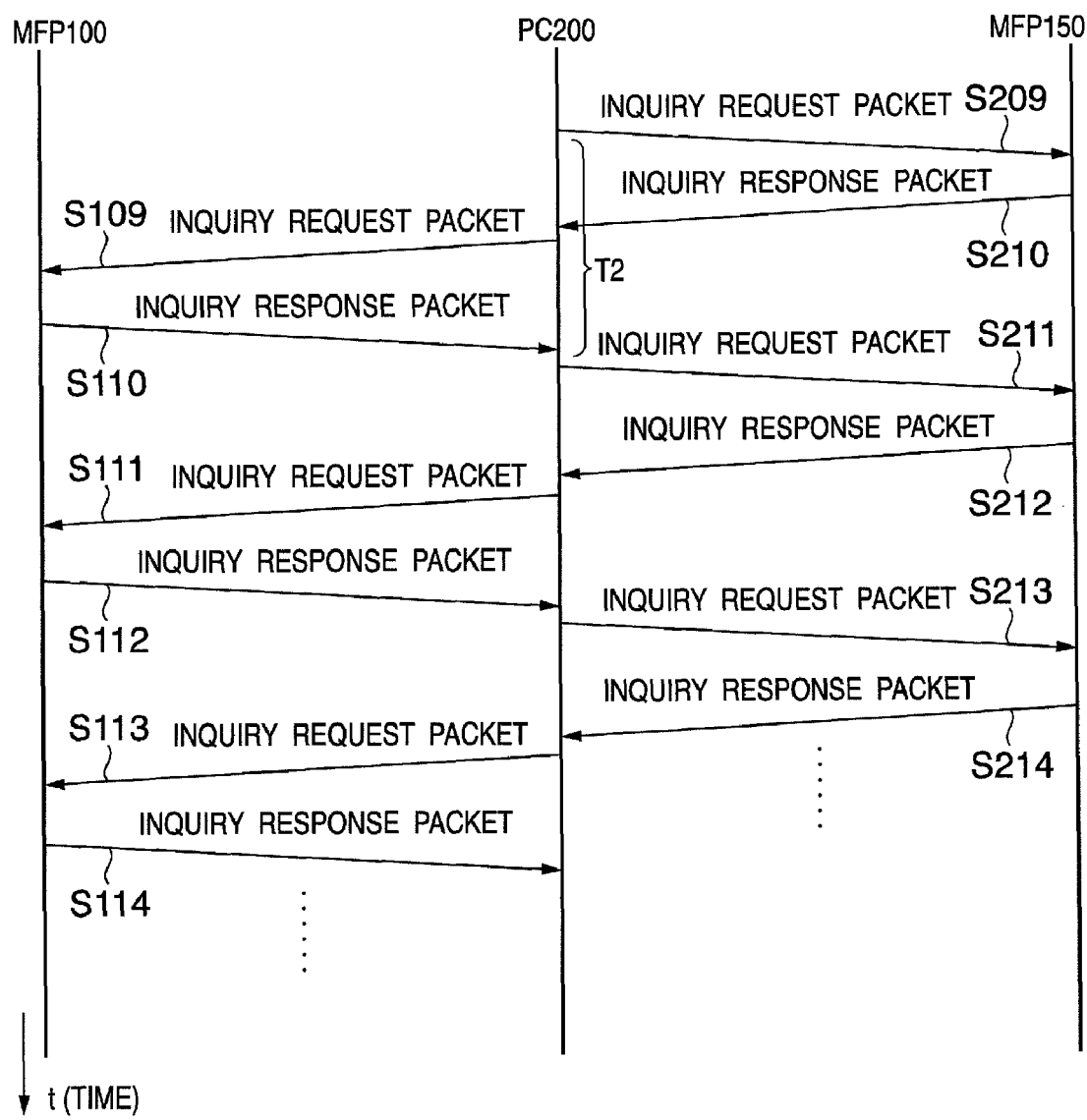

FIGS. 12A and 12B are flowcharts showing the flows of PC registration request packets and inquiry request packets which the information terminal apparatus (PC) 200 transmits to the MFPs 100 and 150 through the network 310 to execute a push scan service.

Assume that printer drivers, scanner drivers, applications, and the like for the MFPs 100 and 150 are installed in the disk unit 202 of the information terminal apparatus 200, as shown in FIG. 5. Note that, as shown in FIG. 5, on the setting window 500 on the information terminal apparatus 200, both the check boxes 501 and 502 concerning the MFPs 100 and 150 are checked in advance.

When an application in the information terminal apparatus 200 is activated, the information terminal apparatus 200 transmits a PC registration request packet to the MFP 100 through a network communication unit 207, a network connection unit 208, and the network 310 under the control of the CPU 201 (S101). The information terminal apparatus 200 also transmits a PC registration request packet to the MFP 150 (S201).

In this case, the information terminal apparatus 200 starts a timer 212 to measure a first cycle (T1). Assume that the response code 706 is "02" indicating NG because, for example, the MFP 150 is executing another process or cannot register the information terminal apparatus 200 in spite of receiving a PC registration response packet from the MFP 150 (S202).

Assume also that the information terminal apparatus 200 receives no PC registration response packet from the MFP 100 upon the lapse of the first cycle. The cause of this may be that the MFP 100 is not activated or the information terminal apparatus 200 cannot properly communicate with the MFP 100 through the network 310.

The information terminal apparatus 200 transmits PC registration request packets to the MFPs 100 and 150 again (S102 and S203) and measures the lapse of the first cycle. Assume that the information terminal apparatus 200 receives a PC registration response packet from the MFP 150 (S204), and the response code 706 is "01" indicating OK. At this point of time, the MFP 150 registers the address information, computer name, and login name of the information terminal apparatus 200 (S704 in FIG. 20 to be described later). On the other hand, the information terminal apparatus 200 receives no PC registration response packet from the MFP 100 upon the lapse of the first cycle from step S102, and hence transmits a PC registration request packet to the MFP 100 again (S103). The information terminal apparatus 200 then measures the lapse of the first cycle again.

The information terminal apparatus 200 transmits an inquiry request packet to the MFP 150 to inquire whether the MFP has executed push scan operation for the information terminal apparatus 200 selected as a destination (S205). The information terminal apparatus 200 further measures the lapse of a second cycle (T2) by using the timer 212. The MFP 150 transmits an inquiry response packet having the response code 706 with "03" while the MFP does not execute push scan operation for the information terminal apparatus 200 selected as a destination (S206).

The information terminal apparatus 200 transmits an inquiry request packet to the MFP 150 every time the second cycle elapses (S207, S209, S211, and S213). The MFP 150 transmits an inquiry response packet having the response code 706 with "03" for every reception of an inquiry request packet until the execution of push scan for the information terminal apparatus 200 or another apparatus selected as a destination (S208, S210, S212, and S214).

Assume that although the information terminal apparatus 200 receives a PC registration response packet from the MFP 100 in response to the PC registration request packet transmitted in step S103, the response code 706 is "02" indicating NG (S104). The information terminal apparatus 200 transmits a PC registration response packet to the MFP 100 upon every lapse of the first cycle until the reception of a PC registration response packet having the response code 706 with "01" indicating OK (S105 and S107).

Assume that the response code 706 of the PC registration response code received in step S106 is "02", but the response code 706 of the PC registration response packet received in step S108 is "01". As in steps S205 to S211, the information terminal apparatus 200 also transmits an inquiry request packet to the MFP 100 for every second cycle to inquire whether the MFP has executed push scan for the information terminal apparatus 200 selected as a destination (S109, S111, and S113). Assume that in the case shown in FIG. 12, the response code 706 of the inquiry response packet from the MFP 100 is also "03" (S110, S112, and S114).

This exemplifies the case wherein the information terminal apparatus 200 transmits a PC registration request packet to each of the MFPs 100 and 150 for every first cycle, and transmits an inquiry request packet for every second cycle if it receives a PC registration response packet having the response code "01". Information terminal apparatuses 300, 301, and 302 operate in the same manner. However, even after the information terminal apparatus 200 transmits a PC registration request packet to each MFP for every first cycle, and receives a PC registration response packet having the response code "01", the apparatus may transmit an inquiry request packet for every first cycle in the same manner as described above. Even if an MFP other than the MFPs 100 and 150 connects to the network 310, and another MFP is checked on the setting window 500, the same operation is performed as described above except that the number of destinations for each request packets increases.

In addition, the information terminal apparatus 200 may transmit a PC registration request packet again, when receiving no PC registration response packet from the MFP 100, at intervals different from intervals of the first cycle. The cause of this may be that the MFP 100 is not activated, or the information terminal apparatus 200 cannot properly communicate with the MFP 100 through the network 310. For this reason, transmitting a PC registration response packet at intervals longer than intervals of the first cycle makes it possible to reduce the number of retries.

The following describes the process from the activation of the information terminal apparatus 300 to the execution of a push scan service during the interval in which the information terminal apparatus 200 transmits an inquiry request packet to the MFP 100 for every second cycle as described above.

Figure 13A:
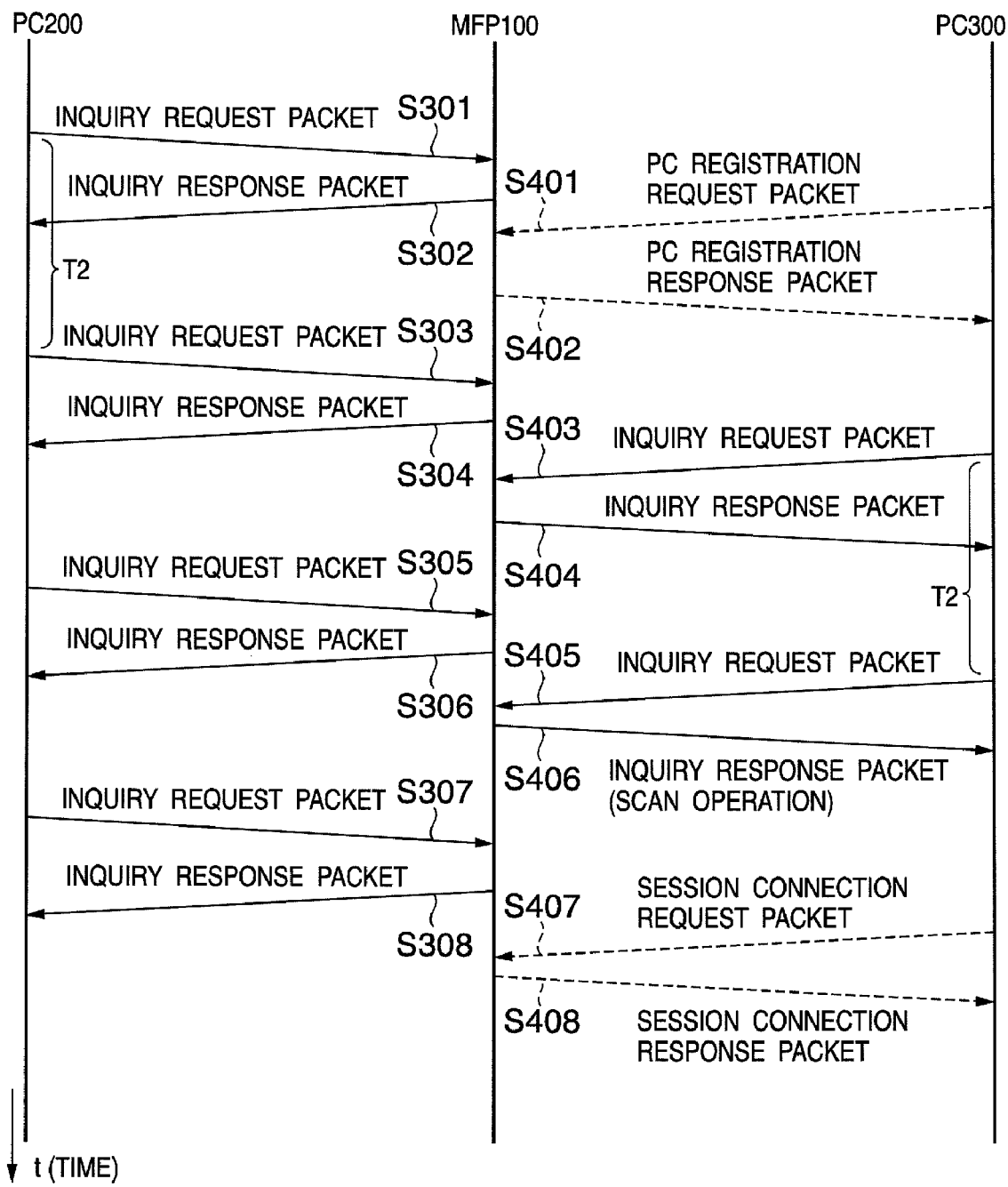
FIGS. 13A and 13B are flowcharts showing the flows of packets to be exchanged to allow the MFP 100, the information terminal apparatus (PC) 200, and an information terminal apparatus (PC) 300 to communicate with each other through the network and execute a push scan service.
Figure 13B:
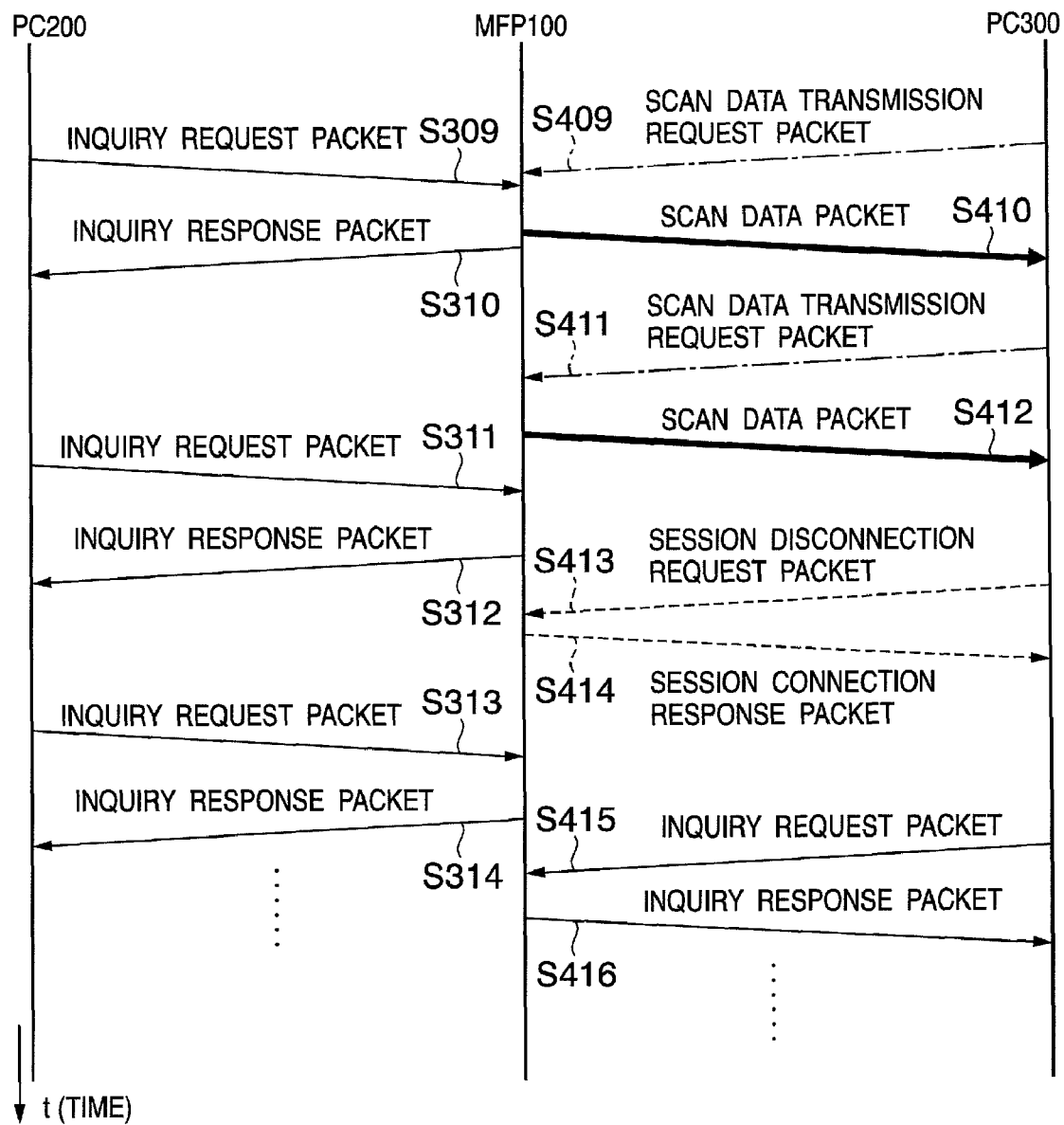

FIGS. 13A and 13B are flowcharts showing a procedure in which the MFP 100, information terminal apparatus (PC) 200, and information terminal apparatus (PC) 300 communicate through the network 310 to exchange packets for the execution of a push scan service.

Following step S114 in FIG. 12, the information terminal apparatus 200 transmits an inquiry request packet for every second cycle (T2) (S301). At this point of time, since the MFP 100 has not executed push scan, and the scanner unit 102 is not in use, the MFP 100 transmits an inquiry response packet with the response code "03" to the information terminal apparatus 200 (S302).

Subsequently, upon receiving the inquiry response packet transmitted in step S302, the information terminal apparatus 200 transmits an inquiry request packet again after the lapse of the second cycle (S303 and S305). Every time receiving the inquiry request packet 600, the MFP 100 transmits an inquiry response packet to the information terminal apparatus 200 in the same manner as in step S302 if push scan has not been executed and the scanner unit 102 is not in use (S304 and S306).

At the time of activation of an application in the information terminal apparatus 300, the information terminal apparatus 300 transmits, to the MFP 100, a PC registration request packet to which a computer name on the network 310 and the login name of the user who is currently logging in to the information terminal apparatus 300 are attached (S401). The information terminal apparatus 300 then measures the lapse of the first cycle by using the timer.

The CPU 105 of the MFP 100 receives a PC registration request packet through the network 310, network connection unit 111, and network communication unit 110. At this time, if the MFP 100 can register the information terminal apparatus 300, the MFP 100 transmit a PC registration response packet with the response code "01" to the information terminal apparatus 300 (S402). The MFP 100 also stores the computer name and login name attached to the received PC registration request packet in a storage area of a predetermined storage unit such as the work memory 107.

In accordance with this operation, the information terminal apparatus 300 transmits an inquiry request packet to inquire whether push scan operation has been executed, e.g., whether a scan key 404, color start key 406, or monochrome start key 407 of the MFP 100 has been operated (S403). The information terminal apparatus 300 transmits this PC registration request packet for every first cycle. FIG. 13 shows a case wherein the process shifts to the transmission of an inquiry request packet because the information terminal apparatus 300 receives a PC registration response packet (response code "01") in response to one PC registration request packet. The information terminal apparatus 300 transmits an inquiry request packet for every second cycle by timer monitoring (S403 and S405). Every time receiving an inquiry request packet, the MFP 100 transmits an inquiry response packet with the response code "03" if no push scan operation has been executed and the scanner unit 102 is not in use. The response code of an inquiry response packet to the inquiry request packet in step S403 is "03" (S404).

That is, this code indicates that the MFP 100 has not executed push scan operation for the information terminal apparatus 300 selected as a destination at this point of time. If the MFP 100 performs push scan for the information terminal apparatus 300 as a destination until a packet is transmitted again in step S405 upon lapse of the second cycle after the packet is transmitted in step S403, the MFP 100 transmits an inquiry response packet (response code "04") (step S406). The information terminal apparatus 300 then transmits a session connection request packet for requesting session connection to the MFP 100 to receive, in accordance connection TCP, the image data generated by making the MFP 100 read a document (S407).

The MFP 100 transmits a session connection response packet with the response code "01" to the information terminal apparatus 300 if the MFP is session-connecting to another information terminal apparatus and cannot session-connect to the information terminal apparatus 300 (S408). Until now, the information terminal apparatus 300 and the MFP 100 have transmitted/received packets in accordance with UDP, but will transmit/receive packets in accordance with TCP from now on till session disconnection. TCP defines an Ack response for notifying a destination of the reception of the packet and also defines a retransmission procedure, and is higher in reliability than UDP. TCP is therefore suitable for data transmission/response actually desired by the user, e.g., image data transmission/response.

The information terminal apparatus 300 transmits an image data request packet for requesting the MFP 100 to transmit generated image data (S409). The MFP 100 sequentially stores image data in the image data portion 811 of the image data packet 800 and transmits the data to the information terminal apparatus 300 (S410). The information terminal apparatus 300 transmits an image data request packet to the MFP 100 until the end of the transmission of image data (S411). The MFP 100 transmits the subsequent image data packet 800 to the information terminal apparatus 300 in the same manner as in step S410 (S412).

Upon determining the end of the transmission of image data because, for example, the image data packet transmitted in step S412 contains information indicating the end of the transmission of image data, the information terminal apparatus 300 transmits a session disconnection request packet to the MFP 100 (S413). In response to this packet, the MFP 100 transmits a session disconnection response packet (response code "01") to the information terminal apparatus 300 (S414). The information terminal apparatus 300 starts the timer again and transmits an inquiry packet to the MFP 100 for every second cycle (S415). If MFP 100 has not executed push scan and the scanner unit 102 is not in use, the MFP 100 transmits an inquiry response packet (response code "03") to the information terminal apparatus 300 (S416).

On the other hand, the information terminal apparatus 200 transmits an inquiry request packet to the MFP 100 for every second cycle (S307, S309, S311, and S313). The MFP 100 transmits an inquiry response packet (response code "05") in response to an inquiry from the information terminal apparatus 200 in the interval from the start of execution of push scan for the information terminal apparatus 300 as a destination to the end of transmission of image data and session disconnection (S308, S310, and S312). After the disconnection of session with the information terminal apparatus 300 in step S414, the MFP 100 transmits an inquiry response packet (response code "03") to the information terminal apparatus 200 again (S314).

Figure 14A:
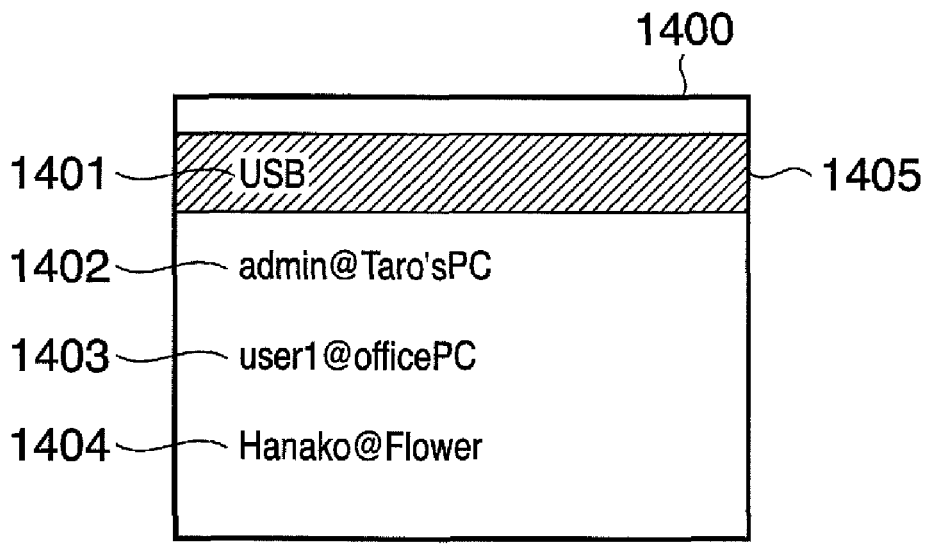
FIGS. 14A and 14B are views showing an information terminal apparatus selection window for selecting an information terminal apparatus as a scan data destination which is displayed on the LCD screen of the MFP at the time of execution of push scan.
Figure 14B:
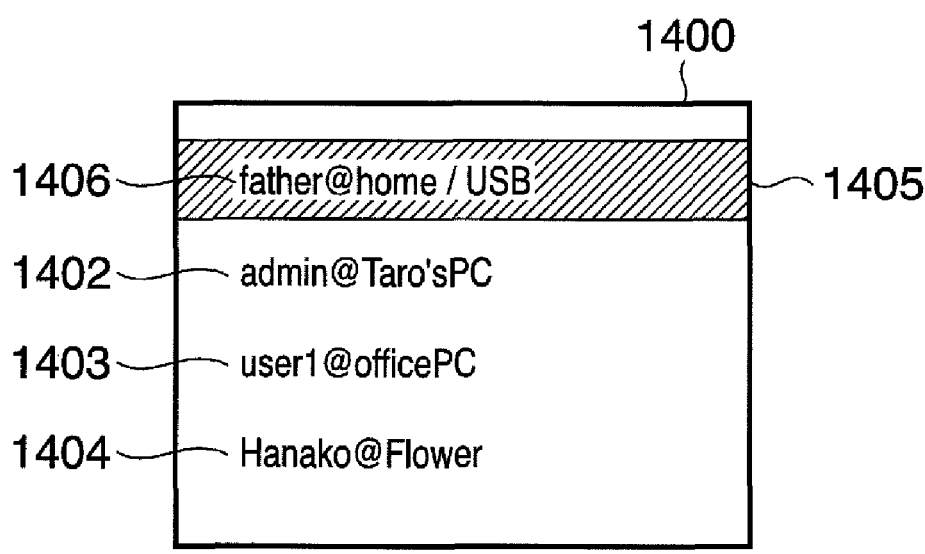

FIGS. 14A and 14B are views showing an information terminal apparatus selection window for selecting an information terminal apparatus at a scan data destination which is displayed on the LCD screen of an MFP at the time of execution of push scan. When the user pushes the scan key 404 on the operation panel of the MFP, the display of the LCD screen 401 switches to the display shown in FIG. 14A or 14B.

Referring to FIG. 14A, reference numeral 1400 denotes an information terminal apparatus selection window displayed on an LCD screen 401; and 1401, USB connection information terminal apparatus information which is displayed when an information terminal apparatus connects to a USB connection unit 211. If a given information terminal apparatus connects to the MFP 100 through a USB, since the MFP 100 does not receive the computer name and address information of the information terminal apparatus through a PC registration request packet, the MFP 100 displays the apparatus so as to discriminate it from the information terminal apparatus connecting to the network 310, as indicated by reference numeral 1400. In addition, the MFP 100 may register the computer name and login name of the information terminal apparatus connecting by USB in accordance with a procedure of transmitting a packet equivalent to a PC registration request packet from the information terminal apparatus connecting to the MFP 100 through the USB.

If the information terminal apparatus connecting by USB has the computer name "home" and the login name "father", the information terminal apparatus selection window 1400 displays "father@home/USB", as indicated by reference numeral 1406 in FIG. 14B. This makes it possible to explicitly indicate that the apparatus connects by USB, and to allow the user to know the computer name and the login name.

Referring to FIGS. 14A and 14B, reference numerals 1402 to 1404 each denote the computer names and login names of an information terminal apparatus which connects to the MFP 100 through the network 310, and has received a PC registration request packet (response code "01") upon transmitting a PC registration request packet. For example, reference numeral 1402 denotes the computer name and login name of the information terminal apparatus 200; 1403, the computer name and login name of the information terminal apparatus 300; and 1404, the computer name and login name of the information terminal apparatus 301. Reference numeral 1405 denotes a highlighting display portion, which is moved up and down by an arrow key 410. When the user pushes a decision key 412, the user selects, as a destination, the computer name and login name highlighted/displayed by the highlighting display portion 1405. In this case, since the information terminal apparatus 300 is selected, the highlighting display portion 1405 highlights/displays the computer name and login name 1403.

Figure 15:
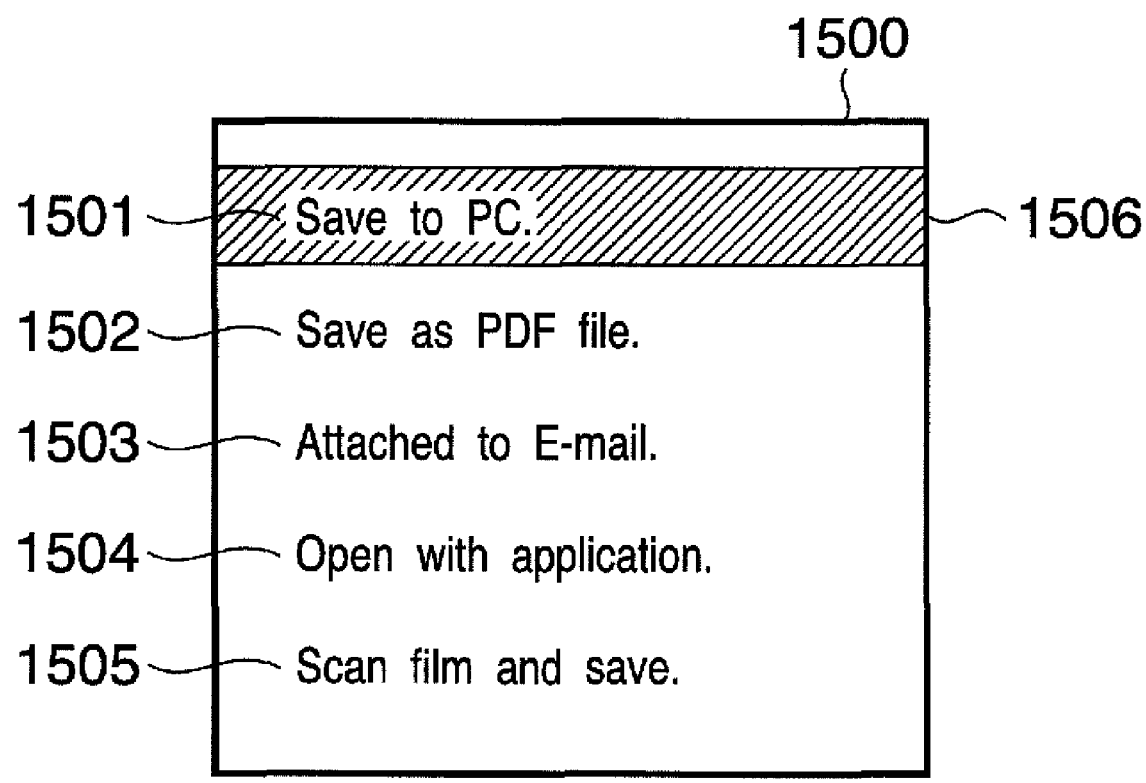
FIG. 15 is a view showing a scan data processing selection window which an LCD screen 401 of the MFP displays to allow a user to select a scan data processing method.

FIG. 15 is a view showing a scan data processing selection window which is displayed on the LCD screen 401 of the MFP to allow the user to select a scan data processing method.

When the user presses the decision key 412 while the information terminal apparatus selection window shown in FIGS. 14A and 14B is displayed, the display of the LCD screen 401 switches to the scan data processing selection window shown in FIG. 15.

Referring to FIG. 15, reference numeral 1500 denotes a scan data processing selection window; and 1501 to 1505, indications on the scan data processing selection window which are displayed to allow the user to select how to process scan data. That is, the indication 1501 indicates the processing of making the information terminal apparatus selected as a destination save data in a predetermined file form. The indication 1502 indicates the processing of making the information terminal apparatus selected as a destination save data upon converting it into a PDF file. The indication 1503 indicates the processing of making the information terminal apparatus selected as a destination save data upon converting it into a JPEG file with a higher compression ratio so as to attach the file to electronic mail software. The indication 1504 indicates the processing of making the information terminal apparatus selected as a destination automatically activate an application to open an image file after receiving scan data. The indication 1505 indicates the processing of making the information terminal apparatus selected as a destination by scanning a film store the scan data in a predetermined file form. Reference numeral 1506 denotes a highlighting display portion.

When the user presses the decision key 412, the processing highlighted/displayed by the highlighting display portion 1506 is selected. Pressing the decision key 412 during the display of the window shown in FIG. 15 finishes the selection of an information terminal apparatus as a destination and a scan data processing method. Upon receiving an inquiry request packet from the information terminal apparatus 300 selected as a destination, the MFP transmits an inquiry response packet (response code "03") to the information terminal apparatus 300, and the scanner unit 102 starts reading a document.

FIG. 16 is a view showing how an MFP stores the information of an information terminal apparatus in a predetermined area in a work memory on the basis of a PC registration request packet received from the information terminal apparatus.

Referring to FIG. 16, reference numeral 1600 denotes a predetermined area in a work memory 107; 1601, a storage area for the computer name and login name of each information terminal apparatus from which a PC registration request packet is received; and 1602, a storage area for the address of each information terminal apparatus from which a PC registration request packet is received. In the case shown in FIG. 16, an IP address is stored as address information. Address information stored in the address storage area 1602 may be a MAC address.

Reference numeral 1603 denotes the computer name and login name of an information terminal apparatus connecting to the MFP through a USB; and 1604, information indicating that the information terminal apparatus connects by USB without having any IP address information owing to USB connection. If the information terminal apparatus which connects by USB is selected as shown in FIGS. 14A and 14B, since only one information terminal apparatus generally connects by USB, the pieces of information denoted by reference numerals 1603 and 1604 may be omitted. Alternatively, only one of the pieces of information 1603 and 1604 may be stored.

Reference numeral 1605 denotes the computer name and login name of the information terminal apparatus 200 which are read out from the area 606 of the received PC registration request packet. The information after "@" indicates the computer name of the information terminal apparatus 200. The information before "@" indicates the login name. Reference numeral 1606 denotes the address information of the information terminal apparatus 200 which is read out from the area 602 of the received PC registration request packet; and 1607, the computer name and login name of the information terminal apparatus 300 which are read out from the area 606 of the received PC registration request packet. Likewise, the information after "@" indicates the computer name of the information terminal apparatus 300, and the information before "@" indicates the login name. Reference numeral 1608 denotes the address information of the information terminal apparatus 300 which is read out from the area 602 of the received PC registration request packet; and 1609, the computer name and login name of the information terminal apparatus 300 which are read out from the area 606 of the received PC registration request packet. The information after "@" indicates the computer name of the information terminal apparatus 301, and the information before "@" indicates the login name. Reference numeral 1610 denotes the address information of the information terminal apparatus 301 which is read out from the area 602 of the received PC registration request packet.

Figure 17:
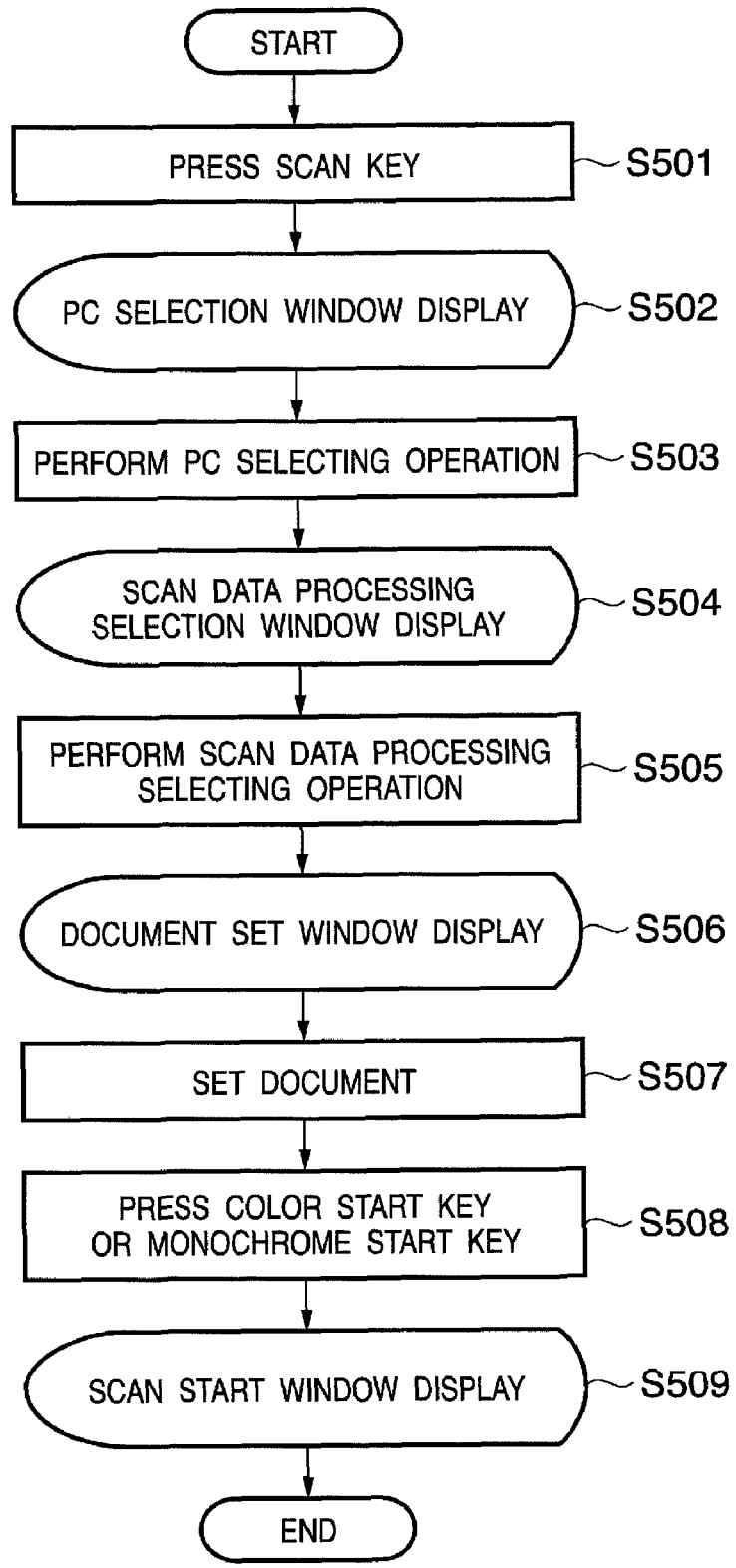
FIG. 17 is a flowchart showing an operation sequence executed by the MFP to execute push scan by using an information terminal apparatus selection window 1400, scan data processing selection window 1500, and operation panel 400.

FIG. 17 is a flowchart showing an operation sequence which an MFP performs to execute push scan by using the information terminal apparatus selection window 1400, the scan data processing selection window 1500, and an operation panel 400. Assume that the MFP 100 is in an idle state, i.e., is not executing any service, at first.

When the user presses the scan key 404 (S501), the LCD screen 401 displays the information terminal apparatus selection window 1400 shown in FIGS. 14A and 14B (S502). The operator of the MFP 100 selects an information terminal apparatus as the destination of scan data by operating the arrow key 410 while viewing the information terminal apparatus selection window 1400. The operator performs this operation by moving the highlighting display portion 1405 to the computer name and login name of an information terminal apparatus to which the operator wants to transmit scan data and pressing the decision key 412 (S503).

Subsequently, the LCD screen 401 displays the scan data processing selection window 1500 shown in FIG. 15 (S504). The operator of the MFP 100 selects a scan data processing method by operating the arrow key 410 while viewing the scan data processing selection window 1500. The operator performs this operation by moving the highlighting display portion 1506 to one of the scan data processing methods 1502 to 1505 and pressing the decision key 412 (S505).

The LCD screen 401 displays to prompt the user to set a document to be read on the document table (S506). The operator of the MFP 100 sets the document to be read on the document table (S507). If the user wants to read the document in the color mode, he/she presses the color start key 406. If the user wants to read the document in the monochrome mode, he/she presses the monochrome start key 407 (S508).

With the above operation, the processing is terminated, and the LCD screen 401 displays that scan starts (S509).

Figure 18A:
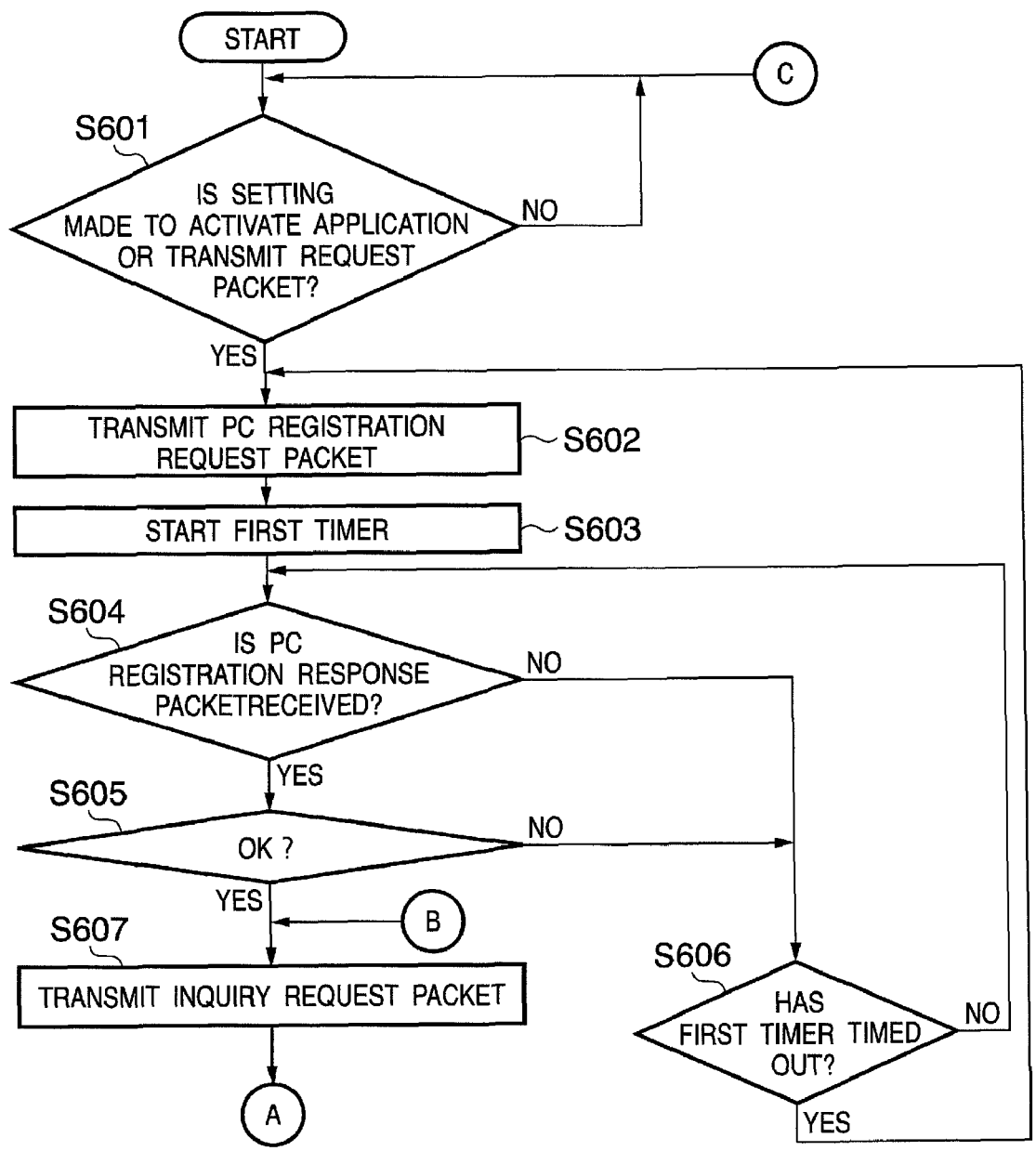
FIGS. 18A and 18B are flowcharts showing an operation sequence executed by the MFP to execute push scan by using the information terminal apparatus selection window 1400, scan data processing selection window 1500, and operation panel 400.
Figure 18B:
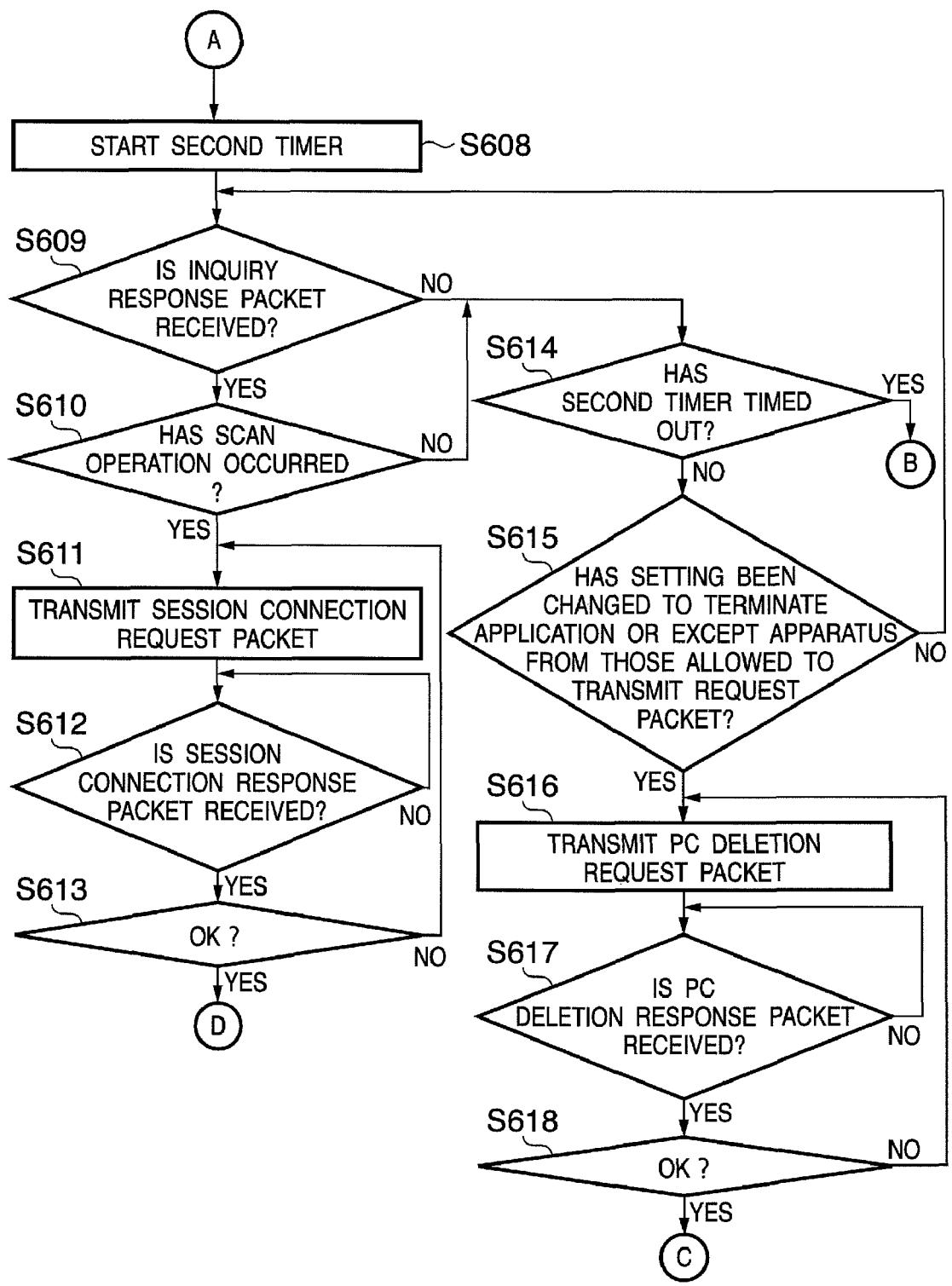

FIGS. 18A, 18B and 19 are flowcharts showing the details of the procedures performed by the information terminal apparatus in the flowcharts shown in FIGS. 12A, 12B and 13.

First of all, as shown in FIG. 18A, the information terminal apparatus checks whether an application is activated or the check box of the MFP 100 or 200 on the request packet transmission setting window is checked (S601). If YES, the information terminal apparatus 300 transmits a PC registration request packet to the MFP whose check box is checked or has been checked in advance (S602).

The information terminal apparatus then starts the timer 212 to measure the first cycle (S603) and waits for the reception of a PC registration response packet (S604). Upon receiving the packet, the information terminal apparatus checks whether the response code is "01" (S605). If YES, the information terminal apparatus finishes transmitting a PC registration request packet to the MFP which has transmitted the PC registration response packet, and the process shifts to the transmission of an inquiry request packet (S607). While waiting for the reception of a PC registration response packet, the information terminal apparatus checks timeout of the first cycle (S606). In this case, if there is an MFP whose first cycle has elapsed before the reception of a PC registration response packet or there is an MFP which has replied a PC registration response packet (response code "02") and the first cycle has elapsed, the information terminal apparatus transmits a PC registration request packet to the MFP again (S602).

In the case shown in FIGS. 12A and 12B, the information terminal apparatus 200 transmits a PC registration request packet to the MFP 100 five times for every first cycle (S101, S102, S103, S105, and S106). The MFP 100 transmits no PC registration response packet until the lapse of the first cycle in the first two transmissions of these transmissions, and the information terminal apparatus receives a PC registration response packet (response code "02") in the subsequent two transmissions (S104 and S106). The information terminal apparatus receives a PC registration response packet (response code "01") at the fifth transmission (S108). On the other hand, the information terminal apparatus transmits a PC registration request packet to the MFP 150 twice for every first cycle (S201 and S203). The information terminal apparatus receives a PC registration response packet (response code "02") at the first reply of these replies (S202), and receives a PC registration response packet (response code "01") at the second reply (S204). In the case shown in FIG. 13, the information terminal apparatus 300 transmits a PC registration request packet to the MFP 100 once (S401), and receives a PC registration response packet (response code "01") as a response to the request packet (S402).

The inquiry request packet transmitted in step S607 is a packet for inquiring whether push scan has been executed. After transmitting the inquiry request packet (S607), the information terminal apparatus sets the timer 212 to measure the lapse of the second cycle (S608). The information terminal apparatus then waits for the reception of an inquiry response packet (S609). In this wait state, the information terminal apparatus checks whether the second cycle has elapsed (S614). If the second cycle elapses without reception of an inquiry response packet, or the second cycle elapses when the response code of a received inquiry response packet is not "04", the information terminal apparatus transmits a PC registration request packet to the MFP again (S607).

In the case shown in FIG. 12, the information terminal apparatus 200 transmits an inquiry request packet to the MFP 100 three times for every second cycle (S109, S111, and S113). As responses to these transmissions, the information terminal apparatus receives an inquiry response packet (response code "03") three times (S110, S112, and S114). Likewise, the information terminal apparatus 200 transmits an inquiry request packet to the MFP 150 five times for every second cycle (S205, S207, S209, S211, and S213). As responses to these transmissions, the information terminal apparatus receives an inquiry response packet (response code "03") five times (S206, S208, S210, S212, and S214).

Subsequently, in the case shown in FIGS. 13A and 13B, the information terminal apparatus 200 keeps transmitting an inquiry request packet to the MFP 100 for every second cycle (S301, S303, S305, S307, S309, and S311). The information terminal apparatus receives an inquiry response packet with the response code "03" from the MFP 100 three times with respect to these transmissions (S302, S304, and S306). Thereafter, the information terminal apparatus receives an inquiry response packet with the response code "05" from the MFP 100 (S308, S310, and S312). This code means that push scan is executed between the MFP 100 and the information terminal apparatus 300.

In the case shown in FIGS. 13A and 13B, the information terminal apparatus 300 transmits an inquiry request packet to the MFP 100 twice for every second cycle (S403 and S405). The information terminal apparatus receives an inquiry response packet with the response code "03" at the first transmission of these transmissions (S404). In this case, if the user performs the operation shown in FIG. 17 with respect to the MFP 100 and selects the information terminal apparatus 300 as the destination of scan data until the transmission of the second inquiry request packet (YES in step S610), the information terminal apparatus transmits a session connection request packet to the MFP 100 (S611). The information terminal apparatus then waits for the reception of a session connection response packet (S612), and checks a response code if the apparatus receives the packet (S613). If the response code is "01", the process shifts to the flowchart of FIG. 19.

If it is determined in step S614 that the second cycle has not timed out (NO in step S614), the information terminal apparatus 200 or 300 checks whether a check box on the selection window 1500 is unchecked or an application is terminated by predetermined operation (S615). If YES, the information terminal apparatus 200 or 300 which has performed this operation transmits a PC deletion request packet for requesting the MFP 100 or 150 to delete terminal information registered therein (S616). The information terminal apparatus then waits for the reception of a PC deletion response packet from the MFP to which the apparatus has transmitted the PC deletion request packet (S617). When receiving a PC deletion response packet, the information terminal apparatus further checks the response code of the packet (S618). If the response code is "01" (YES in step S618), the process returns to step S601. Otherwise (NO in step S618), the information terminal apparatus starts the timer 212 and transmits a PC deletion request packet for every fourth cycle until receiving a PC deletion response packet with the response code "01" (S616).

The flowchart of FIG. 19 will be described next.

The information terminal apparatus 300 activates the scanner driver installed in the disk unit (S619), and starts the timer to measure the third cycle (S620). The scanner driver transmits a request packet for starting document reading operation to the MFP 100 through the network 310 (S620a). After the lapse of a predetermined cycle, the scanner driver transmits an image data request packet to the MFP 100 through the network 310 (S621).

The scanner driver then waits for the reception of the image data packet 800 from the MFP 100 in response to the image data request packet (S622). Upon receiving this packet, the scanner driver waits for the reception of information indicating the end of the transmission of image data (S623). If the scanner driver receives no notification of image data transmission end (NO in step S623), the process returns to step S621 to repeat the transmission of an image data request packet. In contrast, upon receiving the notification of image data transmission end, the scanner driver transmits a session disconnection request packet to the MFP 100 (S624). The scanner driver then waits for the reception of a corresponding session disconnection response packet (S625).

Upon receiving the packet from the MFP 100, the scanner driver further checks the response code (S626). If the response code is "01" (YES in step S626), the scanner driver activates an application for processing the received image data (S627). Since the received image data is RAW data, the scanner driver executes processing, e.g., integrating overall image data extracted from repeatedly received image data packets and editing the data into a designated file such as a JPEG or PDF file (S628 and S629). After the end of this processing, the information terminal apparatus 300 terminates the push scan processing (S630), and the process returns to step S607.

Steps S621, S622, S624, and S625 in FIG. 19 correspond to steps S409, S410, S411, S412, S413, and S414 in FIG. 13B. Referring to FIG. 13B, the information terminal apparatus 300 transmits an inquiry request packet to the MFP 100 again (S415), and receives an inquiry response packet with the response code "03" from the MFP 100 (S416).

The MFP 100 can also start or restart document reading operation upon reception of an image request packet. In this case, step S620a may be omitted.

Note that while waiting for the reception of an image data packet in step S622, the scanner driver checks timeout of the third cycle (S631), and performs session disconnection processing if timeout has occurred (S632).

Figure 20:
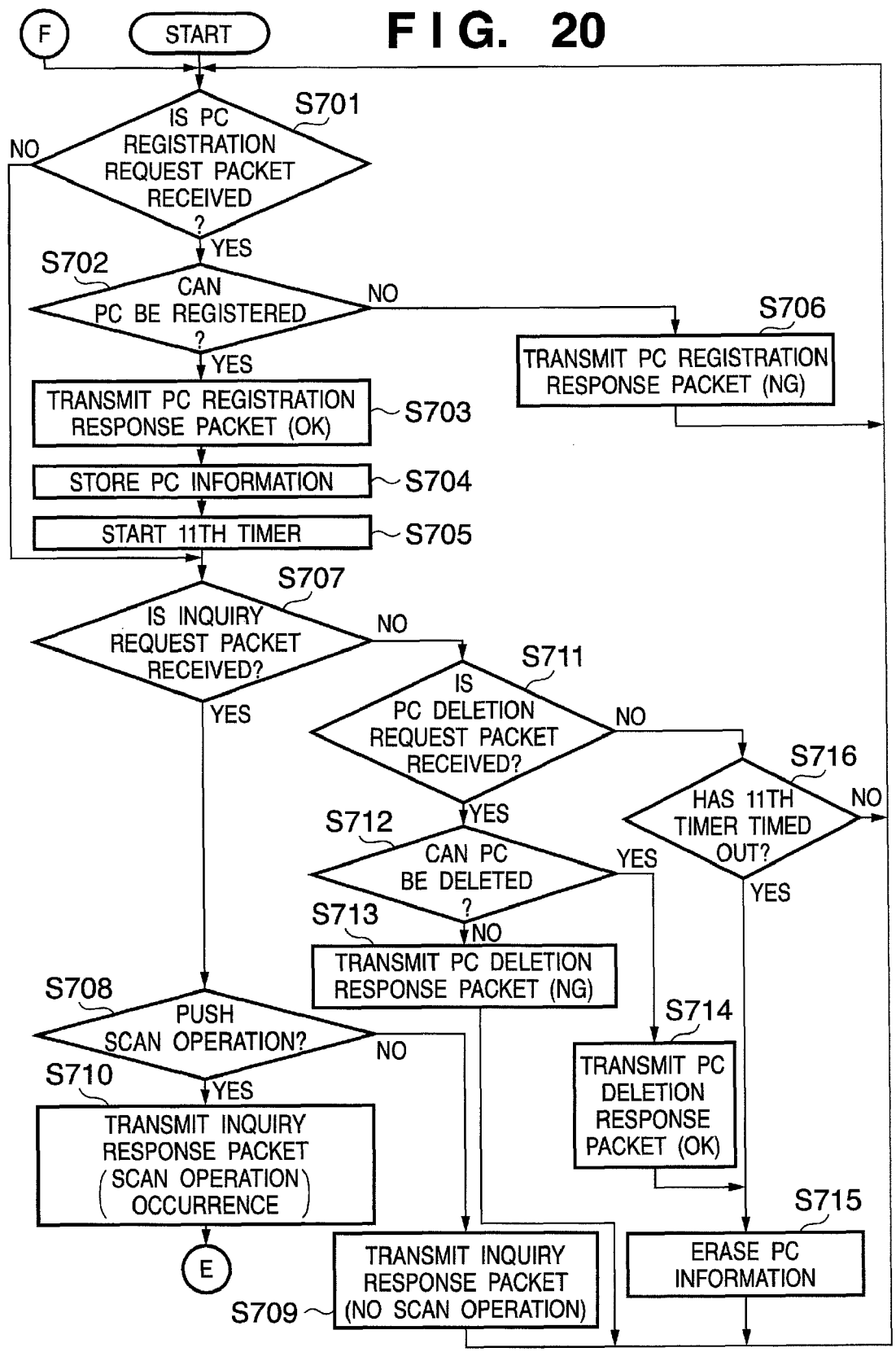
FIG. 20 is a flowchart showing a detailed processing procedure executed by the information terminal apparatus in the flowcharts shown in FIGS. 12 and 13.
Figure 21A:
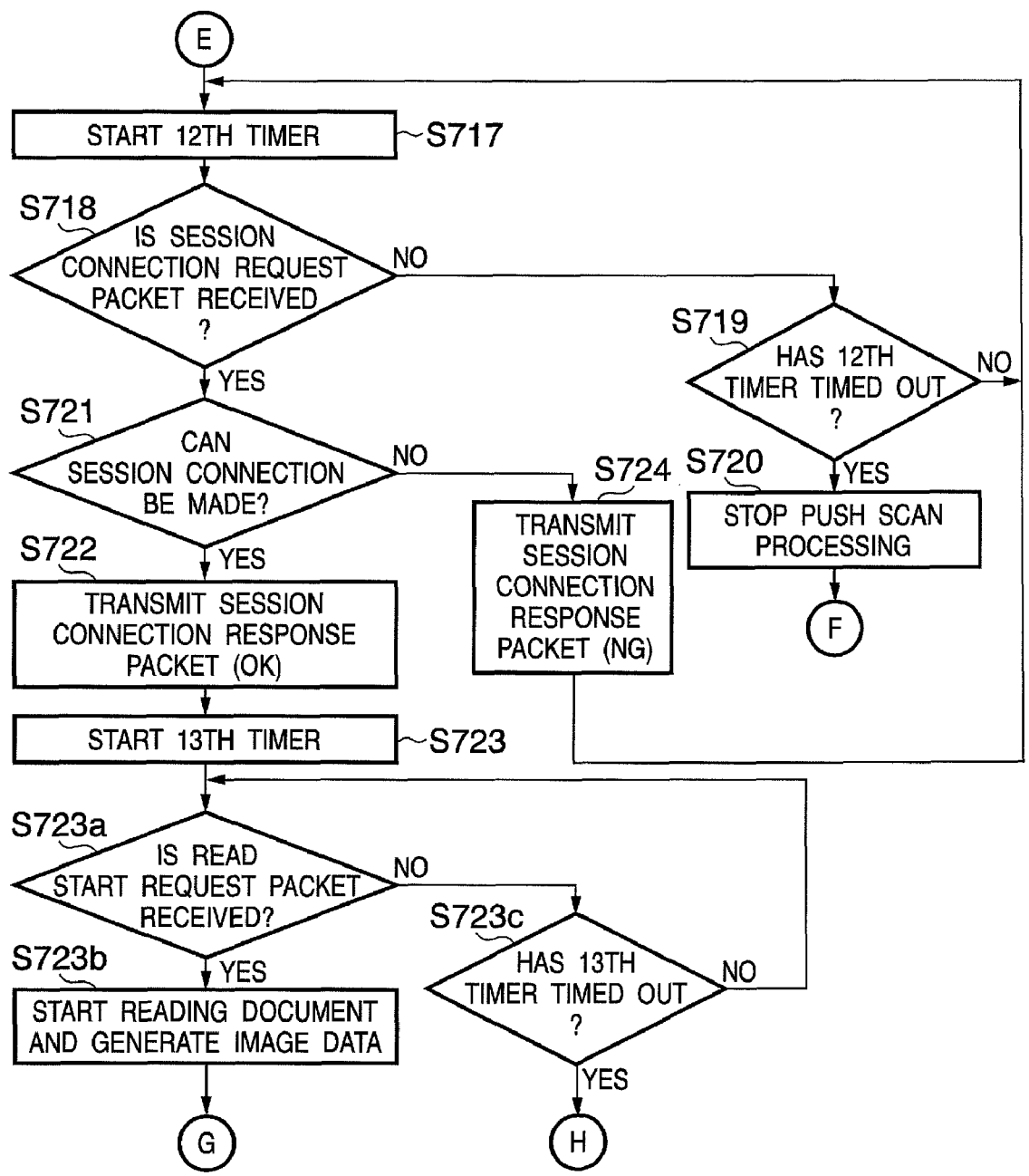
FIG. 21 is a flowchart showing a detailed processing procedure executed by the MFP in the flowcharts shown in FIGS. 12 and 13.
Figure 21B:
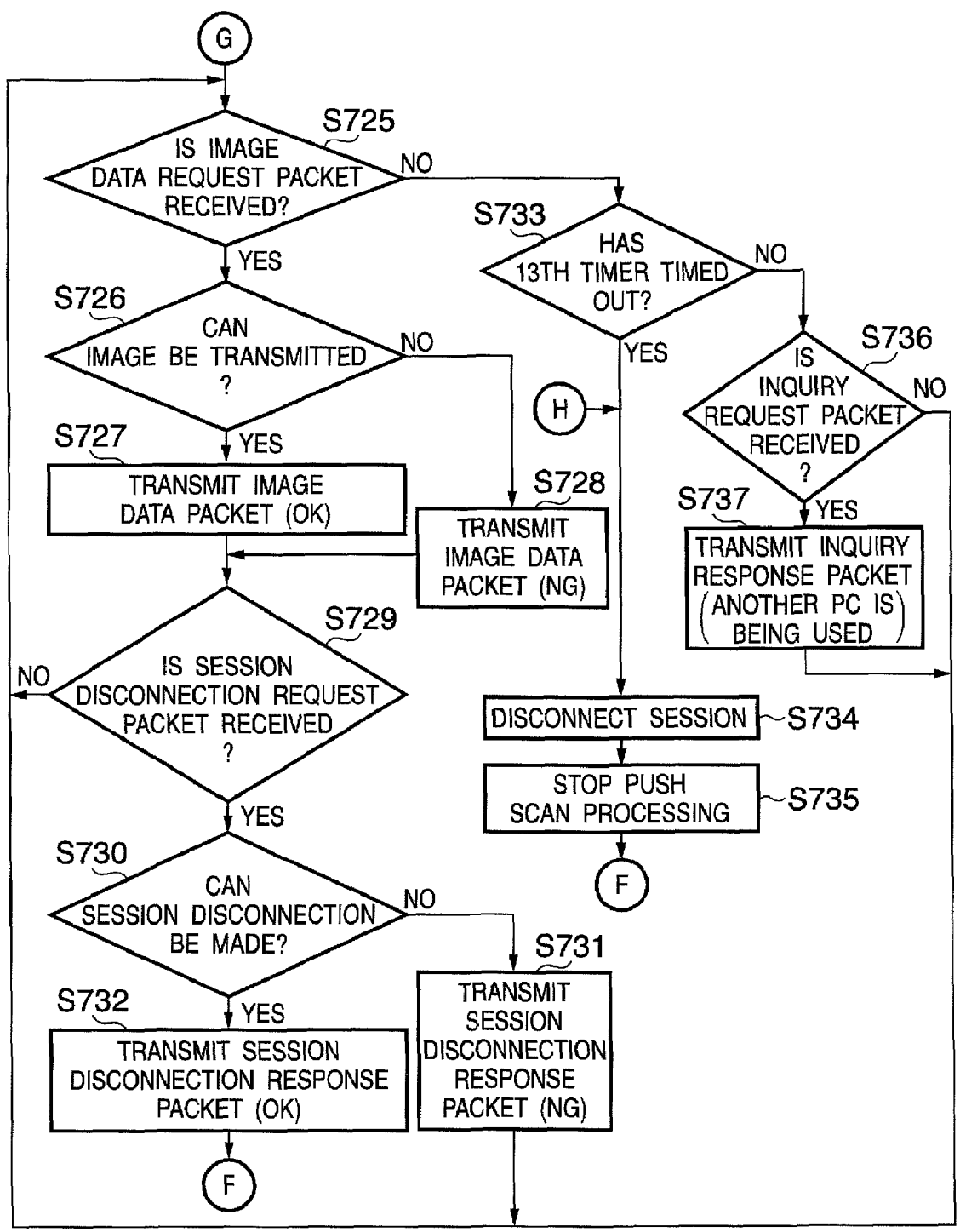

FIGS. 20 and 21 are flowcharts showing the details of procedures by the MFP in the flowcharts shown in FIGS. 12 and 13. A procedure will be described first with reference to the flowchart shown in FIG. 20.

The MFP 100 waits for the reception of a PC registration request packet from an information terminal apparatus through the network 310 (S701). Upon receiving this packet, the MFP 100 checks whether it can register the computer name and login name of the PC registration request packet (S702). If they can be registered (YES in step S702), the MFP 100 transmits a PC registration response packet (response code "01") to the information terminal apparatus as a request source (S703). If they cannot be registered (NO in step S702), the MFP 100 transmits a PC registration response packet (response code "02") to the information terminal apparatus as a request source (S706). Thereafter, the MFP 100 waits for the reception of a PC registration request packet (S701). If receiving no PC registration request packet (NO in step S701), the MFP 100 checks next whether it has received an inquiry request packet (S707).

The MFP 100 stores, in a predetermined area in a work memory 107, the computer name, login name, and address information of the information terminal apparatus which has transmitted a PC registration request packet like that shown in FIG. 16 (S704). Subsequently, the MFP 100 starts a timer 114 to start measuring the 11th time with respect to the registered information terminal apparatus (S705). The MFP 100 waits for the reception of an inquiry request packet from the registered information terminal apparatus (S707). Upon receiving this inquiry packet, the MFP 100 stops time measurement by the timer 114, and checks whether it has executed push scan upon selecting, as a destination, the information terminal apparatus which has transmitted the inquiry request packet (S708).

If push scan has not been executed (NO in step S708), the MFP 100 returns an inquiry response packet (response code "03" or "05") (S709), and starts measuring the 11th time by using the timer 114 again. The process then returns to step S701. Upon receiving an inquiry packet from the registered information terminal apparatus after the start of measurement of the 11th time, the MFP 100 stops time measurement by the timer 114, and checks whether it has executed push scan upon selecting the information terminal apparatus as a destination (S708). If push scan has been executed (YES in step S708), the MFP 100 returns an inquiry response packet (response packet "04") (S710). The process then shifts to the processing in the flowchart shown in FIG. 21.

In contrast, if receiving no inquiry request packet during the measurement of the 11th time (NO in step S707), the MFP 100 checks whether it has received a PC deletion request packet (S711). If receiving a PC deletion request packet (YES in step S711), the MFP 100 stops time measurement by the timer 114 and checks whether it can delete registered information (S712). If the registered information can be deleted (YES in step S712), the MFP 100 returns a PC deletion response packet (response code "01") (S714), and deletes the information of the corresponding information terminal apparatus like that described with reference to FIG. 16 (S715). The process then returns to step S701. In contrast, if the registered information cannot be deleted (NO in step S712), the MFP 100 returns a PC deletion response packet (response code "02") (S713), and starts time measurement by the timer 114 again. The process then returns to step S701.

If receiving neither an inquiry request packet nor a PC deletion request packet (NO in step S711), the MFP 100 further checks whether the 11th time has elapsed (S716). If the 11th time has elapsed (YES in step S716), the MFP 100 deletes the information of the corresponding information terminal apparatus like that described with reference to FIG. 16 (S715). The process then returns to step S701. In contrast, if timeout has not occurred (NO in step S716), the process immediately returns to step S701.

The following procedure will be described with reference to the flowchart of FIG. 21.

The MFP 100 starts measuring the 12th time by starting the timer 114 (S717). In the case shown in FIG. 13, the information terminal apparatus 300 and the MFP 100 communicate with each other by connectionless UDP. However, the communication mode is switched to the connection TCP communication mode to transmit scan data.

The MFP 100 waits for the reception of a session connection request packet from the information terminal apparatus 300 (S718). Upon receiving this packet, the MFP 100 checks whether it can make session connection to the information terminal apparatus 300 (S721). If session connection can be performed (YES in step S721), the MFP 100 transmits a session connection response packet (response code "01") to the information terminal apparatus 300 (S722). In contrast to this, if the MFP 100 cannot make session connection to the information terminal apparatus 300 because the MFP session-connecting to another information terminal apparatus, e.g., the MFP is receiving print data from another information terminal apparatus (NO in step S721), the MFP 100 transmits a session connection response packet (response code "02") to the information terminal apparatus 300 (S724). Thereafter, the process returns to step S717. In contrast, if receiving no session connection request packet from the information terminal apparatus 300 (NO in step S718), the MFP 100 performs time monitoring by measuring the 12th time (S719). If the 12th time has elapsed (YES in step S719), the MFP 100 stops processing for push scan (S720). The process returns to step S701. The cause of this may be that the MFP 100 cannot receive any session connection request packet or the information terminal apparatus cannot transmit any session connection request packet because of some communication trouble between the information terminal apparatus 300 and the MFP 100. In contrast to this, if the 12th time has not elapsed (NO in step S719), the process returns to step S717.

Following step S722, the MFP 100 measures the 13th time by using the timer 114 (S723) and waits for the reception of a read start request packet (S723a). If the MFP 100 receives this packet (YES in step S723a), the scanner unit 102 of the MFP 100 starts reading a document and generates image data (S723b). In contrast, if receiving no read start request packet (NO in step S723a), the MFP 100 monitors the 13th time (S723c). If the 13th time has elapsed (YES in step S723c), the MFP 100 disconnects the session (step S734) and stops push scan processing (S735). The process returns to step S701. In contrast, if the 13th time has not elapsed (NO in step S723c), the process returns to step S723a.

The process then waits for the reception of an image data request packet (S725). If receiving this packet (YES in step S725), the MFP 100 checks whether it can transmit the image data read by the scanner unit 102 (S726). If the data can be transmitted (YES in step S726), the MFP 100 transmits the image data packet (response code "01") 800 to the information terminal apparatus 300 through the network communication unit 110, a network connection unit 111, and the network 310 (S727). The MFP 100 may perform this transmission such that it transmits one packet every time it receives an image data request packet. In general, however, since the image data generated by the scanner unit is large in volume, it is efficient to determine in advance the number of image data packets to be transmitted every time an image data request packet is received and transmit a plurality of image data packets. In contrast, if the MFP 100 cannot transmit the image data or has no image data (NO in step S726), the MFP 100 transmit the image data packet 800 (response code "02" or data length 810 of "0") (S728).

Since the information terminal apparatus 300 transmits an image data request packet until confirming the end of the transmission of image data, the MFP 100 transmits an image data packet in response to an image data request packet until the end of the transmission of image data.

Upon determining that all the image data packets are received, the information terminal apparatus 300 transmits a session disconnection request packet to the MFP 100. The MFP 100 therefore waits for the reception of the session disconnection request packet (S729). Upon receiving this packet, the MFP 100 checks whether it can disconnect the session (S730). Upon determining that the session can be disconnected, the MFP 100 transmits a session disconnection response packet (response code "01") to the information terminal apparatus 300 (S732). Upon determining that the session cannot be disconnected, the MFP 100 transmits a session disconnection response packet (response code "02") to the information terminal apparatus 300 (S731). After step S732, the process returns to step S701, and the communication mode between the information terminal apparatus 300 and the MFP 100 returns to the UDP mode. After step S731, the process returns to step S725.

If no image data request packet is received (NO in step S725), the MFP 100 measures the 13th time (S733). If the 13th time has elapsed (YES in step S733), the MFP 100 disconnects the session as described above (S734), and stops the push scan processing (S735). The MFP 100 performs this processing to prevent inability to connect to another information terminal apparatus in response to a session connection request packet therefrom due to the continuation of session connection to the information terminal apparatus 300.

It sometimes takes much time to finish transmitting an image data packet and disconnect the session after the reception of the first image data request packet. If the second cycle elapses during this interval, another information terminal apparatus (e.g., the information terminal apparatus 200) transmits an inquiry request packet to the MFP. If the MFP 100 transmits no response to the inquiry request packet, the information terminal apparatus 200 repeatedly retransmits the inquiry request packet. If the information terminal apparatus 200 still receives no response, it is useless for the user of the information terminal apparatus 200 to feel uneasy and make a second cycle setting or inquiry, regardless of the state of the MFP 100.

In order to solve these problems, if the 13th time has not elapsed (NO in step S733), the MFP checks whether it has received an inquiry request packet from another information processing apparatus, even during the execution of a push scan service for the information terminal apparatus 300 (S736). If the MFP does not receive the packet (NO in step S736), the process returns to step S725. If receiving the packet (YES in step S736), the MFP transmits an inquiry response packet (response code "05") (S737). The flow then returns step S725. This makes it possible for another information terminal apparatus (e.g., the information terminal apparatus 200) to know that another information terminal apparatus is using the scanner unit. When this information terminal apparatus displays a corresponding message, the user can be notified of information indicating that the MFP is occupied by another information terminal apparatus.

Responding to polling from another apparatus even during document reading operation is especially effective for a case (to be described below) wherein an MFP notifies an information terminal apparatus whether the use of a service from the MFP is permitted.

In addition, when the MFP 100 receives an image request packet, document reading operation can be started or restarted. In this case, it suffices to omit the processing in steps S723a, S723b, and S723c.

In the above manner, the MFP 100 transmits the image data obtained by push scan to the information terminal apparatus 300 in accordance with the processing in the flowcharts shown in FIGS. 12 and 13. The MFP performs the same operation when executing push scan operation for the information terminal apparatus 200.

Note that displaying the application setting window shown in FIG. 5 by performing predetermined operation and unchecking the check box attached to the MFP 100 make it possible to inhibit the transmission of a PC registration request packet and an inquiry request packet to the MFP 100. In this case, if the MFP has already received a PC registration request packet and has transmitted a PC registration response packet upon performing the above PC registration processing, the MFP transmits a PC deletion request packet to delete the stored computer name and login name of the information terminal apparatus. The MFP transmits a PC deletion response packet to the information terminal apparatus in response to the PC deletion request packet.

Modification to First Embodiment

The following will describe a case wherein the first embodiment is modified to set an information terminal apparatus which is permitted to simply use a peripheral apparatus with respect to an MFP.

The information terminal apparatus 200 according to this embodiment transmits an inquiry request packet to the MFP 100 for every second cycle. To transmit an inquiry request packet for every predetermined cycle will be referred to as "polling transmission" or "perform polling" hereinafter. Likewise, to make the MFP 100 transmit an inquiry response packet in response to the inquiry request packet will be referred to as "polling response". Like the information terminal apparatus 200, the information terminal apparatus 300 performs polling by repeating the transmission of an inquiry request packet for every predetermined cycle, and the MFP 100 also transmits a polling response.

This embodiment will exemplify a case wherein an information terminal apparatus and an MFP connecting to a network by polling transmission and polling response communicate with each other, and the information terminal apparatus controls whether the information terminal apparatus can use the MFP. This control is implemented by setting in the MFP whether to permit the information terminal apparatus which is performing polling to receive a server, and making the MFP and the information terminal apparatus perform processing by exchanging packets. Each process will be described below.

(1) Setting Process for MFP

First of all, settings for the information terminal apparatus are made with respect to the MFP.

A characteristic feature of this setting process will be described below with reference to a flowchart.

Figure 22:
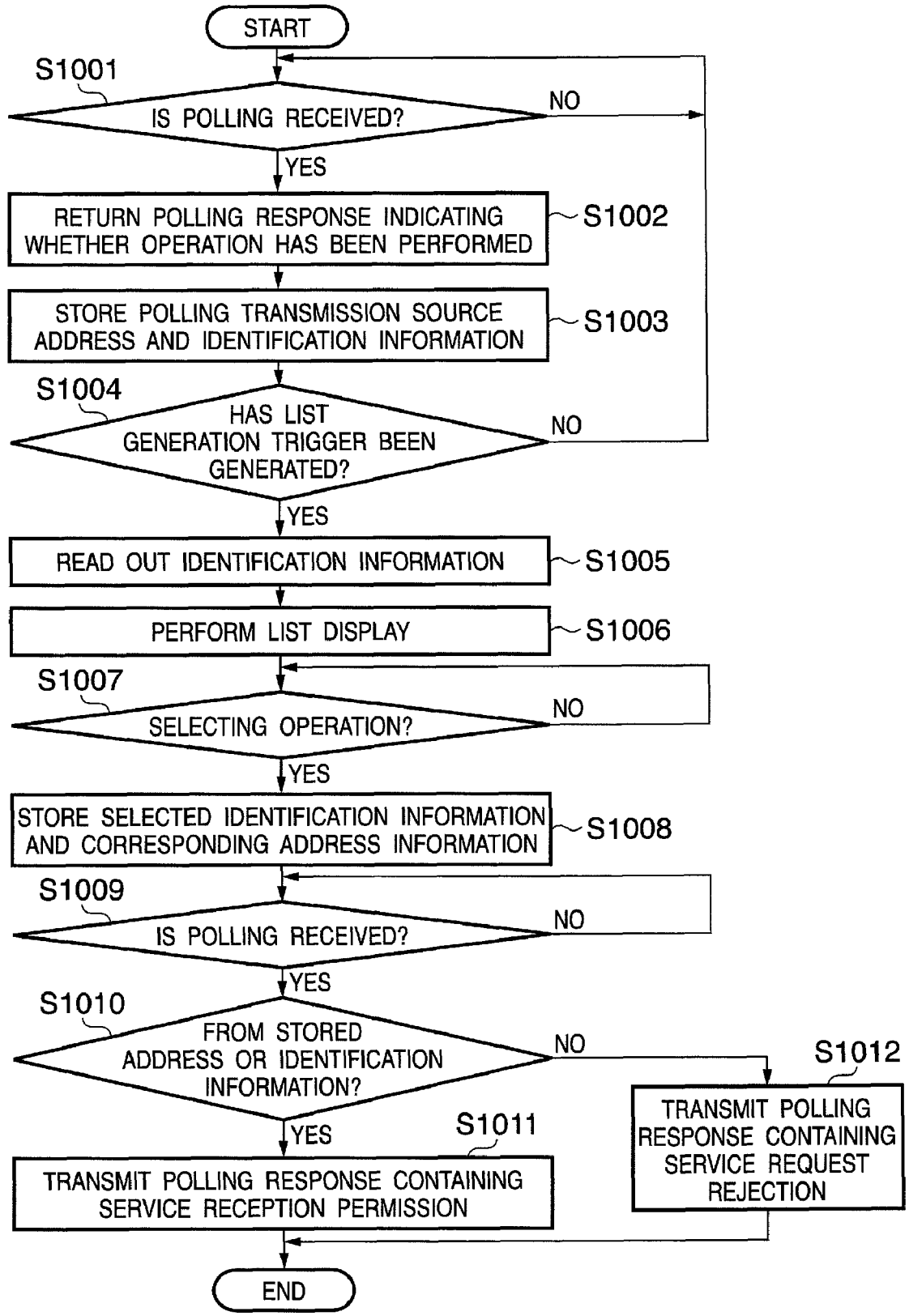
FIG. 22 is a flowchart showing a processing procedure executed by the MFP using a polling/polling response to set whether each information terminal apparatus connecting to the MFP through the network can receive a service from the MFP.

FIG. 22 is a flowchart showing the procedure executed by an MFP to set whether each information terminal apparatus connecting to the MFP by using polling/polling response can use the MFP.

The network communication unit 110 of the MFP 100 waits for the reception of the inquiry request packet (polling) shown in FIG. 6 through the network 310 and the network connection unit 111 (S1001). Upon receiving the polling, the network communication unit 110 inquires of a CPU 105 whether push scan has been performed, and performs polling response by setting the result in the response code 706 shown in FIG. 7 (S1002).

The MFP stores, in the first area of a memory 112, the address written in the transmission source address area 602 and the computer name and login name written in the computer name area 606 of the packet received in step S1001 (S1003). The MFP checks whether a list generation event occurs (S1004). The MFP repeats the processing in steps S1001 to S1003 until detecting a trigger for this event. Note that if the address in the transmission source address area 602 and the computer name and login name written in the computer name area 606 of the received packet have already been stored in the first area of the memory 112, the processing in step S1003 is skipped.

FIG. 23 is a view schematically showing an example of the address information and the computer name and login name of each information terminal apparatus which are stored in the first area of the memory 112.

Referring to FIG. 23, reference numeral 2300 denotes the first area of the memory 112; 2301, an area which stores, in correspondence with each information terminal apparatus, a computer name and a login name in the computer name area 606 of the image data request packet 600 of the polling which the MFP received from each information terminal apparatus; and 2302, an area which stores, in correspondence with each information terminal apparatus, the transmission source address 602 of the image data request packet 600 of the polling which the MFP has received from each information terminal apparatus.

A computer name area and an address area are made to correspond to each information terminal apparatus. For example, an area 2304 stores the MAC address of the information terminal apparatus which is represented by an area 2303. In addition, of the information stored in the area 2301, the information before "@" indicates a login name, and the information after "@" indicates a computer name. These pieces of information indicate, for example, that a user having the login name "admin" uses an information terminal apparatus having the computer name "Taro's PC", and the information terminal apparatus has the MAC address "00:00:00:12:34:56". This applies to an area 2305, area 2306, area 2307, area 2308, area 2309, and area 2310.

Note that in the case shown in FIG. 23, the areas 2306 and 2308 store the same MAC address "FF:00:FF:00:00:01". This indicates that the polling is received when two users with the two login names "user1" and "user2" use the same information terminal apparatus with the computer name "officePC". The area 2309 indicates that the polling is received when a user having the login name "Hanako" uses the information terminal apparatus having the computer name "Flower". The MAC address of the information terminal apparatus having the computer name "Flower" is "00:00:85:AB:CD:EF" according to the area 2310.

Referring back to FIG. 22, the user checks the presence/absence of a list display instruction for the selection of an information terminal apparatus to be permitted to receive a service provided by the MFP through the network 310 by operating a menu key 409, the arrow key 410, the decision key 412, and the like while viewing the LCD screen 401 (S1004). Upon detecting this instruction, a CPU 105 reads out the computer name and login name of the information terminal apparatus from the first area 2300 of the memory 112 (S1005), and displays them as an information terminal apparatus list on the LCD screen 401 (S1006).

Figure 24:
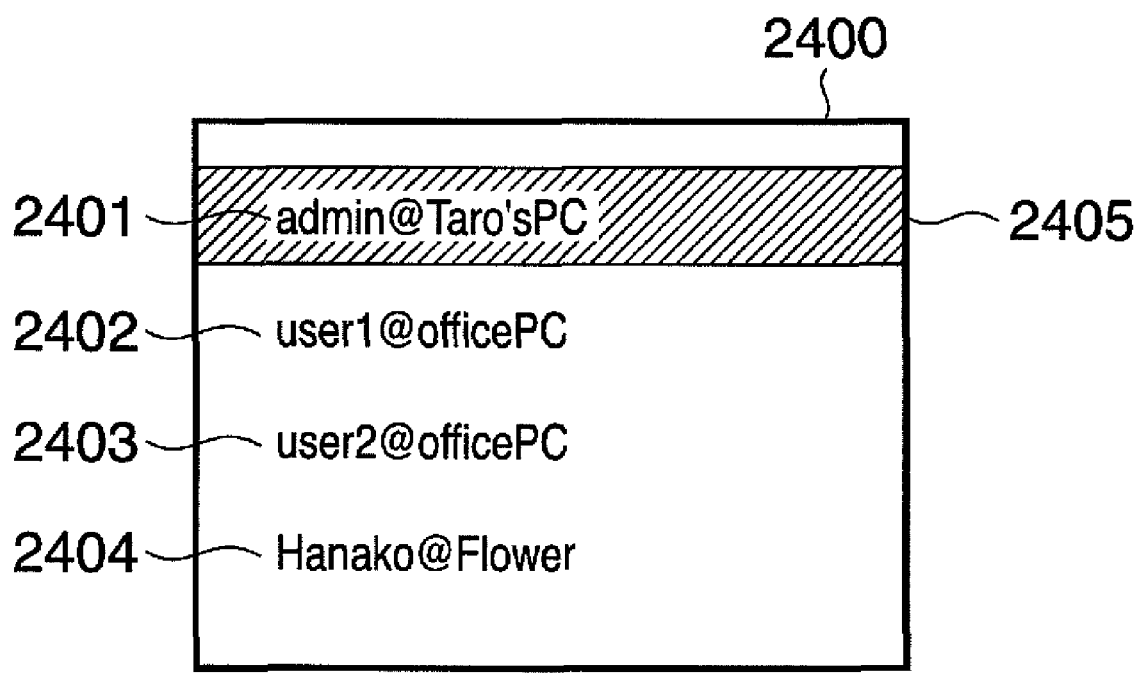
FIG. 24 is a view showing an example of how the information stored in an area 2301 is displayed on the LCD screen.

FIG. 24 is a view showing an example of how the LCD screen displays the information stored in the area 2301. As is obvious from this view, this window displays the login names and the computer names because, for example, MAC addresses are difficult for the user to understand.

Referring to FIG. 24, reference numeral 2400 denotes a terminal information display window displayed on the LCD screen 401; and 2401 to 2404, the login names and computer names stored in areas 2303, 2305, 2307, and 2309.

Referring to FIG. 24, a highlighting display portion 2405 indicates that the login name and computer name 2401 are highlighted/displayed. The user moves the highlighting display portion 2405 up and down by operating the arrow key 410. Subsequently, the user moves the highlighting display portion 2405 by operating the arrow key 410 while viewing the terminal information display window 2400 displayed on the LCD screen 401, and presses the decision key when the highlighting display portion 2405 is located at a desired computer name, thereby attaching the symbol "○" to it.

Figure 25:
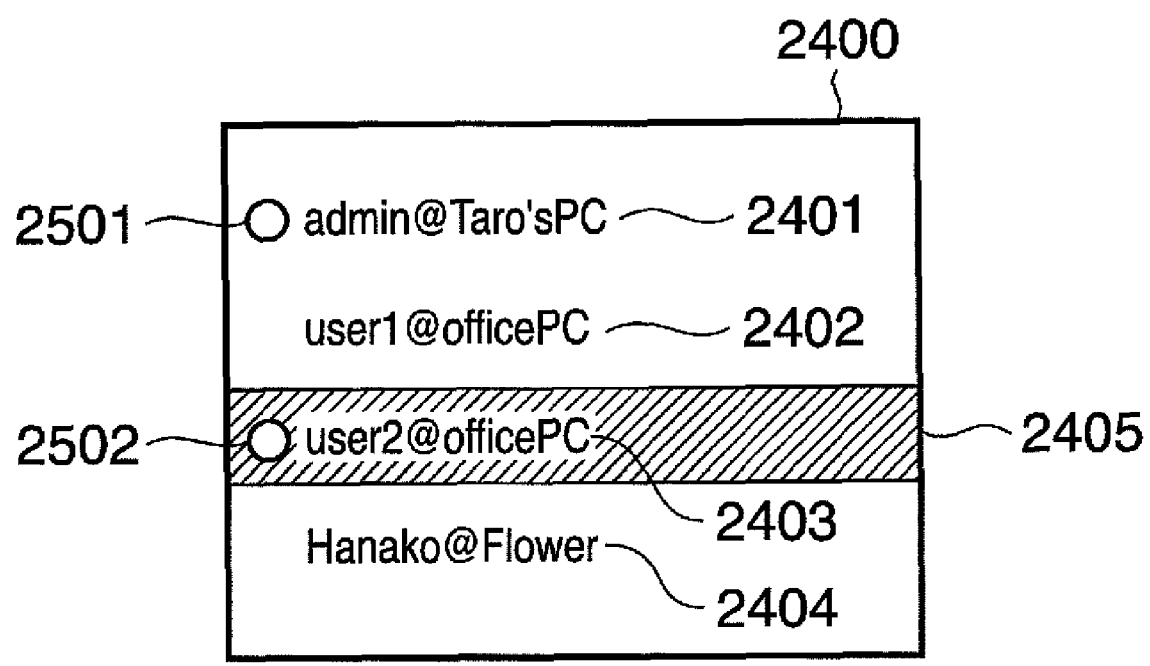
FIG. 25 is a view showing an example of how the display example in FIG. 24 with the symbols "○" is displayed on the LCD screen.

FIG. 25 is a view showing an example of how an LCD window to which the symbol "○" is attached is displayed with respect to the display example shown in FIG. 24.

FIG. 25 shows a case wherein symbols "○" 2501 and 2502 are attached to the computer names 2401 and 2403 when the user moves the highlighting display portion to the computer name 2403 after pressing the decision key 412 while the computer name 2401 is highlighted/displayed.

Subsequently, for example, the user selects a computer name by key operation on the LCD screen 401 as shown in FIG. 25, and waits for the completion of the operation (S1007). When the selecting operation is complete, a terminal apparatus is selected, which is permitted to request the use of a service from the MFP 100. The second area of the memory 112 stores the selected computer names (e.g., 2401 and 2403 in FIG. 25) (S1008).

FIG. 26 is a view showing an example of how a second area 2600 of the memory 112 stores information.

In the case shown in FIG. 26, the MFP reads out computer names and pieces of address information from the areas 2303 and 2307 of the first area 2300 and areas 2304 and 2308 corresponding to them, and stores them in areas 2603 and 2605 and areas 2604 and 2606.

Referring to FIG. 26, reference numeral 2601 denotes an area which stores the computer name and login name selected by selecting operation as an information terminal apparatus permitted to request the use of a service from the MFP; 2602, an area which stores a MAC address corresponding to the computer name and login name selected as the information terminal apparatus permitted to the above operation; 2603 and 2605, the computer names and pieces of login name information selected by selecting operation as information terminal apparatuses permitted to request the use of services from the MFP; and 2604 and 2606, pieces of MAC address information corresponding to the pieces of computer name and login name information 2603 and 2605.

(2) Polling Processing by MFP

Reference numeral 708 in FIG. 7 denotes an additional information flag area indicating whether additional information is attached to the inquiry response packet 700. If there is no additional information, this flag area is set to "0". If there is additional information, the flag area is set to "1". Reference numeral 709 in FIG. 7 denotes a service request permission flag area for notifying, as additional information, a selection result indicating whether the information terminal apparatus as the destination of the inquiry response packet 700 can receive each service from the MFP through the network.

After the execution of the processing in step S1008, the MFP 100 waits for the reception of a polling again (S1009). Upon receiving a polling, the network communication unit 110 of the MFP checks whether the second area 2600 of the memory 112 stores information matching the contents of the transmission source address 602 and computer name area 606 of the received polling (S1010).

If the second area 2600 stores information matching the above contents, the additional information flag area 708 shown in FIG. 7 is set to "1". The MFP then transmits, to the source address of the polling, the inquiry response packet 700 in which a value for notifying that the apparatus can receive each service from the MFP through the network is set in the use request permission flag area 709 (S1011). That is, the MFP returns a polling response indicating the permission of use in response to the polling matching "admin@Taro'sPC" and "00:00:00:12:34:56" or "user2@officePC" and "FF:00:FF:00:00:01".

If there is no matching information, the additional information flag area 708 is set to "1". The MFP then transmits, to the source address of the polling, the inquiry response packet 700 in which a value for notifying that a request to use each service from the MFP cannot be received through the network is set in the use request permission flag area 709 (S1012). That is, the MFP returns a polling response indicating the inability to use each service from the MFP in response to the polling which does not match the combination of the computer name information and the address information shown in FIG. 26.

Although in step S1003 in FIG. 22, the first area of the memory 112 stores the address in the area 602 and the computer name and login name written in the area 606 of the packet received in step S1001, the present invention is not limited to this. For example, in step S1003, the above information may be stored in an area of the work memory 107, and the contents of the area may be copied to the first area of the memory 112 at a proper timing. This makes it possible to reduce the write count of a flash memory which is limited.

In addition, storing the address in the area 602 and the computer name and login name written in the area 606 of the polling received after power-on of the MFP in step S1003 makes it possible to use the flash memory 112 as the storage area in step S1008 while using only the work memory 107. Furthermore, this embodiment can take various implementation forms, e.g., a form which includes the network communication unit 110 independently of the work memory 107 and allows the network communication unit 110 and the network connection unit 111 to hold operation and storage contents even while the MFP 100 is powered off.

Note that in step S1011, the MFP may transmit the response packet 700 in which the flag in the area 708 is set to "0" without setting the flag in the area 709, i.e., a polling response which notifies only the execution/non-execution of push scan. In this case, in step S1012, the MFP preferably transmits the inquiry response packet 700 in which the flag in the area 708 is set to "1", and a value notifying the inability to use a service from the MFP through the network is set in the area 709.

In this case, the MFP and the information terminal apparatus may establish in advance an agreement that additional information is attached to the response packet 700 to notify that the apparatus cannot use a service from the MFP, and no additional information is attached to the response packet 700 to notify that the apparatus can use a service from the MFP.

In addition, step S1007 and FIG. 25 have exemplified the operation of selecting an information terminal apparatus whose service use request is accepted. However, it suffices to perform the operation of selecting an information terminal apparatus whose service use request is to be rejected.

Furthermore, in this embodiment, the first area of the memory 112 stores the destination address information and the computer name and login name of a received inquiry request packet at the timing when a response is made to the inquiry request packet. However, the present invention is not limited to this. For example, the MFP may read out the address information and the computer name and login name from a received PC registration request packet and store them in the first area of the memory 112 at the timing after the transmission of a PC registration response packet (response code "01"). This makes it possible to reduce the step of determining whether the address information and the computer name and login name of the information terminal apparatus have already been stored in the first area of the memory 112 and make the processing more efficient as compared with the case wherein the MFP reads them out from the inquiry request packet and stores them.

Figure 27:
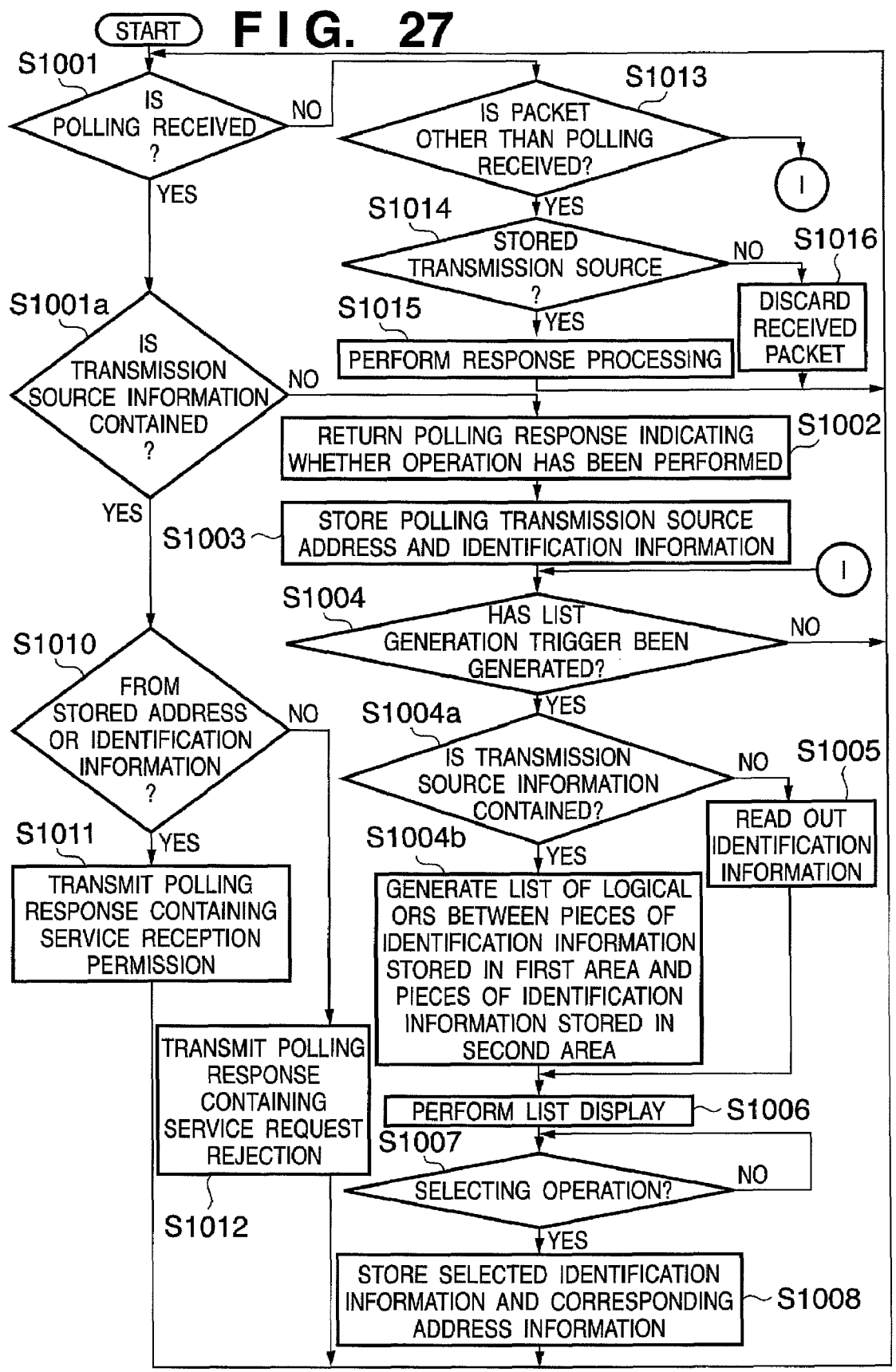
FIG. 27 is a flowchart showing a processing procedure executed by the MFP 100.

This embodiment can also be modified as indicated by the flowchart shown in FIG. 27.

Note that the same reference numerals as in FIG. 27 denote the steps of performing the same processing as that described already with reference to FIG. 22, and a description thereof will be omitted.

Referring to FIG. 27, upon receiving a polling, the MFP checks by referring to the memory 112 whether the second area has already stored one or more combinations of pieces of address information and computer names and login names (S1001a). If the second area has not stored these pieces of information, the MFP executes the processing in steps S1002, S1003, and S1004. If the second area of the memory 112 has already stored address information and a computer name and login name, the MFP determines that the user has already performed the operation of selecting a terminal apparatus whose request to use a service from the MFP is permitted, and executes step S1010.

If an information terminal apparatus list display trigger is generated in step S1004, the MFP checks by referring to the memory 112 whether the second area has already stored address information and a computer name and login name (S1004a). If the second area has not stored these pieces of information (NO in step S1004a), the MFP executes the processing in steps S1005 to S1008. If the second area of the memory 112 has already stored these pieces of information (YES in step S1004a), the MFP performs the OR operation between these pieces of stored information and the pieces of information stored in the first area of the memory 112. The MFP then generates a list of information obtained by the OR operation (S1004b).

Figure 28:
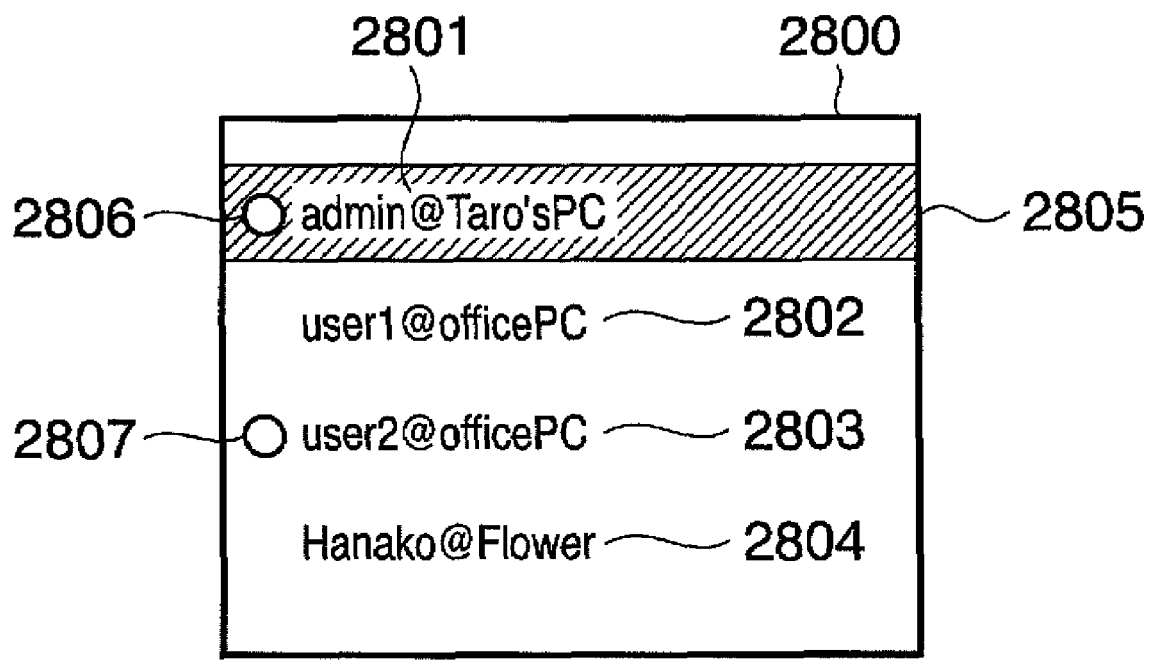
FIG. 28 is a view showing a display example of an LCD screen 401.
Figure 29:
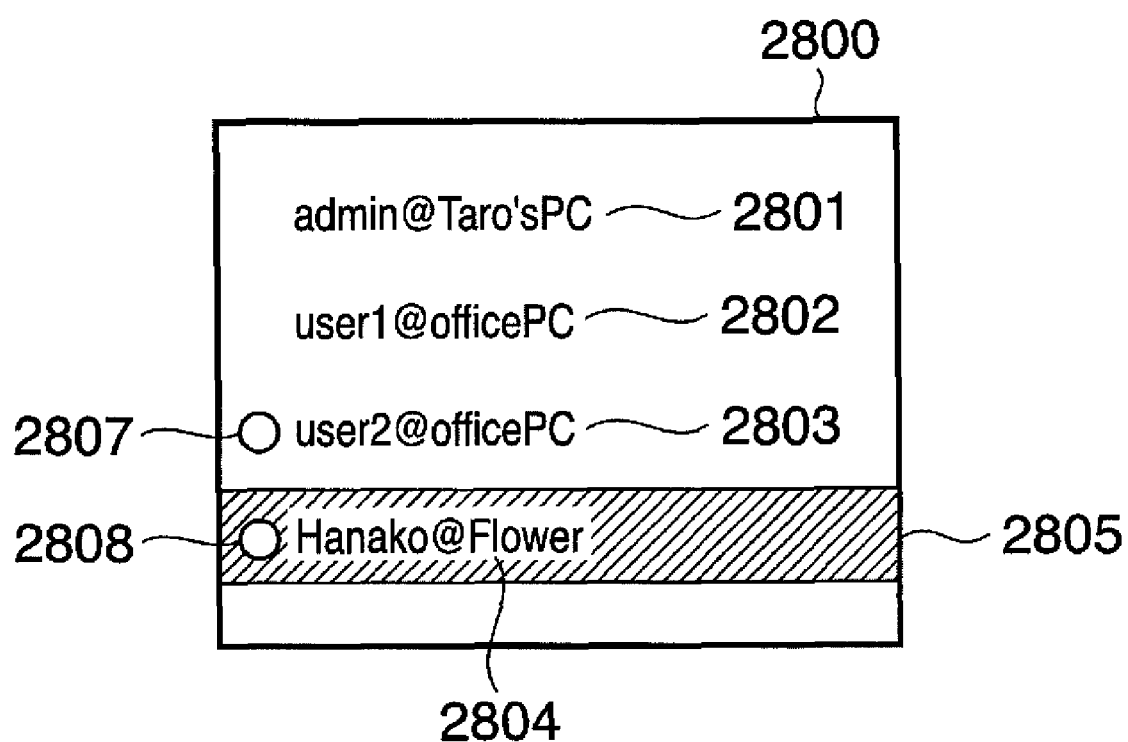
FIG. 29 is a view showing another display example of the LCD screen 401.

FIGS. 28 and 29 are views each showing an example of display on the LCD screen 401. FIG. 28 is a view showing a display window 2800 on the information terminal apparatus which is displayed in step S1006. FIG. 29 is a view showing an example of the display window 2800 on the information terminal apparatus which is displayed at the time of selection processing in step S1007. In these views, symbols "○" 2806 to 2808 each indicate an information terminal apparatus selected as an apparatus permitted to receive a service provided by the MFP through the network at a corresponding point of time.

FIG. 30 is a view showing the second area 2600 of the flash memory 112 which is changed in step S1008.

Note that the same reference numerals as in FIG. 26 denote the same elements in FIG. 30, and a description thereof will be omitted.

If no polling is received (NO in step S1001), the MFP checks whether it has received a packet other than a polling, e.g., a print request, memory card read request, or image data request based on pull scan (S1013). Upon determining that a packet other than a polling, like that described above is received, the MFP checks the following. That is, the MFP checks whether the source address and computer name information of the received packet match the set of the pieces of information stored in the second area of the flash memory 112 (S1014). If they match (YES in step S1014), the MFP returns a predetermined response and proceeds with the provision of a service (S1015). If they do not match (NO in step S1014), the MFP discards the received packet and performs control not to perform response processing (S1016).

In contrast to this, if the MFP determines that it has not received any of the above packets other than a polling, the MFP checks whether a list generation trigger is generated.

This makes it possible to proceed with the provision of a service with respect to an information terminal apparatus which transmits a packet other than a polling, when receiving a service use request from the information terminal apparatus selected as an apparatus which can receive a service from the MFP which is stored in the second area of the flash memory 112. In contrast to this, the MFP can perform control so as not to provide any service even if receiving a service use request from an information terminal apparatus which is not selected as an apparatus which can receive a service from the MFP, which is not stored in the second area of the flash memory 112.

Information terminal apparatuses to which the symbol "○" is not attached can keep inquiring (polling) for push scan. However, this embodiment may inhibit the execution of push scan itself with respect to such information terminal apparatuses by not displaying them in a list at the time of selection of scan data destinations.

According to the above modification, the MFP can rewrite the information in the second area of the flash memory 112 in accordance with a change in the selection of a terminal apparatus to be permitted to request the use of a service from the MFP, and can notify the corresponding information terminal apparatus of the changed result.

According to the above embodiment, the display unit 108 and operation unit 109 of the MFP perform the operation of selecting an information terminal apparatus to be permitted to request the use of a service from the MFP and list display for the selection. However, the present invention is not limited to this. The display unit and operation unit of an information terminal apparatus may perform such display/operation by using an utility of the information terminal apparatus which can communicate with an MFP.

(3) Processing by Information Terminal Apparatus

As described in the first embodiment, a printer driver, scanner driver, application, and the like for an MFP are installed in an information terminal apparatus. When the installed application is activated (or automatically activated), the information terminal apparatus searches for an MFP through the network. Upon identifying the MFP, the information terminal apparatus registers, in the MFP, the computer name and the login name of a user who is currently logging in to the information terminal apparatus.

Figure 31:
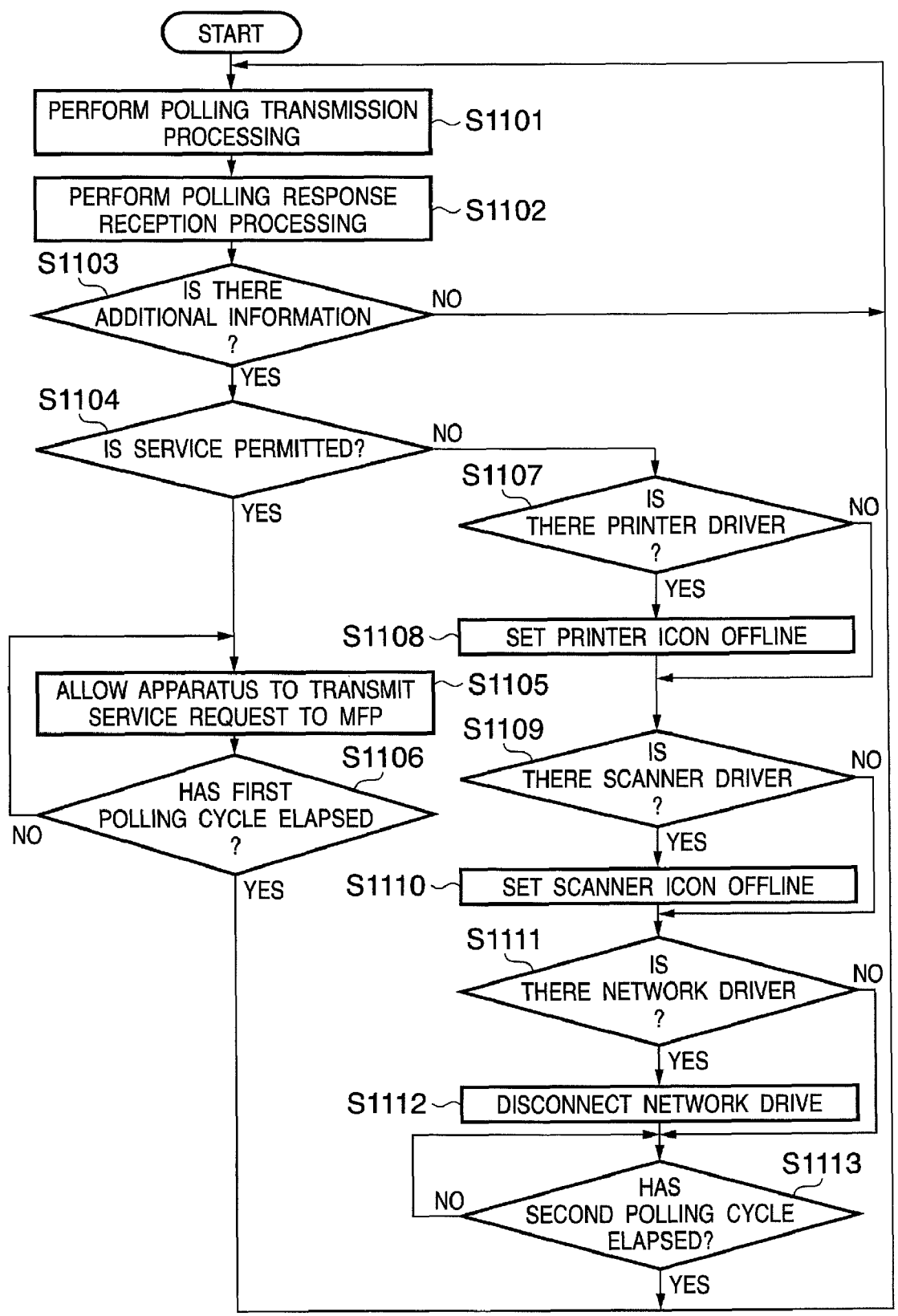
FIG. 31 is a flowchart for explaining processing executed by an information terminal apparatus.

FIG. 31 is a flowchart for explaining processing executed by the information terminal apparatus.

First of all, in order to check whether the MFP has not executed push scan, the information terminal apparatus performs polling transmission with respect to the MFP through the network communication unit 207, network connection unit 208, and the network 310 (S1101). Assume that the information terminal apparatus performs polling transmission at the first polling cycle by activating and monitoring the timer 212 incorporated in the CPU 201.

The information terminal apparatus then receives a polling response packet (S1102). The information terminal apparatus further checks, on the basis of the value in the area 708 of the received polling response packet 700, whether there is additional information (S1103). If the value of the flag set in the area 708 is "1" (YES in step S1103), the information terminal apparatus reads out the value in the service request permission flag area and discriminates the content (S1104). If the content of the value in the service request permission flag area indicates that the apparatus is permitted to request a service from the MFP (YES in step S1104), the information terminal apparatus determines that it can use a service from the MFP (S1105).

Assume that the information terminal apparatus requests the use of each of services from the printer function, scanner function, and storage function of the MFP. In this case, if another information terminal apparatus is not using the function corresponding to the requested service, the information terminal apparatus can receive the requested service. If, for example, the information terminal apparatus transmits print data to the MFP through the network 310, the scanner unit 102 executes printing, and the apparatus can obtain the result. If the user places a document on the document table, and executes pull scan operation by operating an operation unit 206 of the information terminal apparatus 200, the scan data generated by making the scanner unit 102 read the document is transmitted through the network 310. In addition, the information terminal apparatus can read out a file in a memory card 104 through the network 310, edit it, and store the new file in the memory card 104.

In contrast, if the value of the flag set in the area 708 is "0" (NO in step S1103), the information terminal apparatus performs polling transmission again (S1101).

When recognizing that the requested service can be received, the information terminal apparatus waits for the lapse of the first polling cycle (S1106). When the first polling cycle has elapsed (YES in step S1106), the information terminal apparatus performs polling transmission again (S1101). Subsequently, for example, the information terminal apparatus repeats polling transmission at the first polling cycle to inquire whether push scan is executed.

If the content of the value in the service request permission flag area indicates the rejection of a service request with respect to the MFP, the information terminal apparatus knows that settings are made in the MFP so as not to select the apparatus as an apparatus permitted to request the use of a service or select the apparatus as an apparatus whose service use request is rejected. In such a case, the information terminal apparatus performs the following processing.

Assume that the MFP ignores print data which the information terminal apparatus transmits to use the printer function, and also ignores print data which the information terminal apparatus repeatedly retransmits a predetermined number of times. In this case, the information terminal apparatus finally determines that it cannot print the data. A display unit 205 displays this determination result. This also applies to the case of pull scan operation.

In this embodiment, when trying to use the printer function or scanner function of an MFP, an information terminal apparatus can know the trial result, and can avoid useless data retransmission and display. An essential prerequisite for the use of, for example, the printer function of an MFP is to install a printer driver for the MFP in advance.

In this embodiment, therefore, it is checked whether the printer driver for the MFP is installed (S1107). If the printer driver is installed (YES in step S1107), the printer function of the MFP is set offline to prevent the MFP from being selected in the process of printing operation (S1108). In contrast to this, if the printer driver is not installed (NO in step S1107), the scanner function is checked.

Figure 32:
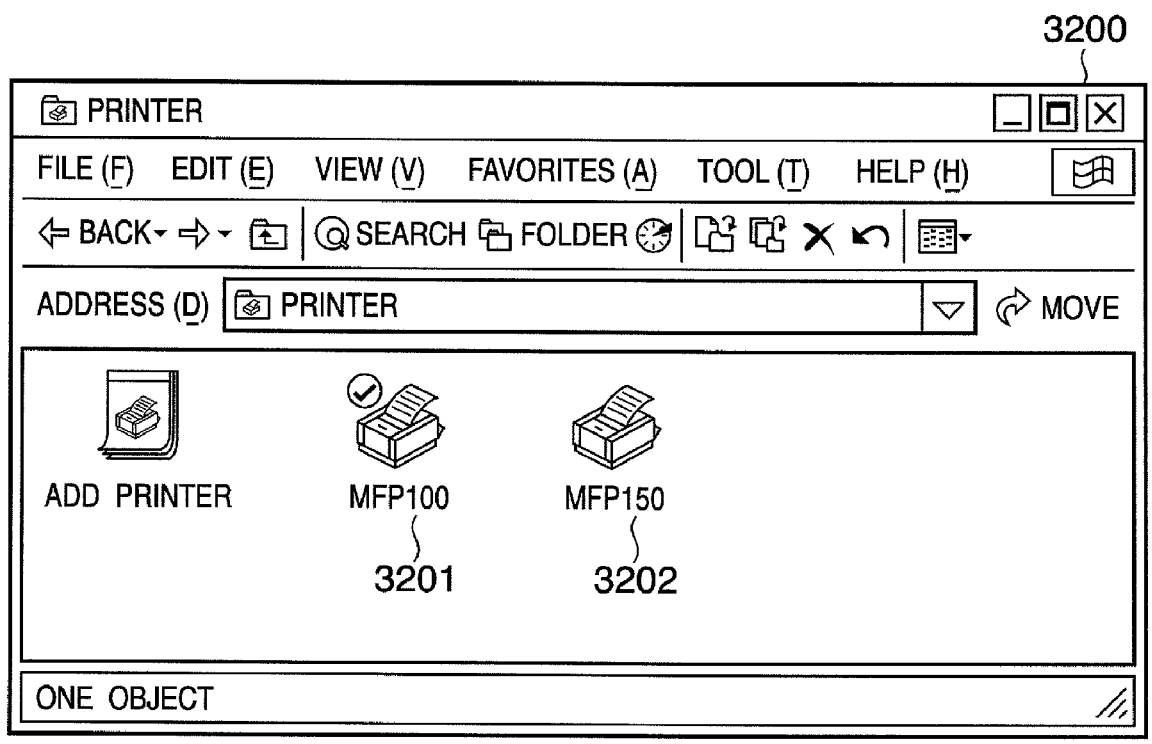
FIG. 32 is a view showing an example of a display window on the display unit of the information terminal apparatus.

FIG. 32 is a view showing an example of a display window on the display unit of an information terminal apparatus.

A window 3200 shown in FIG. 32 displays a list of printers whose drivers are installed in the information terminal apparatus 200. In this case, offline display of a printer icon 3201 of the MFP 100 visually shows that the MFP 100 cannot be used. In contrast, on this window, a printer icon 3202 of the MFP 150 is online-displayed.

An information terminal apparatus such as a PC generally includes printer environment settings as operation environment settings, and the setting items of the printer include an item expressed like "printer to be generally used". This item is an item for setting one of the printers which the information terminal apparatus can use as a printer to be generally used. When printing an arbitrary document or image file from an application which displays them, the information terminal apparatus preferentially selects a printer set as "printer to be generally used". If there are a plurality of printers which can be used, an application may allow selection of another printer. However, in many cases, a printer set as "printer to be generally used" is selected first and used to print. Some application displays no window for the selection of another printer and automatically starts transmitting print data to a printer set as "printer to be generally used". Although a skilled user can easily change the setting of "printer to be generally used", it is often difficult for a general or unskilled user to change such setting.

A recently installed printer is often set as a "printer to be generally used". Such a "printer to be generally used" is the printer unit of an MFP. Assume that a given information terminal apparatus is selected as an apparatus whose MFP service use request is rejected. In this case, even if this apparatus tries to print a document/image file, it cannot transmit the data to the printer unit. As a result, after several retries, the window will display an error message.

On the other hand, even if the printer icon of a target MFP is offline-displayed as shown in FIG. 32, the MFP preferentially uses the corresponding printer as long as it is set as a "printer to be generally used". In addition, such a problem can be effectively prevented by automatically setting a given printer other than a "printer to be generally used" if it is notified that the information terminal apparatus cannot receive a service from the printer set as a "printer to be generally used".

For example, as shown in FIG. 32, if there is another printer (e.g., the MFP 150) which the information terminal apparatus can use, it suffices to automatically change the printer to a "printer to be generally used". This automatic changing operation can omit useless print processing, the time until error display, and printer re-selecting operation. If there is no other printer which the information terminal apparatus can use, the apparatus may notify the application that there is no printer which the apparatus can use. This makes it possible to reduce the processing and time taken for printing operation which cannot be done in the end.

The information terminal apparatus further checks whether the scanner driver for the MFP is installed (S1109). If the scanner driver is installed (YES in step S1109), the scanner function is set offline to prevent useless operation, e.g., placing a document and operating scanner, processing, and time taken to use the scanner function (S1110). If the scanner driver is not installed (NO in step S1109), the information terminal apparatus checks the storage function.

Figure 33:
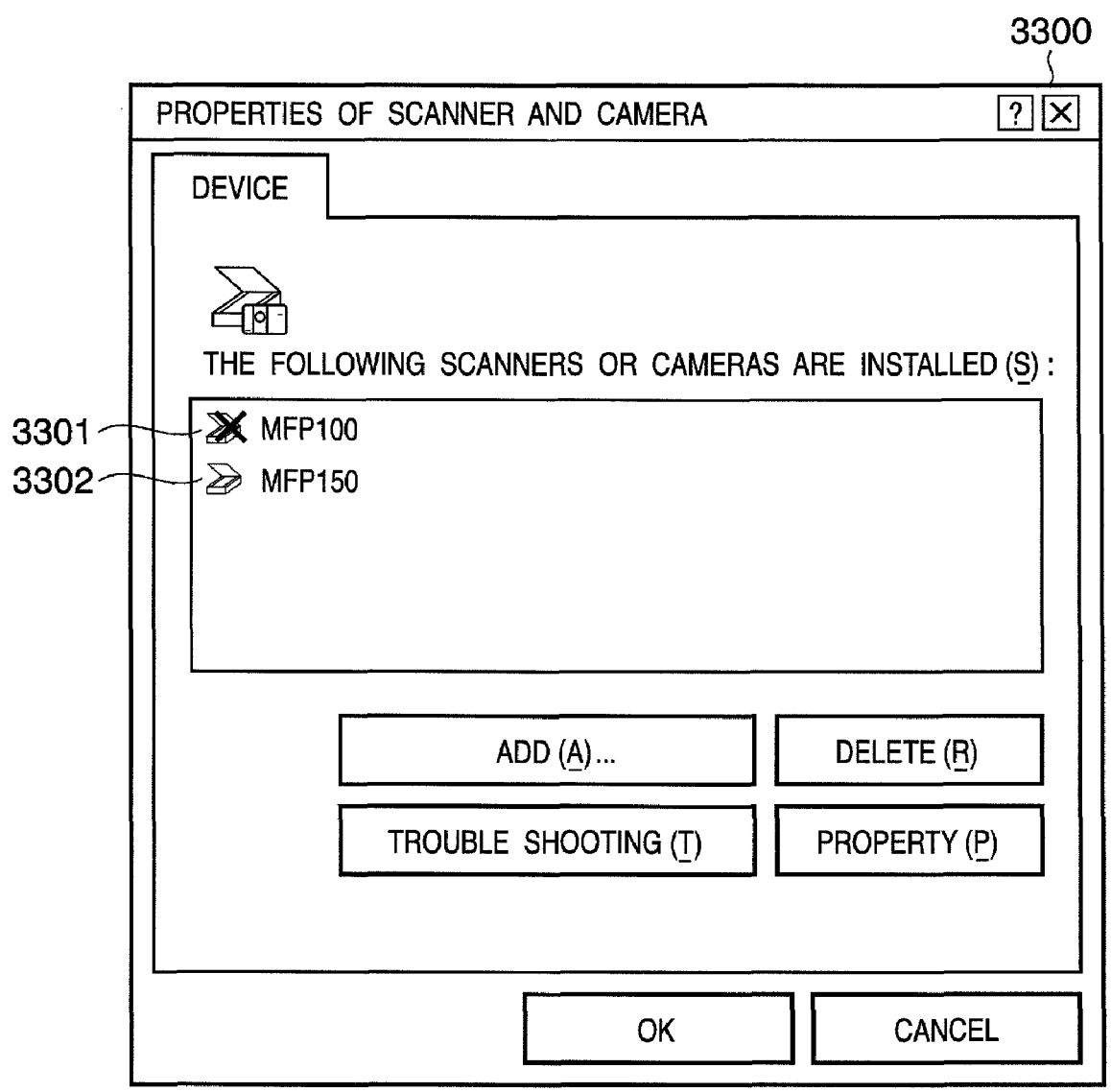
FIG. 33 is a view showing an example of a display window on the display unit of the information terminal apparatus.

FIG. 33 is a view showing an example of a display window on the display unit of an information terminal apparatus.

A window 3300 shown in FIG. 33 displays a list of scanners whose drivers are installed in the information terminal apparatus 200. In this case, the window displays a scanner icon 3301 of the MFP 100 and a scanner icon 3302 of the MFP 150. The window offline-displays the scanner of the MFP 100 to visually show that the user cannot use the scanner of the MFP 100. This notifies the user that he/she should not request the MFP 100 to scan.

The information terminal apparatus further checks whether there is any network drive which the apparatus can access through the network with the MFP (S1111).

If the memory card of the MFP is assigned as a network drive which can be accessed through the network, the user may think that he/she can input/output data to/from the memory card 104, and may try to use the storage function. Such a trial leads to useless processing and time taken for access and operation. In order to prevent this, if there is a network drive (YES in step S1111), the information terminal apparatus performs control to disconnect the connection to the network drive (S1112) and not display the memory card 104 of the MFP on the window.

Finally, the information terminal apparatus starts the timer 212 of the CPU 201 to monitor the time (S1113). When the second polling cycle longer than the first polling cycle has elapsed, the information terminal apparatus performs polling transmission again (S1101).

According to the above modification, an information terminal apparatus can know from a polling response that the apparatus has not been selected as an apparatus permitted to request the use of a service from an MFP or has been selected as an apparatus whose service use request is to be rejected. This makes it possible to save the user execution of useless print, scanner, or storage processing and the time to be spent for it.

Using icon display or the like can notify the user of the possibility of using a service from an MFP. This can avoid a situation where the user performs useless operation and knows, after a long wait time, that he/she cannot receive a service.

The continuation of polling transmission allows the user to know a change in the state of the MFP. For example, the user can know a change from a state where the information terminal apparatus has not been selected as an apparatus permitted to request the use of a service from the MFP to a state where the apparatus is selected as an apparatus permitted to request the use of a service. In such a case, for example, returning the icon of each function in the offline state to the icon in the online state or assigning the memory card to a network drive again makes it possible to restore the state wherein the information terminal apparatus can request the use of a service from each function of the MFP. In addition, this can notify the user of the information terminal apparatus that the apparatus is set in the state wherein it can use a service from each function of the MFP.

Second Exemplary Embodiment

Since the MFP and information terminal apparatus used in this embodiment can use the same arrangements as those of the respective apparatuses described with reference to FIGS. 1 and 2, a description of the apparatus arrangements will be omitted. Therefore, the apparatus arrangements will be described with reference to the reference numerals shown in FIGS. 1 and 2. However, the arrangements obtained by omitting the USB communication function from the arrangements shown in FIGS. 1 and 2 can be applied to the apparatuses according to this embodiment.

Figure 34:
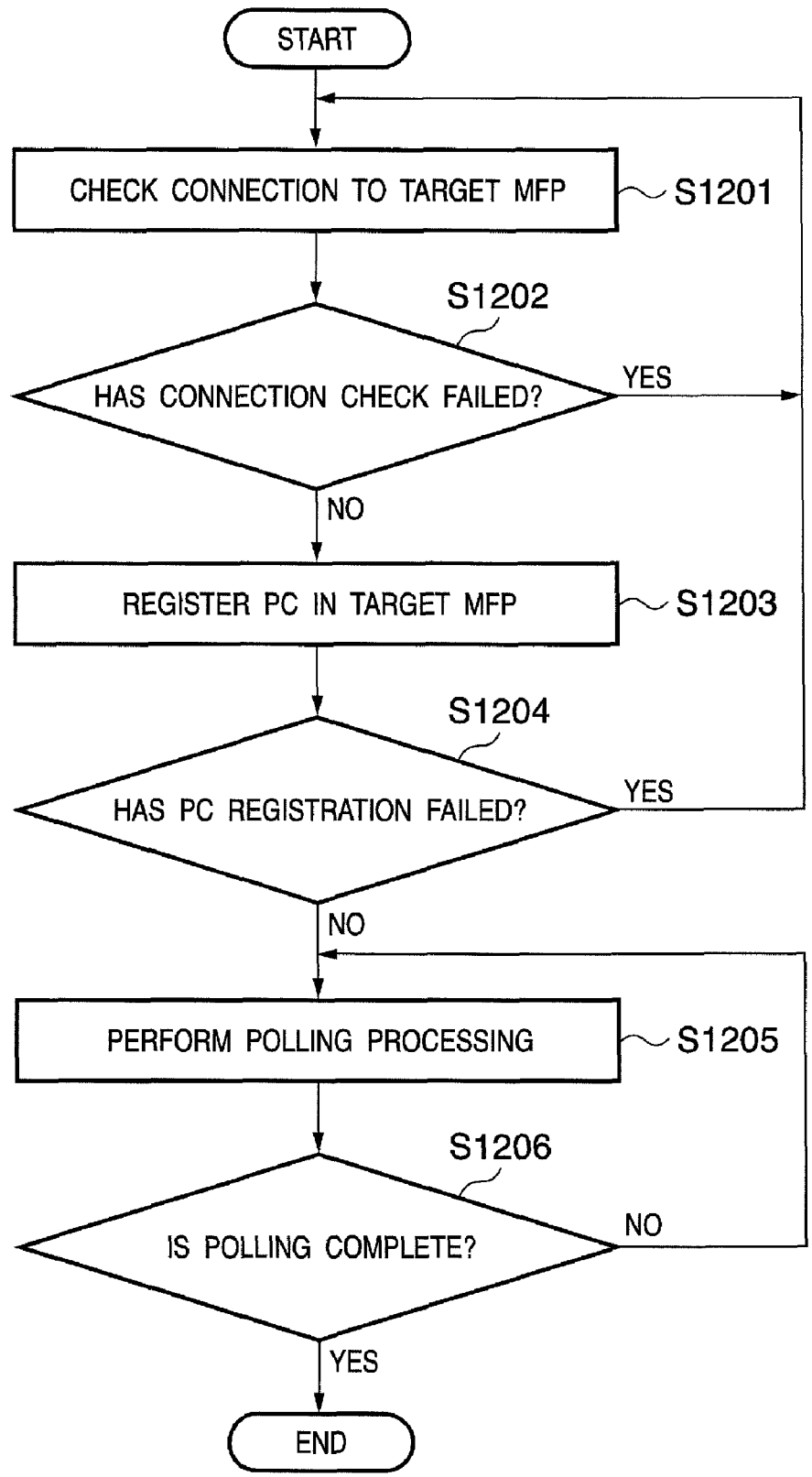
FIG. 34 is a flowchart showing an outline of a push scan service executed between the MFP 100, the information terminal apparatus 200, and information terminal apparatus 300.

FIG. 34 is a flowchart schematically showing a push scan service to be executed between an MFP 100, an information terminal apparatus 200, and an information terminal apparatus 300 according to the second embodiment. The details of this processing will be described later. The following will exemplify processing between the MFP 100 and the information terminal apparatus 200.

First of all, the information terminal apparatus 200 checks connection to the MFP 100 (S1201). This makes the information terminal apparatus 200 confirm at this point of time that the MFP 100 as a target exists on the network instead of a plurality of MFPs. The information terminal apparatus then determines the check result (S1202). If this connection check succeeds (NO in step S1202), the process advances to the next step. Otherwise (YES in step S1202), the information terminal apparatus repeats connection check (S1201).

The information terminal apparatus 200 registers its information in the MFP 100 (S1203). Implementation of a push scan service requires the information of the information terminal apparatus 200, and hence the apparatus performs this registration to allow the user to use the information when operating an operation panel 400 of the MFP 100. The information terminal apparatus then checks this registration result (S1204). If the registration succeeds (NO in step S1204), the process advances to the next step. Otherwise (YES in step S1204), the information terminal apparatus repeats connection check with respect to the target MFP (S1201).

Upon completion of the above processing, the information terminal apparatus 200 executes polling processing at predetermined intervals (S1205), and repeats polling until it confirms the completion of polling processing (S1206).

In the processing shown in FIG. 34, when connection check with respect to the target MFP or registration of the information terminal apparatus fails, the apparatus repeats connection check with respect to the target MFP. However, the information terminal apparatus may perform processing other than that shown in FIG. 34 as long as it performs processing in accordance with the failure. For example, when this processing fails, the information terminal apparatus may determine that it does not perform any push scan service. Alternatively, when the registration of the information terminal apparatus fails, the apparatus may try registration again.

Figure 35A:
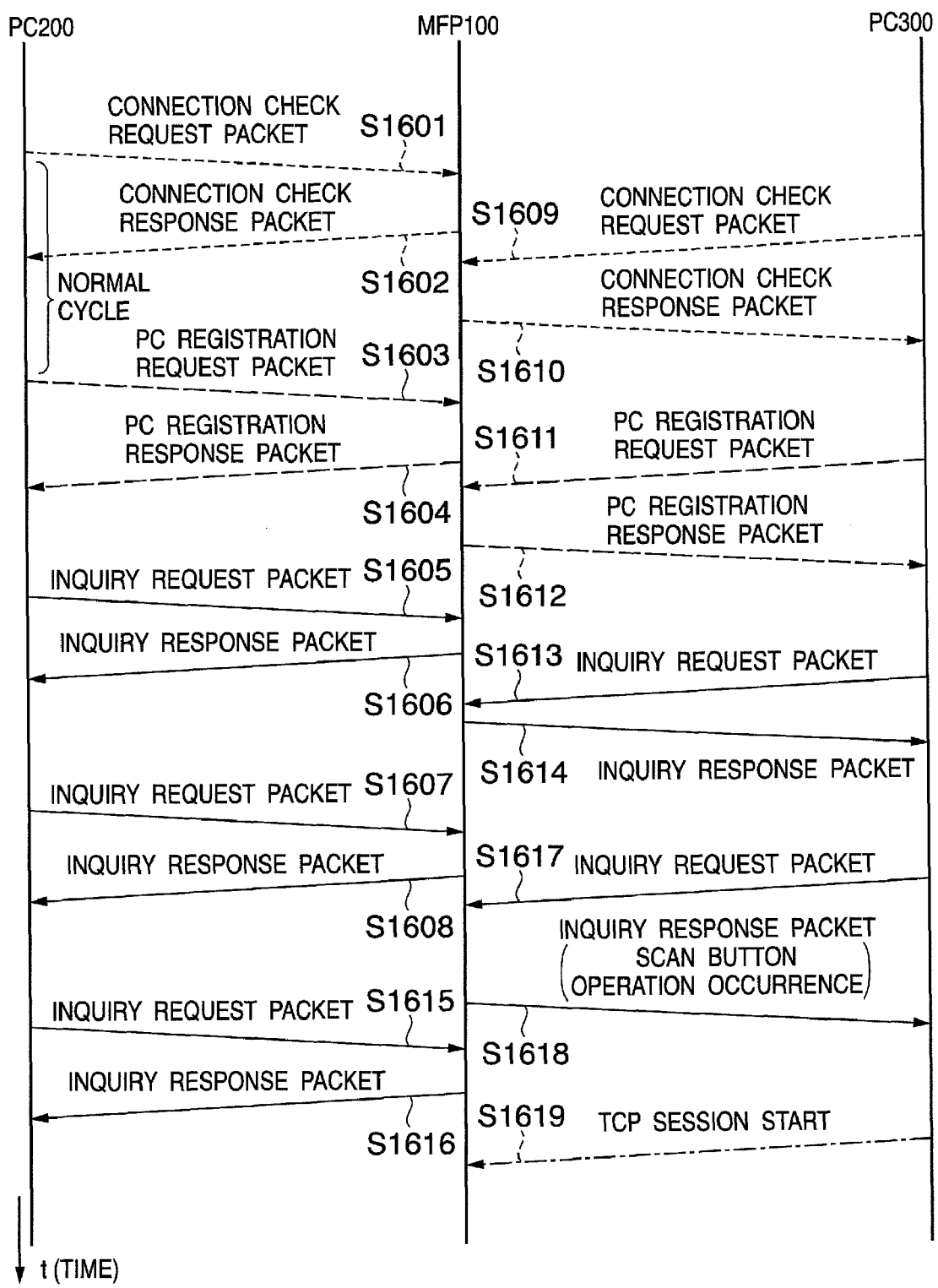
FIG. 35 is a view showing the flows of packets to be exchanged for a push scan service between the MFP 100, the information terminal apparatus 200, and the information terminal apparatus 300.
Figure 35B:
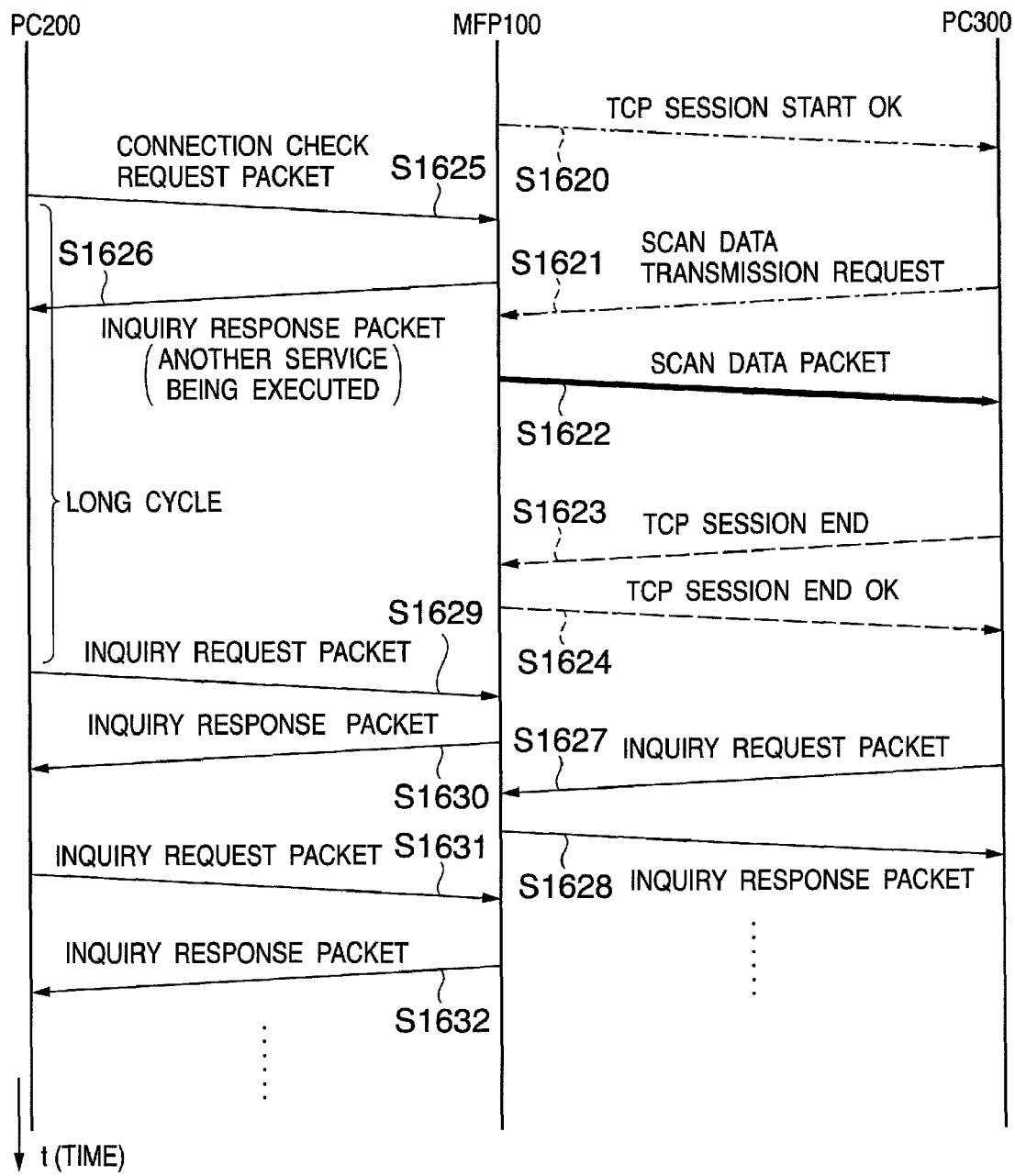

FIG. 35 is a view showing the flows of packets to be exchanged between the MFP 100, the information terminal apparatus 200, and the information terminal apparatus 300 to provide a push scan service. Referring to FIG. 35, the ordinate indicates the time. However, for the sake of explanation, the intervals of the respective packets in the time axis direction do not represent the real time.

Note that this embodiment uses TCP/IP as a communication protocol, performs processing by UDP communication until the information terminal apparatus 200 detects an event, and executes a scan service by TCP communication after the information terminal apparatus 200 detects the event. UDP communication is datagram-oriented and is high in transfer rate but is low in reliability, whereas TCP communication is session-oriented and is low in transfer rate but is high in reliability.

Assume that in order to allow an information terminal apparatus to receive services from the printer function, scanner function, and storage function of an MFP by communicating with the MFP, a printer driver, scanner driver, application, and the like for the MFP 100 are installed in the information terminal apparatus in advance. Upon completion of installation, the MFP 100, the information terminal apparatus 200, and the information terminal apparatus 300 can communicate with each other, and the information terminal apparatuses hold information (an IP address, a MAC address, and the like) concerning the MFP 100.

Polling preparation, check, and registration will be described first with reference to FIG. 35.

Upon completion of installation of software, the information terminal apparatus 200 activates the application installed therein. First of all, the information terminal apparatus 200 transmits a connection check request packet addressed to the MFP 100 to a network 310 through a network communication unit 207 and a network connection unit 208 under the control of a CPU 201 (S1601).

Figure 36:
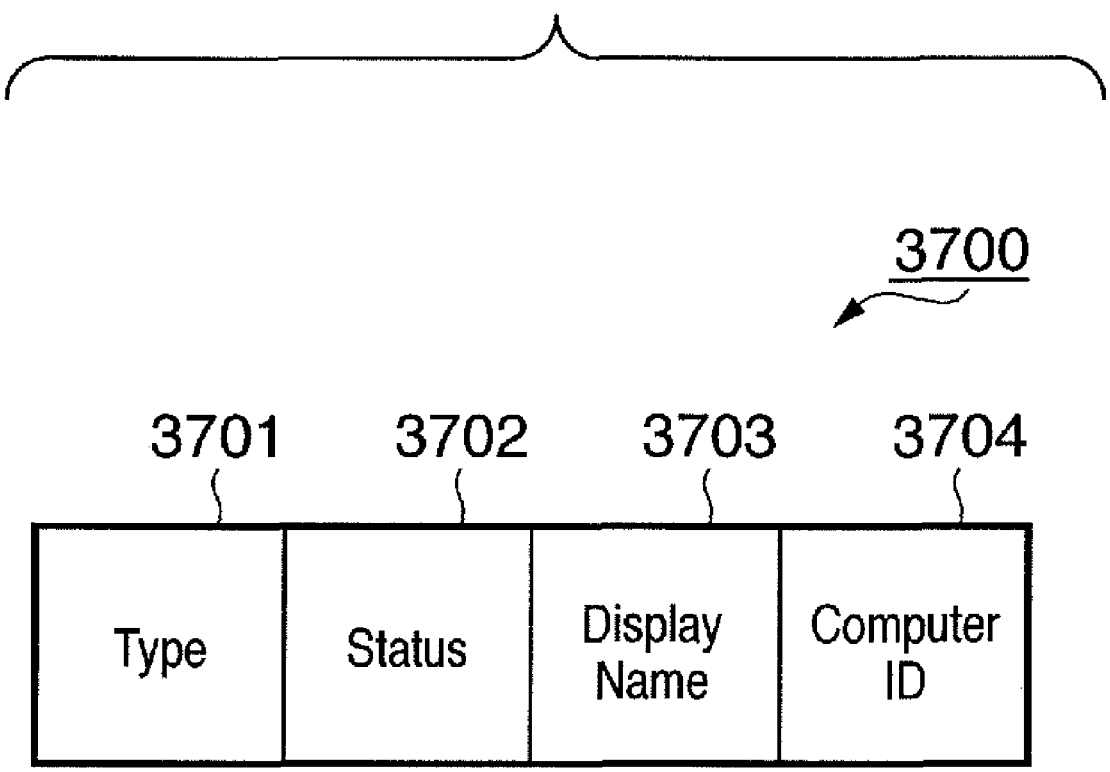
FIG. 36 is a view showing the arrangement of a data unit based on the TPC/IP protocol which becomes a data portion 3700 of a connection check request packet which the information terminal apparatus transmits to the MFP.

FIG. 36 is a view showing the arrangement of a data portion based on the TCP/IP protocol, which is a data portion 3700 of the connection check request packet which the information terminal apparatus transmits to the MFP.

Referring to FIG. 36, reference numeral 3701 denotes a packet identifier which is used when a predetermined identifier is to be attached to a packet transmitted/received between the MFP and the information terminal apparatus. In step S1601, this identifier is set to "00: connection check request packet". Reference numeral 3702 denotes status information to which the state of the MFP is responded, and which is blank when the information terminal apparatus is to issue a packet; and 3703, a window display name, which stores a name allowing the user to easily identify the information terminal apparatus. Although described in the following steps, this area is not used at the point of time corresponding to step S1601, and hence is made blank. Reference numeral 3704 denotes a computer ID which holds an ID allowing the MFP identify the information terminal apparatus. Note that the MFP uniquely and arbitrarily sets the value of the computer ID, and hence this area is blank at the point of time corresponding to step S1601.

Upon receiving a connection check request packet, the MFP 100 transmits a connection check response packet (S1602).

Figure 37:
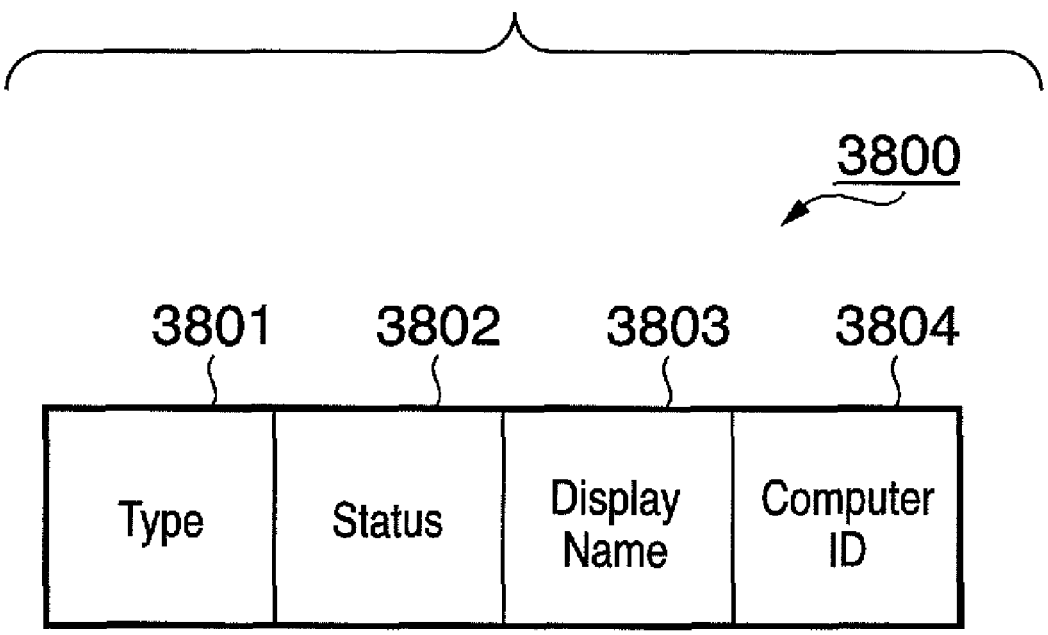
FIG. 37 is a view showing the arrangement of a data unit based on the TPC/IP protocol which becomes a data portion 3800 of a connection check response packet which the MFP transmits to the information terminal apparatus.

FIG. 37 is a view showing the arrangement of a data portion based on the TCP/IP protocol which is a data portion 3800 of a connection check response packet which the MFP transmits to the information terminal apparatus.

Referring to FIG. 37, reference numeral 3801 denotes a packet identifier which is used when a predetermined identifier is to be attached to a packet transmitted/received between the MFP and the information terminal apparatus. In step S1602, this identifier is set to "10: connection check response packet". Reference numeral 3802 denotes status information which represents the state of the MFP 100, and which is set to "00: power ON"; and 3803, a window display name which the information terminal apparatus notifies. In the case of a packet issued from the MFP, this area is blank. Obviously, this area may store the value stored in the image display name 3703. Reference numeral 3804 denotes a computer ID having a unique value. In this case, this area stores a value associated with the window display name displayed in a window display name storage list (to be described later).

By receiving a connection check response packet, the information terminal apparatus 200 can recognize that the MFP 100 exists on the network and can communicate with it.

When connection check with respect to the MFP 100 succeeds, the information terminal apparatus 200 transmits a PC registration request packet to the MFP 100 (S1603). This packet format is the same as that shown in FIG. 36. In this case, the packet identifier 3701 is set to "01: PC registration request packet". In addition, the status information 3702 is blank, and the window display name 3703 is set to a name which allows the user to easily identify the information terminal apparatus 200. For example, preferably, an application acquires a PC name and the login name of a user who is currently logging in under the control of the CPU 201, and is defined by a format like "login name@PC name". Assume that in this case, information "admin@Desk" is stored.

Containing both the login name and the PC name in this information makes it possible to identify a plurality of users who use the same information terminal apparatus and provide a service individually. The computer ID 3704 is an area holding an ID which allows the MFP 100 to identify the information terminal apparatus 200. Since the MFP uniquely and arbitrarily sets this value, this area is blank at the point of time corresponding to step S1603.

Upon receiving a PC registration request packet through the network 310, network connection unit 111, and network communication unit 110, a CPU 105 of the MFP 100 stores the value of a window display name 703 in a predetermined storage area of a work memory 107 or the like.

FIGS. 38A and 38B are views showing an example of a window display name storage list 3900 stored in the storage unit.

Referring to FIGS. 38A and 38B, in this embodiment, the window display name storage list 3900 can store IDs and image display names in association with each other. Assume that this area stores no identical IDs. Reference numeral 3901 denotes the window display name "admin@Desk".

Subsequently, upon completion of registration in the window display storage list, the MFP 100 displays the list on an LCD screen 401 of the operation panel 400.

Figure 39A:
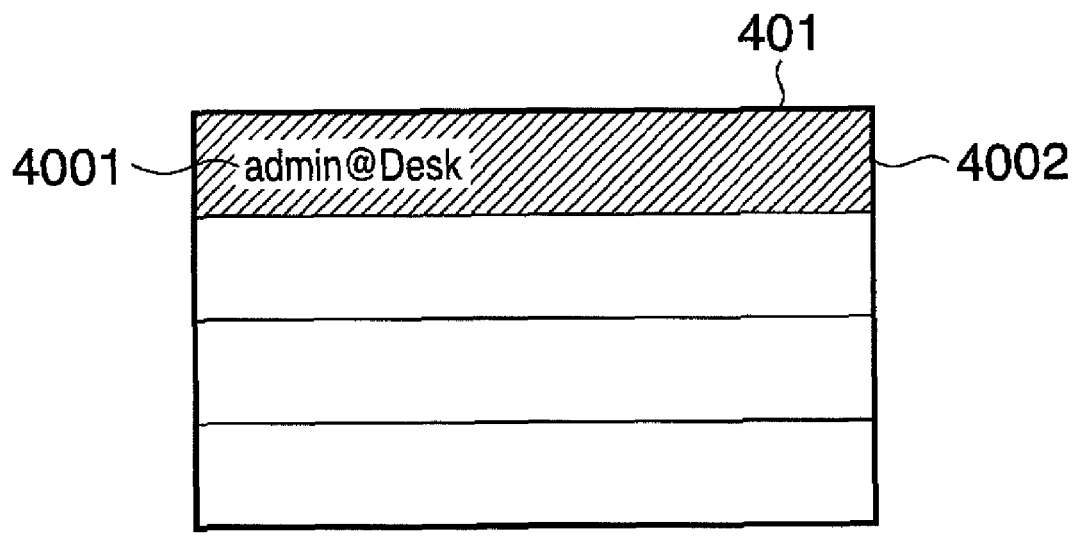
FIGS. 39A and 39B are views showing a display example of the LCD screen 401.
Figure 39B:
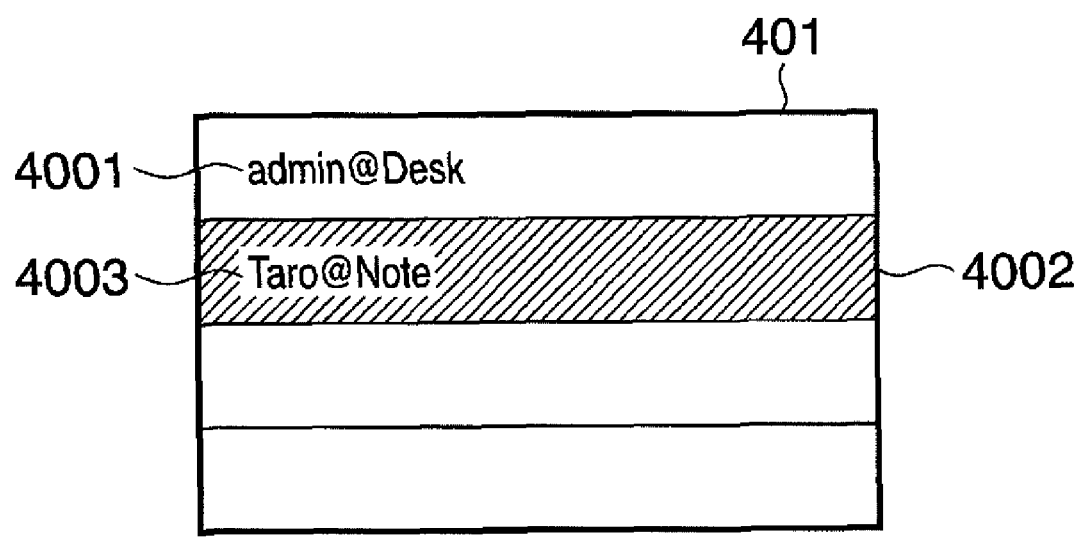

FIGS. 39A and 39B are views showing an example of display on the LCD screen 401.

Referring to FIGS. 39A and 39B, reference numeral 4001 denotes a window display name registered in the MFP 100 in step S1603; and 4002, a cursor. Referring to FIG. 39A, only one window display name is displayed, and hence has already been set in the selected state.

Subsequently, the MFP 100 transmits, to the information terminal apparatus 200, a "registration success" status and the computer ID if storage in the window display name storage list succeeds, and transmits a PC registration response packet to which "registration failure" is attached, if storage in the list fails (S1604).

This packet format is the same as that shown in FIG. 37. In step S1604, the packet identifier 3801 is set to "11: PC registration response packet". Assume that the status information 3802 is set to "01: registration success", and the window display name 3803 is blank. Obviously, this area may store the value stored in the window display name 3703. The computer ID 3804 is a unique value. In this case, this area stores a value associated with the window display name displayed on the window display name storage list 3900.

Polling processing will be described next.

Upon receiving a PC registration response packet, the information terminal apparatus 200 transmits an inquiry packet for inquiring whether the MFP 100 has executed push scan to the MFP 100 through the network 310 (S1605).

This packet format is the same as that shown in FIG. 36. In step S1605, the value of the packet identifier 3701 is set to "02: inquiry packet", and the value of the ID notified from the MFP 100 is stored as the value of the computer ID 3704 in step S1604.

Upon receiving the inquiry packet, the MFP 100 checks whether push scan has not been executed, and transmits the result as an inquiry response packet to the information terminal apparatus 200 (S1606). This packet format is the same as that shown in FIG. 37. In step S1606, the value of the packet identifier 3801 is set to "12: inquiry response packet", and the value of the status information 3802 is set to "03: request Ok". Obviously, the MFP 100 can transmit a response packet with the various kinds of status information shown in FIG. 37, reflecting the state of the MFP. The value of the ID notified from the information terminal apparatus 200 is stored as the value of the computer ID 3804 in step S1605.

Upon receiving the inquiry response packet, the information terminal apparatus 200 issues an inquiry packet at the predetermined first cycle (to be referred to as a normal cycle hereafter, e.g., five-sec intervals) (S1607). Accordingly, the MFP 100 transmits an inquiry response packet every time it receives an inquiry packet as in step S1606 (S1608).

Like the information terminal apparatus 200, the information terminal apparatus 300 exchanges a connection check request packet and a connection check response packet with the MFP 100, and further exchanges a PC registration request packet and a PC registration response packet with the MFP 100 (S1609 to S1612). Thereafter, they transmit/receive an inquiry packet and an inquiry response packet in the same manner (S1613 and S1614). In this embodiment, the window display name 703 issued from the information terminal apparatus 300 stores "Taro@Note". FIGS. 38B and 39B respectively show the window display name storage list 3900 and the LCD screen 401 at this point of time.

Execution of push scan processing will be further described below.

As described above, when the information terminal apparatus 200 or 300 continues polling processing with respect to the MFP 100, the user can transmit scan data to the information terminal apparatus 200 or 300 by operating the operation panel 400 of the MFP 100.

A procedure of transmitting scan data to the information terminal apparatus 300 will be described below.

First of all, the user sets a document on the document table (not shown) which the MFP 100 includes, and presses a scan key 404. The LCD screen 401 then displays a window display name which can be selected as a push scan target. The user then selects the information terminal apparatus 300 by operating an arrow key 410. That is, the user selects "Taro@Note" 4003 in FIG. 39B, and confirms a push scan target by pressing a decision key 412. Thereafter, the user presses a color start key 406. The user may press a monochrome start key 407 in accordance with an application. For the sake of descriptive simplicity, assume that the user presses the color start key 406 immediately after step S1614 in FIG. 35.

When the user presses the color start key 406, the MFP 100 starts a push scan service. More specifically, the user sets the value of the status information 3802 of the inquiry response packet corresponding to an inquiry packet from the information terminal apparatus 300 selected as a target to "04: scan button operation occurrence".

In this case, when receiving an inquiry packet from the information terminal apparatus 200 (S1615), the MFP returns an inquiry response packet with the status "01: request OK" (S1616). When receiving an inquiry packet from the information terminal apparatus 300 afterward (S1617), the MFP returns an inquiry response packet with the status "04: scan button operation occurrence" (S1618).

Note that the MFP performs UDP communication in steps S1603 to S1618. However, the gist of the present invention is not limited to this.

Upon detecting the status "04: scan button operation occurrence", the information terminal apparatus 300 establishes a TCP session with the MFP 100 (S1619 and S1620). Thereafter, the information terminal apparatus 300 requests scan data transmission (S1621), and the MFP 100 transmits scan data to the information terminal apparatus 300 (S1622). The information terminal apparatus 300 then confirms the completion of the reception of the scan data packet, and terminates the TCP session (S1623 and S1624).

The scanner driver and application installed in the information terminal apparatus 300 execute transmission/reception control of this scan data transmission request and scan data packet. This transmission/reception control has been described in the first embodiment, and hence a description thereof will be omitted. Although steps S1619 to S1624 are based on TCP communication, the present invention is not limited to this.

The information terminal apparatus 200 issues an inquiry packet in accordance with the normal cycle independently of the series of processing (S1619 to S1724) executed by the information terminal apparatus 300 (S1625). In response to this packet, the MFP 100 must transmit a response packet (S1626). If scan processing (S1619 to S1624) has been complete at the point of time corresponding to step S1625, the MFP may reply with the status "03: request OK" when transmitting an inquiry response packet (S1626). However, since the MFP is performing scan processing, it returns an inquiry response packet with the status "05: another service being executed" (S1626).

In this embodiment, upon receiving the status "05: another service being executed", the information terminal apparatus 200 sets the subsequent polling cycle to the second cycle (to be referred to as a long cycle, e.g., 30-sec intervals) longer than the first cycle, and waits for the timing of the issuance of the next inquiry packet. On the other hand, upon completion of scan processing (completion in step S1624), the information terminal apparatus 300 issues an inquiry packet at the normal cycle afterward (S1627 and S1628).

When the long cycle has elapsed since step S1625, the information terminal apparatus 200 issues an inquiry packet (S1629). In response to this packet, the MFP 100 returns an inquiry response packet with the status "03: request OK" (S1630). The information terminal apparatus 200 then set the subsequent polling cycle to the normal cycle, and issues the subsequent packet (S1631 and S1632).

Polling cycle changing processing by the information terminal apparatus 200 will be described below.

Figure 40:
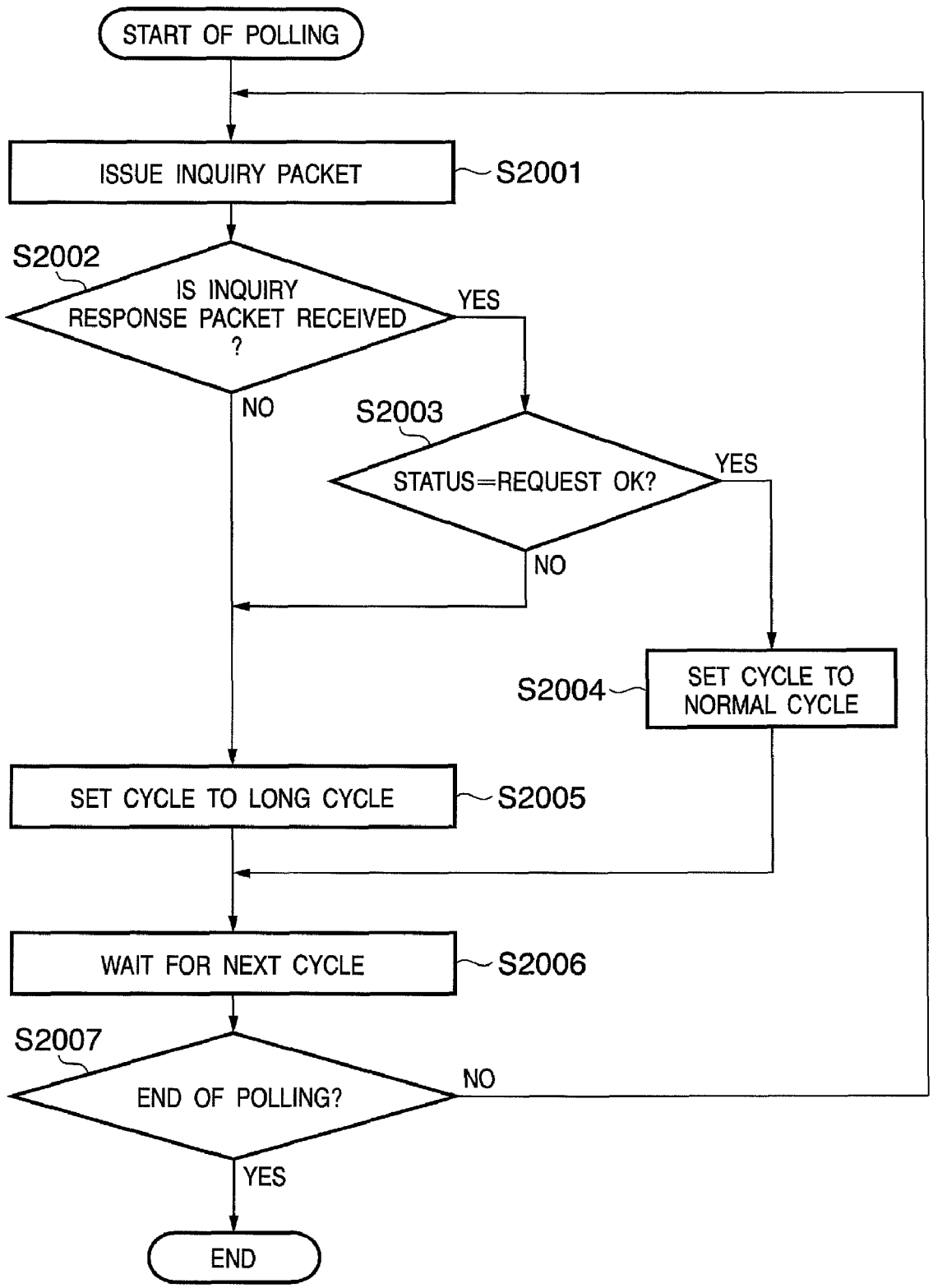
FIG. 40 is a flowchart showing polling cycle changing processing executed by an application installed in an information terminal apparatus.

FIG. 40 is a flowchart showing polling cycle changing processing executed by an application installed in the information terminal apparatus 200.

After the start of polling, the information terminal apparatus 200 issues an inquiry packet (S2001), and waits for the reception of an inquiry response packet (S2002). In this case, when receiving an inquiry response packet (YES in step S2002), the information terminal apparatus 200 checks whether the status of the packet is "03: request OK" (S2003). If the status is "03" (YES in step S2003), the information terminal apparatus 200 keeps the cycle at the normal cycle (S2004). Otherwise (NO in step S2002), the information terminal apparatus 200 sets the cycle to the long cycle (S2005).

When receiving no inquiry packet either, the information terminal apparatus 200 sets the polling cycle to the long cycle, regarding that the power supply of the target MFP is OFF or the apparatus cannot communicate with the MFP 100 (S2005). Obviously, if the information terminal apparatus 200 becomes ready to receive a response packet from the MFP 100 and receives a response packet with the status "03: request OK", the information terminal apparatus 200 returns the polling cycle to the normal cycle and continues polling processing.

Subsequently, the process waits for the next cycle (S2006. When the set cycle has elapsed, the information terminal apparatus 200 checks whether the polling processing is complete (S2007). If the processing is not complete (NO in step S2007), the information terminal apparatus 200 issues an inquiry packet again (S2001). In contrast, upon determining that the polling processing is complete (YES in step S2007), the information terminal apparatus 200 terminates the processing.

According to the above description, if the status of an inquiry response packet is "03: request OK", the information terminal apparatus 200 sets the cycle to the normal cycle. Otherwise (e.g., if the MFP replies with the status "05: another service being executed"), the information terminal apparatus 200 sets the cycle to the long cycle. However, the present invention is not limited to this, and various modifications can be made.

For example, in step S2003, if the MFP replies with the status "06: being shut down" indicating that the MFP is performing power OFF processing or "07: another session being established" indicating that a TCP session is established with another information terminal apparatus, the information terminal apparatus may set the polling cycle to the long cycle. In addition, if the MFP replies with the status "08: service being activated" indicating that the MFP is initializing each service function, accompanying power ON processing, the information terminal apparatus 200 can perform control to set the polling cycle to the normal cycle.

As described above, according to this embodiment, the information terminal apparatus determines that it cannot expect to receive a response packet with the status "04: scan button operation occurrence" from the MFP, the apparatus can autonomously set the polling cycle to the long cycle. This can reduce the traffic on the network, the load on the server which is providing a service, and the load on the information terminal apparatus. Note that the MFP as a server only stores the status information of its own in an inquiry response packet, and hence the processing load is light.

Third Exemplary Embodiment

The third embodiment will exemplify the case of increasing the degree of freedom of an information terminal apparatus 200 as a client in determining a polling cycle in addition to the processing in the second embodiment.

Figure 41:
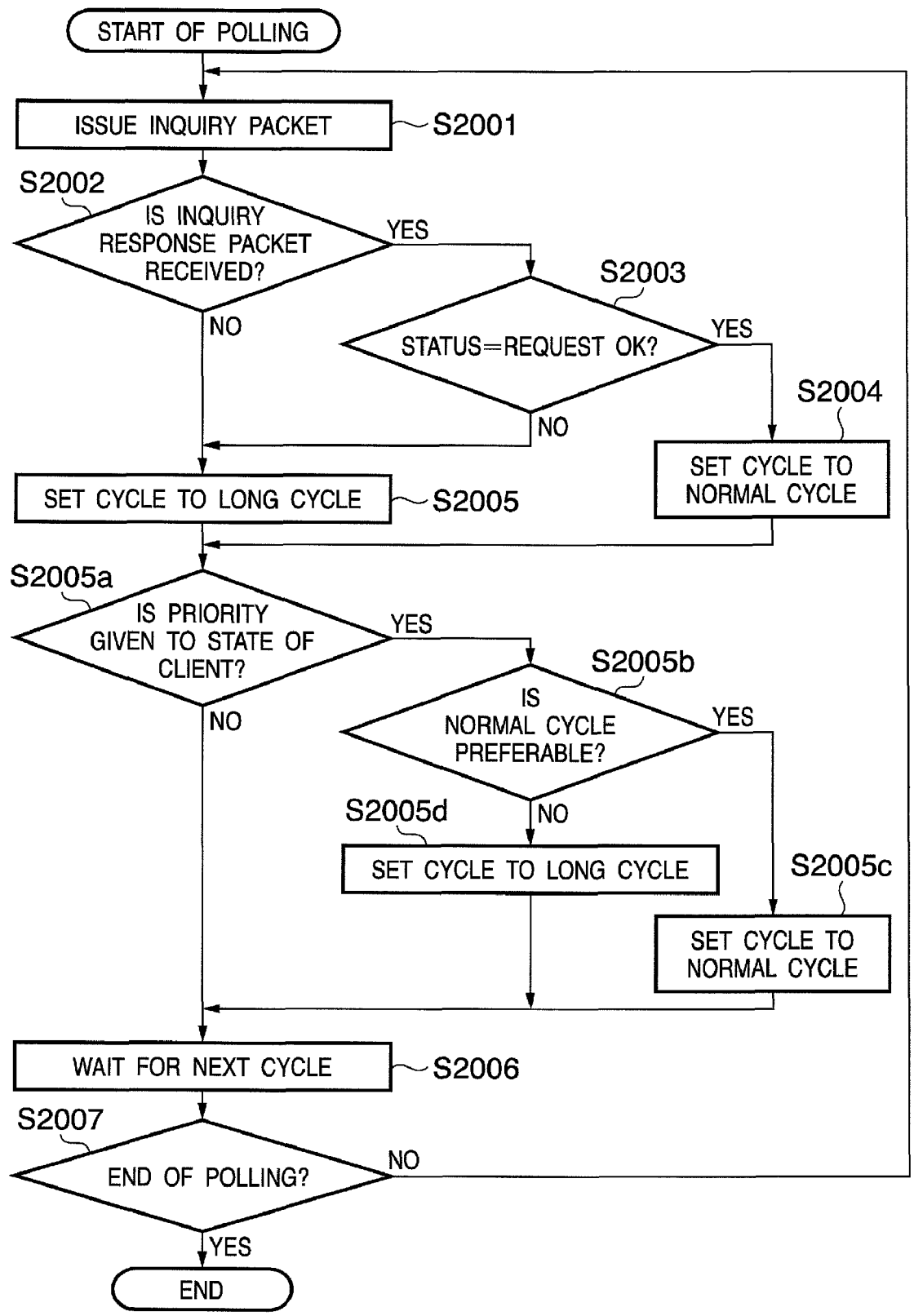
FIG. 41 is a flowchart showing polling cycle changing processing executed by an application installed in an information terminal apparatus according to the third embodiment.

FIG. 41 is a flowchart showing polling cycle changing processing executed by an application installed in the information terminal apparatus 200 in accordance with the third embodiment. Note that the same reference numerals as in FIG. 41 denote the steps of performing the same processing as that already described with reference to FIG. 40, and a description thereof will be omitted.

After setting a polling cycle in step S2004 or S2005, the application determines whether to give priority to the state of the information terminal apparatus 200 (S2005a). If the application determines that it does not give priority to the state of the information terminal apparatus 200, the application executes the processing according to the second embodiment which has been described with reference to FIG. 40.

In contrast to this, assume that the application determines that it gives priority to the state of the information terminal apparatus 200. In this case, if the application wants to increase the priority degree of the information terminal apparatus 200, the application sets the polling cycle to the normal cycle (S2005c). This makes the information terminal apparatus 200 execute polling without changing the normal cycle even if it receives a response packet with the status "another service being executed" from an MFP 100. This makes it possible to reduce the time loss between the time the MFP 100 completes a service and the time the MFP 100 becomes ready to perform push scan with respect to the information terminal apparatus 200.

In contrast, upon determining that polling at a short cycle is difficult to perform because, for example, the load on the information terminal apparatus 200 itself is heavy, the application sets the polling cycle to the long cycle (S2005d). This makes it possible to reduce the operation load on the information terminal apparatus 200 itself, because the information terminal apparatus 200 executes polling without changing the long cycle even if it receives a response packet with the status "03: request OK" from the MFP 100.

According to the above embodiment, in a communication system comprising clients (information terminal apparatuses) and a server which can communicate with each other through a network, each client can autonomously set a polling cycle without any instruction about a polling cycle from the server.

In the second and third embodiments, polling cycles are defined as two kinds of cycles, i.e., the first cycle (normal cycle: e.g., five-sec intervals) and the second cycle (long cycle: e.g., 30-sec intervals) longer than the first cycle. However, the present invention is not limited to this. For example, obviously, these embodiments can be modified so as to increase the number of cycles to be defined.

Peripheral apparatuses according to the present invention include single-function apparatuses such as a printer, scanner, and storage unit which can perform network communication as well as MFPs capable of network communication. In addition, such apparatuses include AV devices capable of network communication and network-compatible home electric appliances such as a home server and a digital camera. Obviously, information terminal apparatuses according to the present invention include PDAs (Personal Digital Assistants) and the like as well as PCs (Personal Computers) capable of network communication. In addition, the present invention can be applied to a case wherein a digital camera or the like communicates with a printer or the like through a network. Furthermore, the present invention can be applied to a very wide range of fields, e.g., setting and notification of service acceptance/rejection in a case wherein a terminal apparatus such as a cell phone receives a service through a network, and a telephone exchange and telephone sets connecting thereto.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-041660, filed Feb. 17, 2006, which is hereby incorporated by reference herein in its entirety.

What is claimed is:

1. A system in which an information processing apparatus and a peripheral are connected to each other through a network and communicate with each other by exchanging packets, the information processing apparatus comprising:
   a request unit that transmits, to the peripheral, a registration request for registering the information processing apparatus as an apparatus for which use of a service to be provided by the peripheral is permitted;
   a response reception unit that receives a response to the registration request from the peripheral;
   an inquiry unit; and
   a cycle change unit, and the peripheral comprising:
   a determination unit that determines whether to accept the registration request transmitted from the information processing apparatus;
   a notification unit that notifies the information processing apparatus which has transmitted the registration request of a determination result obtained by the determination unit;
   a storage unit that stores information of the information processing apparatus in which the registration request is accepted based on the determination result;
   a matching unit; and
   a response unit, wherein the inquiry unit inquires about possibility of use of the requested service, when the response reception unit receives a notification of use permission based on the determination result to the registration request from the peripheral, wherein the matching unit, upon receiving an inquiry from the inquiry unit, performs matching to check whether the information processing apparatus which has transmitted the inquiry is an information processing apparatus stored in the storage unit, wherein the response unit transmits a response to the inquiry in accordance with a matching result obtained by the matching unit, wherein the cycle change unit changes a cycle at which the inquiry unit transmits an inquiry in accordance with an operation state of the peripheral, and wherein the operation state of the peripheral includes a state in which another service is being executed, a state in which a power supply is off, and a state in which a service is being executed for another information processing apparatus or another information processing apparatus is being used, and the cycle is prolonged by the cycle change unit.

* * * * *